Inventors
MARTINUS DEN HERTOG
CONSTANTINUS DE ZEEUW
HANS HELMUT ADELAAR
By Robert Harding Jr.
Attorney Distribution of Call Detectors over Call Detector – Explorers of Registers Inventors
MARTINUS DEN HERTOG
CONSTANTINUS DE ZEEUW
HANS HELMUT ADELAAR
By [signature]
Attorney

| FOR REGISTER Nº | CONNECT TERMINALS | | | | | | | | | | | | | | | | REGISTER- | |
|---|---|---|---|---|---|---|---|---|---|---|---|---|---|---|---|---|---|---|
| | A | B | C | D | E | F | G | H | I | J | K | L | M | N | O | P | MAIN GROUP | SUB GROUP |
| | TO IMPULSE - SOURCES | | | | | | | | | | | | | | | | | |
| | Pc | | | | Pe | | | Pd | | | | | | | | | | |
| 1 | 1 | 2 | 3 | 4 | 1 | 2 | 3 | 1 | 2 | 3 | 4 | 5 | 6 | 7 | 8 | 9 | A | 1 |
| 2 | 1 | 2 | 3 | 4 | 1 | 2 | 3 | 9 | 1 | 2 | 3 | 4 | 5 | 6 | 7 | 8 | | |
| 3 | 1 | 2 | 3 | 4 | 1 | 2 | 3 | 8 | 9 | 1 | 2 | 3 | 4 | 5 | 6 | 7 | | |
| 4 | 1 | 2 | 3 | 4 | 1 | 2 | 3 | 7 | 8 | 9 | 1 | 2 | 3 | 4 | 5 | 6 | | |
| 5 | 4 | 1 | 2 | 3 | 1 | 2 | 3 | 1 | 2 | 3 | 4 | 5 | 6 | 7 | 8 | 9 | | 2 |
| 6 | 4 | 1 | 2 | 3 | 1 | 2 | 3 | 9 | 1 | 2 | 3 | 4 | 5 | 6 | 7 | 8 | | |
| 7 | 4 | 1 | 2 | 3 | 1 | 2 | 3 | 8 | 9 | 1 | 2 | 3 | 4 | 5 | 6 | 7 | | |
| 8 | 4 | 1 | 2 | 3 | 1 | 2 | 3 | 7 | 8 | 9 | 1 | 2 | 3 | 4 | 5 | 6 | | |
| 9 | 3 | 4 | 1 | 2 | 1 | 2 | 3 | 1 | 2 | 3 | 4 | 5 | 6 | 7 | 8 | 9 | | 3 |
| 10 | 3 | 4 | 1 | 2 | 1 | 2 | 3 | 9 | 1 | 2 | 3 | 4 | 5 | 6 | 7 | 8 | | |
| 11 | 3 | 4 | 1 | 2 | 1 | 2 | 3 | 8 | 9 | 1 | 2 | 3 | 4 | 5 | 6 | 7 | | |
| 12 | 3 | 4 | 1 | 2 | 1 | 2 | 3 | 7 | 8 | 9 | 1 | 2 | 3 | 4 | 5 | 6 | | |
| 13 | 2 | 3 | 4 | 1 | 1 | 2 | 3 | 1 | 2 | 3 | 4 | 5 | 6 | 7 | 8 | 9 | | 4 |
| 14 | 2 | 3 | 4 | 1 | 1 | 2 | 3 | 9 | 1 | 2 | 3 | 4 | 5 | 6 | 7 | 8 | | |
| 15 | 2 | 3 | 4 | 1 | 1 | 2 | 3 | 8 | 9 | 1 | 2 | 3 | 4 | 5 | 6 | 7 | | |
| 16 | 2 | 3 | 4 | 1 | 1 | 2 | 3 | 7 | 8 | 9 | 1 | 2 | 3 | 4 | 5 | 6 | | |
| 17 | 1 | 2 | 3 | 4 | 2 | 3 | 1 | 1 | 2 | 3 | 4 | 5 | 6 | 7 | 8 | 9 | B | 5 |
| 18 | 1 | 2 | 3 | 4 | 2 | 3 | 1 | 9 | 1 | 2 | 3 | 4 | 5 | 6 | 7 | 8 | | |
| 19 | 1 | 2 | 3 | 4 | 2 | 3 | 1 | 8 | 9 | 1 | 2 | 3 | 4 | 5 | 6 | 7 | | |
| 20 | 1 | 2 | 3 | 4 | 2 | 3 | 1 | 7 | 8 | 9 | 1 | 2 | 3 | 4 | 5 | 6 | | |
| 21 | 4 | 1 | 2 | 3 | 2 | 3 | 1 | 1 | 2 | 3 | 4 | 5 | 6 | 7 | 8 | 9 | | 6 |
| 22 | 4 | 1 | 2 | 3 | 2 | 3 | 1 | 9 | 1 | 2 | 3 | 4 | 5 | 6 | 7 | 8 | | |
| 23 | 4 | 1 | 2 | 3 | 2 | 3 | 1 | 8 | 9 | 1 | 2 | 3 | 4 | 5 | 6 | 7 | | |
| 24 | 4 | 1 | 2 | 3 | 2 | 3 | 1 | 7 | 8 | 9 | 1 | 2 | 3 | 4 | 5 | 6 | | |
| 25 | 3 | 4 | 1 | 2 | 2 | 3 | 1 | 1 | 2 | 3 | 4 | 5 | 6 | 7 | 8 | 9 | | 7 |
| 26 | 3 | 4 | 1 | 2 | 2 | 3 | 1 | 9 | 1 | 2 | 3 | 4 | 5 | 6 | 7 | 8 | | |
| 27 | 3 | 4 | 1 | 2 | 2 | 3 | 1 | 8 | 9 | 1 | 2 | 3 | 4 | 5 | 6 | 7 | | |
| 28 | 3 | 4 | 1 | 2 | 2 | 3 | 1 | 7 | 8 | 9 | 1 | 2 | 3 | 4 | 5 | 6 | | |
| 29 | 2 | 3 | 4 | 1 | 2 | 3 | 1 | 1 | 2 | 3 | 4 | 5 | 6 | 7 | 8 | 9 | | 8 |
| 30 | 2 | 3 | 4 | 1 | 2 | 3 | 1 | 9 | 1 | 2 | 3 | 4 | 5 | 6 | 7 | 8 | | |
| 31 | 2 | 3 | 4 | 1 | 2 | 3 | 1 | 8 | 9 | 1 | 2 | 3 | 4 | 5 | 6 | 7 | | |
| 32 | 2 | 3 | 4 | 1 | 2 | 3 | 1 | 7 | 8 | 9 | 1 | 2 | 3 | 4 | 5 | 6 | | |
| 33 | 1 | 2 | 3 | 4 | 3 | 1 | 2 | 1 | 2 | 3 | 4 | 5 | 6 | 7 | 8 | 9 | C | 9 |
| 34 | 1 | 2 | 3 | 4 | 3 | 1 | 2 | 9 | 1 | 2 | 3 | 4 | 5 | 6 | 7 | 8 | | |
| 35 | 1 | 2 | 3 | 4 | 3 | 1 | 2 | 8 | 9 | 1 | 2 | 3 | 4 | 5 | 6 | 7 | | |
| 36 | 1 | 2 | 3 | 4 | 3 | 1 | 2 | 7 | 8 | 9 | 1 | 2 | 3 | 4 | 5 | 6 | | |
| 37 | 4 | 1 | 2 | 3 | 3 | 1 | 2 | 1 | 2 | 3 | 4 | 5 | 6 | 7 | 8 | 9 | | 10 |
| 38 | 4 | 1 | 2 | 3 | 3 | 1 | 2 | 9 | 1 | 2 | 3 | 4 | 5 | 6 | 7 | 8 | | |
| 39 | 4 | 1 | 2 | 3 | 3 | 1 | 2 | 8 | 9 | 1 | 2 | 3 | 4 | 5 | 6 | 7 | | |
| 40 | 4 | 1 | 2 | 3 | 3 | 1 | 2 | 7 | 8 | 9 | 1 | 2 | 3 | 4 | 5 | 6 | | |
| 41 | 3 | 4 | 1 | 2 | 3 | 1 | 2 | 1 | 2 | 3 | 4 | 5 | 6 | 7 | 8 | 9 | | 11 |
| 42 | 3 | 4 | 1 | 2 | 3 | 1 | 2 | 9 | 1 | 2 | 3 | 4 | 5 | 6 | 7 | 8 | | |
| 43 | 3 | 4 | 1 | 2 | 3 | 1 | 2 | 8 | 9 | 1 | 2 | 3 | 4 | 5 | 6 | 7 | | |
| 44 | 3 | 4 | 1 | 2 | 3 | 1 | 2 | 7 | 8 | 9 | 1 | 2 | 3 | 4 | 5 | 6 | | |
| 45 | 2 | 3 | 4 | 1 | 3 | 1 | 2 | 1 | 2 | 3 | 4 | 5 | 6 | 7 | 8 | 9 | | 12 |
| 46 | 2 | 3 | 4 | 1 | 3 | 1 | 2 | 9 | 1 | 2 | 3 | 4 | 5 | 6 | 7 | 8 | | |
| 47 | 2 | 3 | 4 | 1 | 3 | 1 | 2 | 8 | 9 | 1 | 2 | 3 | 4 | 5 | 6 | 7 | | |
| 48 | 2 | 3 | 4 | 1 | 3 | 1 | 2 | 7 | 8 | 9 | 1 | 2 | 3 | 4 | 5 | 6 | | |

FIG. 4A.

TABLE SHOWING CONNECTIONS OF IMPULSE SOURCES TO GATES OF FIG.3.

Inventors
MARTINUS DEN HERTOG
CONSTANTINUS DE ZEEUW
HANS HELMUT ADELAAR
By [signature]
Attorney

| FOR REGISTER Nº | CONNECT TERMINALS | | | | | | | | | | | | | | | | REGISTER- | |
|---|---|---|---|---|---|---|---|---|---|---|---|---|---|---|---|---|---|---|
| | A | B | C | D | E | F | G | H | I | J | K | L | M | N | O | P | MAIN GROUP | SUB-GROUP |
| | TO IMPULSE - SOURCES | | | | | | | | | | | | | | | | | |
| | Pc | | | | Pe | | | Pd | | | | | | | | | | |
| 49 | 1 | 2 | 3 | 4 | 1 | 2 | 3 | 5 | 6 | 7 | 8 | 9 | 1 | 2 | 3 | 4 | A | 13 |
| 50 | 1 | 2 | 3 | 4 | 1 | 2 | 3 | 4 | 5 | 6 | 7 | 8 | 9 | 1 | 2 | 3 | | |
| 51 | 1 | 2 | 3 | 4 | 1 | 2 | 3 | 3 | 4 | 5 | 6 | 7 | 8 | 9 | 1 | 2 | | |
| 52 | 1 | 2 | 3 | 4 | 1 | 2 | 3 | 2 | 3 | 4 | 5 | 6 | 7 | 8 | 9 | 1 | | |
| 53 | 4 | 1 | 2 | 3 | 1 | 2 | 3 | 5 | 6 | 7 | 8 | 9 | 1 | 2 | 3 | 4 | | 14 |
| 54 | 4 | 1 | 2 | 3 | 1 | 2 | 3 | 4 | 5 | 6 | 7 | 8 | 9 | 1 | 2 | 3 | | |
| 55 | 4 | 1 | 2 | 3 | 1 | 2 | 3 | 3 | 4 | 5 | 6 | 7 | 8 | 9 | 1 | 2 | | |
| 56 | 4 | 1 | 2 | 3 | 1 | 2 | 3 | 2 | 3 | 4 | 5 | 6 | 7 | 8 | 9 | 1 | | |
| 57 | 3 | 4 | 1 | 2 | 1 | 2 | 3 | 5 | 6 | 7 | 8 | 9 | 1 | 2 | 3 | 4 | | 15 |
| 58 | 3 | 4 | 1 | 2 | 1 | 2 | 3 | 4 | 5 | 6 | 7 | 8 | 9 | 1 | 2 | 3 | | |
| 59 | 3 | 4 | 1 | 2 | 1 | 2 | 3 | 3 | 4 | 5 | 6 | 7 | 8 | 9 | 1 | 2 | | |
| 60 | 3 | 4 | 1 | 2 | 1 | 2 | 3 | 2 | 3 | 4 | 5 | 6 | 7 | 8 | 9 | 1 | | |
| 61 | 2 | 3 | 4 | 1 | 1 | 2 | 3 | 5 | 6 | 7 | 8 | 9 | 1 | 2 | 3 | 4 | | 16 |
| 62 | 2 | 3 | 4 | 1 | 1 | 2 | 3 | 4 | 5 | 6 | 7 | 8 | 9 | 1 | 2 | 3 | | |
| 63 | 2 | 3 | 4 | 1 | 1 | 2 | 3 | 3 | 4 | 5 | 6 | 7 | 8 | 9 | 1 | 2 | | |
| 64 | 2 | 3 | 4 | 1 | 1 | 2 | 3 | 2 | 3 | 4 | 5 | 6 | 7 | 8 | 9 | 1 | | |
| 65 | 1 | 2 | 3 | 4 | 2 | 3 | 1 | 5 | 6 | 7 | 8 | 9 | 1 | 2 | 3 | 4 | B | 17 |
| 66 | 1 | 2 | 3 | 4 | 2 | 3 | 1 | 4 | 5 | 6 | 7 | 8 | 9 | 1 | 2 | 3 | | |
| 67 | 1 | 2 | 3 | 4 | 2 | 3 | 1 | 3 | 4 | 5 | 6 | 7 | 8 | 9 | 1 | 2 | | |
| 68 | 1 | 2 | 3 | 4 | 2 | 3 | 1 | 2 | 3 | 4 | 5 | 6 | 7 | 8 | 9 | 1 | | |
| 69 | 4 | 1 | 2 | 3 | 2 | 3 | 1 | 5 | 6 | 7 | 8 | 9 | 1 | 2 | 3 | 4 | | 18 |
| 70 | 4 | 1 | 2 | 3 | 2 | 3 | 1 | 4 | 5 | 6 | 7 | 8 | 9 | 1 | 2 | 3 | | |
| 71 | 4 | 1 | 2 | 3 | 2 | 3 | 1 | 3 | 4 | 5 | 6 | 7 | 8 | 9 | 1 | 2 | | |
| 72 | 4 | 1 | 2 | 3 | 2 | 3 | 1 | 2 | 3 | 4 | 5 | 6 | 7 | 8 | 9 | 1 | | |
| 73 | 3 | 4 | 1 | 2 | 2 | 3 | 1 | 5 | 6 | 7 | 8 | 9 | 1 | 2 | 3 | 4 | | 19 |
| 74 | 3 | 4 | 1 | 2 | 2 | 3 | 1 | 4 | 5 | 6 | 7 | 8 | 9 | 1 | 2 | 3 | | |
| 75 | 3 | 4 | 1 | 2 | 2 | 3 | 1 | 3 | 4 | 5 | 6 | 7 | 8 | 9 | 1 | 2 | | |
| 76 | 3 | 4 | 1 | 2 | 2 | 3 | 1 | 2 | 3 | 4 | 5 | 6 | 7 | 8 | 9 | 1 | | |
| 77 | 2 | 3 | 4 | 1 | 2 | 3 | 1 | 5 | 6 | 7 | 8 | 9 | 1 | 2 | 3 | 4 | | 20 |
| 78 | 2 | 3 | 4 | 1 | 2 | 3 | 1 | 4 | 5 | 6 | 7 | 8 | 9 | 1 | 2 | 3 | | |
| 79 | 2 | 3 | 4 | 1 | 2 | 3 | 1 | 3 | 4 | 5 | 6 | 7 | 8 | 9 | 1 | 2 | | |
| 80 | 2 | 3 | 4 | 1 | 2 | 3 | 1 | 2 | 3 | 4 | 5 | 6 | 7 | 8 | 9 | 1 | | |
| 81 | 1 | 2 | 3 | 4 | 3 | 1 | 2 | 5 | 6 | 7 | 8 | 9 | 1 | 2 | 3 | 4 | C | 21 |
| 82 | 1 | 2 | 3 | 4 | 3 | 1 | 2 | 4 | 5 | 6 | 7 | 8 | 9 | 1 | 2 | 3 | | |
| 83 | 1 | 2 | 3 | 4 | 3 | 1 | 2 | 3 | 4 | 5 | 6 | 7 | 8 | 9 | 1 | 2 | | |
| 84 | 1 | 2 | 3 | 4 | 3 | 1 | 2 | 2 | 3 | 4 | 5 | 6 | 7 | 8 | 9 | 1 | | |
| 85 | 4 | 1 | 2 | 3 | 3 | 1 | 2 | 5 | 6 | 7 | 8 | 9 | 1 | 2 | 3 | 4 | | 22 |
| 86 | 4 | 1 | 2 | 3 | 3 | 1 | 2 | 4 | 5 | 6 | 7 | 8 | 9 | 1 | 2 | 3 | | |
| 87 | 4 | 1 | 2 | 3 | 3 | 1 | 2 | 3 | 4 | 5 | 6 | 7 | 8 | 9 | 1 | 2 | | |
| 88 | 4 | 1 | 2 | 3 | 3 | 1 | 2 | 2 | 3 | 4 | 5 | 6 | 7 | 8 | 9 | 1 | | |
| 89 | 3 | 4 | 1 | 2 | 3 | 1 | 2 | 5 | 6 | 7 | 8 | 9 | 1 | 2 | 3 | 4 | | 23 |
| 90 | 3 | 4 | 1 | 2 | 3 | 1 | 2 | 4 | 5 | 6 | 7 | 8 | 9 | 1 | 2 | 3 | | |
| 91 | 3 | 4 | 1 | 2 | 3 | 1 | 2 | 3 | 4 | 5 | 6 | 7 | 8 | 9 | 1 | 2 | | |
| 92 | 3 | 4 | 1 | 2 | 3 | 1 | 2 | 2 | 3 | 4 | 5 | 6 | 7 | 8 | 9 | 1 | | |
| 93 | 2 | 3 | 4 | 1 | 3 | 1 | 2 | 5 | 6 | 7 | 8 | 9 | 1 | 2 | 3 | 4 | | 24 |
| 94 | 2 | 3 | 4 | 1 | 3 | 1 | 2 | 4 | 5 | 6 | 7 | 8 | 9 | 1 | 2 | 3 | | |
| 95 | 2 | 3 | 4 | 1 | 3 | 1 | 2 | 3 | 4 | 5 | 6 | 7 | 8 | 9 | 1 | 2 | | |
| 96 | 2 | 3 | 4 | 1 | 3 | 1 | 2 | 2 | 3 | 4 | 5 | 6 | 7 | 8 | 9 | 1 | | |

FIG. 4B.

TABLE SHOWING CONNECTIONS OF IMPULSE SOURCES TO GATES OF FIG. 3.

Inventors
MARTINUS DEN HERTOG
CONSTANTINUS DE ZEEUW
HANS HELMUT ADELAAR
By Robert Harding Jr.
Attorney Sept. 7, 1954 M. DEN HERTOG ET AL 2,688,662
MEANS FOR AUTOMATICALLY DETECTING A CHANGE OF CONDITION IN ANY ONE OF A NUMBER OF ELECTRICAL CIRCUITS FROM A COMMON CIRCUIT
Filed Jan. 13, 1951 30 Sheets-Sheet 5
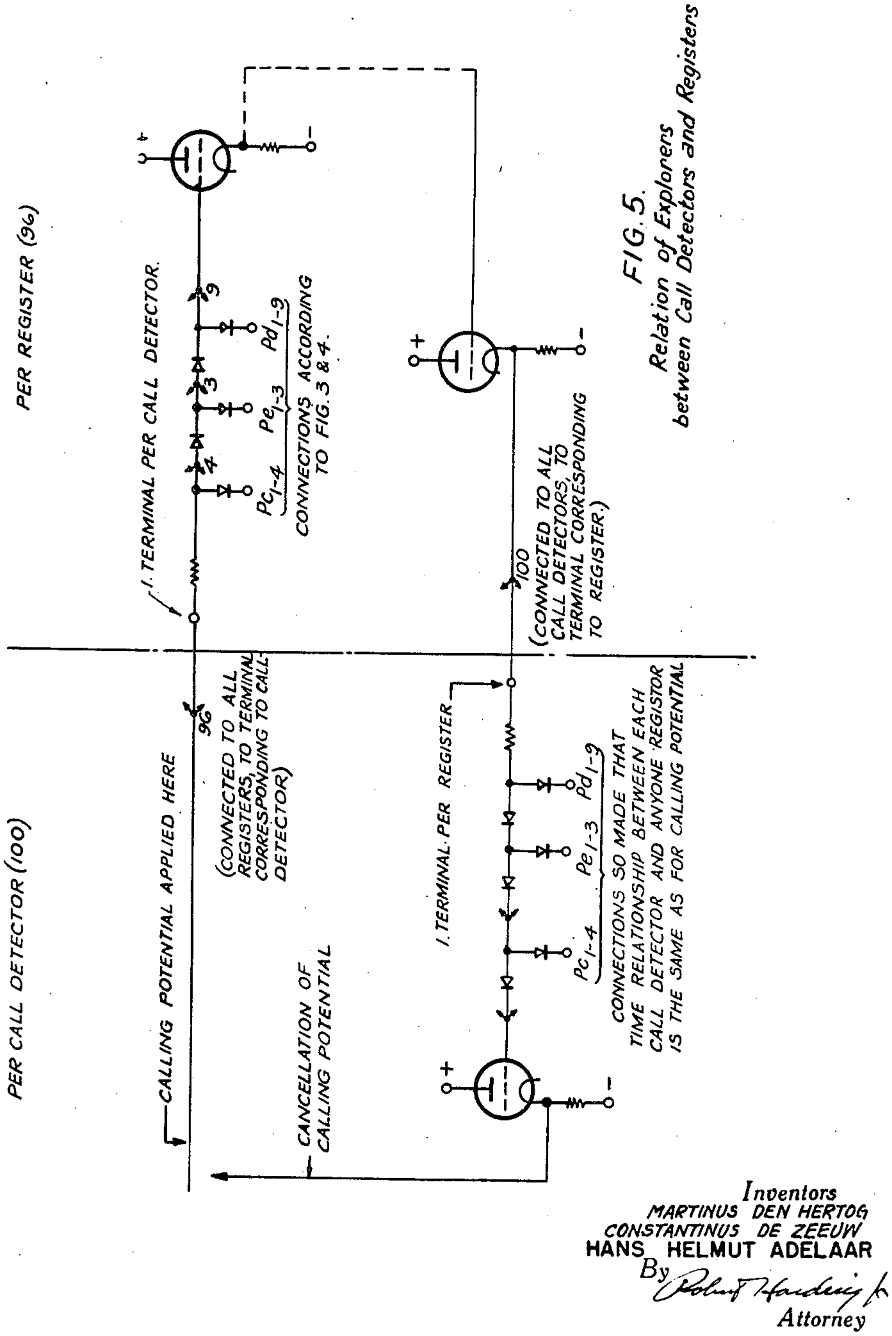
FIG. 5. Relation of Explorers between Call Detectors and Registers
Inventors
MARTINUS DEN HERTOG
CONSTANTINUS DE ZEEUW
HANS HELMUT ADELAAR
By [signature]
Attorney For connection of Terminals A-Q see Fig. 8.

Inventors
MARTINUS DEN HERTOG
CONSTANTINUS DE ZEEUW
HANS HELMUT ADELAAR
By Robert Harding Jr.
Attorney

| CALL DETECTOR Nº | CONNECT TERMINALS | | | | | | | | | | | | | | | | |
|---|---|---|---|---|---|---|---|---|---|---|---|---|---|---|---|---|---|
| | A | B | C | D | E | F | G | H | I | J | K | L | M | N | O | P | Q |
| | TO IMPULSE SOURCES | | | | | | | | | | | | | | | | |
| | Ne | | | Nc | | | | Nd | | | | | | | | | |
| 00 | 1 | 2 | 3 | 1 | 2 | 3 | 4 | 1 | 2 | 3 | 4 | 5 | 6 | 7 | 8 | 9 | 10 |
| 1 | | | | 3 | 4 | 1 | 2 | | | | | | | | | | |
| 2 | | | | 2 | 3 | 4 | 1 | | | | | | | | | | |
| 3 | | | | 4 | 1 | 2 | 3 | | | | | | | | | | |
| 4 | 2 | 3 | 1 | 1 | 2 | 3 | 4 | | | | | | | | | | |
| 5 | | | | 3 | 4 | 1 | 2 | | | | | | | | | | |
| 6 | | | | 2 | 3 | 4 | 1 | | | | | | | | | | |
| 7 | | | | 4 | 1 | 2 | 3 | | | | | | | | | | |
| 8 | 3 | 1 | 2 | 1 | 2 | 3 | 4 | | | | | | | | | | |
| 9 | | | | 3 | 4 | 1 | 2 | | | | | | | | | | |
| 10 | | | | 2 | 3 | 4 | 1 | | | | | | | | | | |
| 1 | | | | 4 | 1 | 2 | 3 | | | | | | | | | | |
| 2 | 1 | 2 | 3 | 1 | 2 | 3 | 4 | 2 | 3 | 4 | 5 | 6 | 7 | 8 | 9 | 10 | 11 |
| 3 | | | | 3 | 4 | 1 | 2 | | | | | | | | | | |
| 4 | | | | 2 | 3 | 4 | 1 | | | | | | | | | | |
| 5 | | | | 4 | 1 | 2 | 3 | | | | | | | | | | |
| 6 | 2 | 3 | 1 | 1 | 2 | 3 | 4 | | | | | | | | | | |
| 7 | | | | 3 | 4 | 1 | 2 | | | | | | | | | | |
| 8 | | | | 2 | 3 | 4 | 1 | | | | | | | | | | |
| 9 | | | | 4 | 1 | 2 | 3 | | | | | | | | | | |
| 20 | 3 | 1 | 2 | 1 | 2 | 3 | 4 | | | | | | | | | | |
| 1 | | | | 3 | 4 | 1 | 2 | | | | | | | | | | |
| 2 | | | | 2 | 3 | 4 | 1 | | | | | | | | | | |
| 3 | | | | 4 | 1 | 2 | 3 | | | | | | | | | | |
| 4 | 1 | 2 | 3 | 1 | 2 | 3 | 4 | 3 | 4 | 5 | 6 | 7 | 8 | 9 | 10 | 11 | 1 |
| 5 | | | | 3 | 4 | 1 | 2 | | | | | | | | | | |
| 6 | | | | 2 | 3 | 4 | 1 | | | | | | | | | | |
| 7 | | | | 4 | 1 | 2 | 3 | | | | | | | | | | |
| 8 | 2 | 3 | 1 | 1 | 2 | 3 | 4 | | | | | | | | | | |
| 9 | | | | 3 | 4 | 1 | 2 | | | | | | | | | | |
| 30 | | | | 2 | 3 | 4 | 1 | | | | | | | | | | |
| 1 | | | | 4 | 1 | 2 | 3 | | | | | | | | | | |
| 2 | 3 | 1 | 2 | 1 | 2 | 3 | 4 | | | | | | | | | | |
| 3 | | | | 3 | 4 | 1 | 2 | | | | | | | | | | |
| 4 | | | | 2 | 3 | 4 | 1 | | | | | | | | | | |
| 5 | | | | 4 | 1 | 2 | 3 | | | | | | | | | | |
| 6 | 1 | 2 | 3 | 1 | 2 | 3 | 4 | 4 | 5 | 6 | 7 | 8 | 9 | 10 | 11 | 1 | 2 |
| 7 | | | | 3 | 4 | 1 | 2 | | | | | | | | | | |
| 8 | | | | 2 | 3 | 4 | 1 | | | | | | | | | | |
| 9 | | | | 4 | 1 | 2 | 3 | | | | | | | | | | |
| 40 | 2 | 3 | 1 | 1 | 2 | 3 | 4 | | | | | | | | | | |
| 1 | | | | 3 | 4 | 1 | 2 | | | | | | | | | | |
| 2 | | | | 2 | 3 | 4 | 1 | | | | | | | | | | |
| 3 | | | | 4 | 1 | 2 | 3 | | | | | | | | | | |
| 4 | 3 | 1 | 2 | 1 | 2 | 3 | 4 | | | | | | | | | | |
| 5 | | | | 3 | 4 | 1 | 2 | | | | | | | | | | |
| 6 | | | | 2 | 3 | 4 | 1 | | | | | | | | | | |
| 7 | | | | 4 | 1 | 2 | 3 | | | | | | | | | | |

FIG. 8A.

CONNECTION OF SOURCES TO EXPLORER OF CALL DETECTOR

Inventors
MARTINUS DEN HERTOG
CONSTANTINUS DE ZEEUW
HANS HELMUT ADELAAR
By Robert Harding
Attorney Sept. 7, 1954 M. DEN HERTOG ET AL 2,688,662
MEANS FOR AUTOMATICALLY DETECTING A CHANGE OF CONDITION
IN ANY ONE OF A NUMBER OF ELECTRICAL
CIRCUITS FROM A COMMON CIRCUIT
Filed Jan. 13, 1951 30 Sheets-Sheet 8

CONNECTION OF SOURCES TO
EXPLORER OF CALL DETECTOR.

Inventors
MARTINUS DEN HERTOG
CONSTANTINUS DE ZEEUW
HANS HELMUT ADELAAR
By Robert Harding Jr.
Attorney Inventors
MARTINUS DEN HERTOG
CONSTANTINUS DE ZEEUW
HANS HELMUT ADELAAR
By [signature]
Attorney

CONNECT TERMINALS … TO IMPULSE SOURCES

| REGISTER MAIN GROUP | FOR REGISTER | A (Nc) | B (Nc) | C (Nc) | D (Nc) | E (Ne) | F (Ne) | G (Ne) | H (Nd) | I (Nd) | J (Nd) | K (Nd) | L (Nd) | M (Nd) | N (Nd) | O (Nd) | P (Nd) |
|---|---|---|---|---|---|---|---|---|---|---|---|---|---|---|---|---|---|
| | A - 1 | | | | | | | | 2 | 3 | 4 | 5 | 6 | 7 | 8 | 9 | 10 |
| | (B) - 2 | | | | | | | | 3 | 4 | 5 | 6 | 7 | 8 | 9 | 10 | 11 |
| | [C] - 3 | | | | | | | | 4 | 5 | 6 | 7 | 8 | 9 | 10 | 11 | 1 |
| | 4 | | | | | | | | 5 | 6 | 7 | 8 | 9 | 10 | 11 | 1 | 2 |
| | 5 | 2 | 4 | 3 | 1 | | | | 6 | 7 | 8 | 9 | 10 | 11 | 1 | 2 | 3 |
| | 6 | | | | | | | | 7 | 8 | 9 | 10 | 11 | 1 | 2 | 3 | 4 |
| | 7 | | | | | | | | 8 | 9 | 10 | 11 | 1 | 2 | 3 | 4 | 5 |
| | 8 | | | | | | | | 9 | 10 | 11 | 1 | 2 | 3 | 4 | 5 | 6 |
| | 9 | | | | | | | | 10 | 11 | 1 | 2 | 3 | 4 | 5 | 6 | 7 |
| | 10 | | | | | | | | 11 | 1 | 2 | 3 | 4 | 5 | 6 | 7 | 8 |
| | 11 | | | | | | | | 2 | 3 | 4 | 5 | 6 | 7 | 8 | 9 | 10 |
| | 12 | | | | | | | | 3 | 4 | 5 | 6 | 7 | 8 | 9 | 10 | 11 |
| | 13 | | | | | | | | 4 | 5 | 6 | 7 | 8 | 9 | 10 | 11 | 1 |
| | 14 | | | | | | | | 5 | 6 | 7 | 8 | 9 | 10 | 11 | 1 | 2 |
| | 15 | 3 | 1 | 4 | 2 | | | | 6 | 7 | 8 | 9 | 10 | 11 | 1 | 2 | 3 |
| | 16 | | | | | | | | 7 | 8 | 9 | 10 | 11 | 1 | 2 | 3 | 4 |
| | 17 | | | | | | | | 8 | 9 | 10 | 11 | 1 | 2 | 3 | 4 | 5 |
| | 18 | | | | | | | | 9 | 10 | 11 | 1 | 2 | 3 | 4 | 5 | 6 |
| | 19 | | | | | | | | 10 | 11 | 1 | 2 | 3 | 4 | 5 | 6 | 7 |
| A (B) [C] | 20 | | | | | 2 (3) [1] | 3 (1) [2] | 1 (2) [3] | 11 | 1 | 2 | 3 | 4 | 5 | 6 | 7 | 8 |
| | 21 | | | | | | | | 2 | 3 | 4 | 5 | 6 | 7 | 8 | 9 | 10 |
| | 22 | | | | | | | | 3 | 4 | 5 | 6 | 7 | 8 | 9 | 10 | 11 |
| | 23 | | | | | | | | 4 | 5 | 6 | 7 | 8 | 9 | 10 | 11 | 1 |
| | 24 | | | | | | | | 5 | 6 | 7 | 8 | 9 | 10 | 11 | 1 | 2 |
| | 25 | 4 | 2 | 1 | 3 | | | | 6 | 7 | 8 | 9 | 10 | 11 | 1 | 2 | 3 |
| | 26 | | | | | | | | 7 | 8 | 9 | 10 | 11 | 1 | 2 | 3 | 4 |
| | 27 | | | | | | | | 8 | 9 | 10 | 11 | 1 | 2 | 3 | 4 | 5 |
| | 28 | | | | | | | | 9 | 10 | 11 | 1 | 2 | 3 | 4 | 5 | 6 |
| | 29 | | | | | | | | 10 | 11 | 1 | 2 | 3 | 4 | 5 | 6 | 7 |
| | 30 | | | | | | | | 11 | 1 | 2 | 3 | 4 | 5 | 6 | 7 | 8 |
| | 31 | | | | | | | | 2 | 3 | 4 | 5 | 6 | 7 | 8 | 9 | 10 |
| | 32 | | | | | | | | 3 | 4 | 5 | 6 | 7 | 8 | 9 | 10 | 11 |
| | 33 | | | | | | | | 4 | 5 | 6 | 7 | 8 | 9 | 10 | 11 | 1 |
| | 34 | | | | | | | | 5 | 6 | 7 | 8 | 9 | 10 | 11 | 1 | 2 |
| | 35 | 1 | 3 | 2 | 4 | | | | 6 | 7 | 8 | 9 | 10 | 11 | 1 | 2 | 3 |
| | 36 | | | | | | | | 7 | 8 | 9 | 10 | 11 | 1 | 2 | 3 | 4 |
| | 37 | | | | | | | | 8 | 9 | 10 | 11 | 1 | 2 | 3 | 4 | 5 |
| | 38 | | | | | | | | 9 | 10 | 11 | 1 | 2 | 3 | 4 | 5 | 6 |
| | 39 | | | | | | | | 10 | 11 | 1 | 2 | 3 | 4 | 5 | 6 | 7 |
| | 40 | | | | | | | | 11 | 1 | 2 | 3 | 4 | 5 | 6 | 7 | 8 |

EXAMPLES OF DIVISION OF REGISTERS INTO SUB GROUP

| 3×(8×4) | 3×(7×5) | 3×{4×4, 4×5} |
|---|---|---|
| A-1 (B-1) [C-1] | A-1 (B-1) [C-1] | A-1 (B-1) [C-1] |
| A-2 (B-2) [C-2] | A-2 (B-2) [C-2] | A-2 (B-2) [C-2] |
| A-3 (B-3) [C-3] | A-3 (B-3) [C-3] | A-3 (B-3) [C-3] |
| A-4 (B-4) [C-4] | A-4 (B-4) [C-4] | A-4 (B-4) [C-4] |
| A-5 (B-5) [C-5] | A-5 (B-5) [C-5] | A-5 (B-5) [C-5] |
| A-6 (B-6) [C-6] | A-6 (B-6) [C-6] | A-6 (B-6) [C-6] |
| A-7 (B-7) [C-7] | A-7 (B-7) [C-7] | A-7 (B-7) [C-7] |
| A-8 (B-6) [C-8] | | A-8 (B-8) [C-8] |

FIG. 10.

CONNECTION OF SOURCES TO EXPLORER OF REGISTER, AS SHOWN ON FIG. 9, ASSUMING CORDS AND REGISTERS ARE DIVIDED INTO THREE MAIN GROUPS (A, B & C).

Inventors
MARTINUS DEN HERTOG
CONSTANTINUS DE ZEEUW
HANS HELMUT ADELAAR
By Robert Harding Jr.
Attorney Sept. 7, 1954 M. DEN HERTOG ET AL 2,688,662

MEANS FOR AUTOMATICALLY DETECTING A CHANGE OF CONDITION
IN ANY ONE OF A NUMBER OF ELECTRICAL
CIRCUITS FROM A COMMON CIRCUIT

Filed Jan. 13, 1951 30 Sheets-Sheet 11

Inventors
MARTINUS DEN HERTOG
CONSTANTINUS DE ZEEUW
HANS HELMUT ADELAAR
By Robert Harding Jr.
Attorney Sept. 7, 1954 M. DEN HERTOG ET AL 2,688,662

MEANS FOR AUTOMATICALLY DETECTING A CHANGE OF CONDITION IN ANY ONE OF A NUMBER OF ELECTRICAL CIRCUITS FROM A COMMON CIRCUIT

Filed Jan. 13, 1951 30 Sheets-Sheet 12

Inventors
MARTINUS DEN HERTOG
CONSTANTINUS DE ZEEUW
HANS HELMUT ADELAAR
By [signature]
Attorney Inventors
MARTINUS DEN HERTOG
CONSTANTINUS DE ZEEUW
HANS HELMUT ADELAAR
By Robert Harding Jr.
Attorney Inventors
MARTINUS DEN HERTOG
CONSTANTINUS DE ZEEUW
HANS HELMUT ADELAAR
By Robert Harding Jr.
Attorney Inventors
MARTINUS DEN HERTOG
CONSTANTINUS DE ZEEUW
HANS HELMUT ADELAAR
By Robert Harding Jr.
Attorney Inventors
MARTINUS DEN HERTOG
CONSTANTINUS DE ZEEUW
HANS HELMUT ADELAAR
By Robert Harding Jr.
Attorney Sept. 7, 1954 M. DEN HERTOG ET AL 2,688,662

MEANS FOR AUTOMATICALLY DETECTING A CHANGE OF CONDITION IN ANY ONE OF A NUMBER OF ELECTRICAL CIRCUITS FROM A COMMON CIRCUIT

Filed Jan. 13, 1951 30 Sheets-Sheet 17

Inventors
MARTINUS DEN HERTOG
CONSTANTINUS DE ZEEUW
HANS HELMUT ADELAAR
By Robert Harding
Attorney MEANS FOR AUTOMATICALLY DETECTING A CHANGE OF CONDITION IN ANY ONE OF A NUMBER OF ELECTRICAL CIRCUITS FROM A COMMON CIRCUIT Filed Jan. 13, 1951 30 Sheets-Sheet 18

Inventors
MARTINUS DEN HERTOG
CONSTANTINUS DE ZEEUW
HANS HELMUT ADELAAR
By Robert Harding Jr.
Attorney Inventors
MARTINUS DEN HERTOG
CONSTANTINUS DE ZEEUW
HANS HELMUT ADELAAR
By Robert Harding Jr.
Attorney MEANS FOR AUTOMATICALLY DETECTING A CHANGE OF CONDITION IN ANY ONE OF A NUMBER OF ELECTRICAL CIRCUITS FROM A COMMON CIRCUIT Filed Jan. 13, 1951

Inventors
MARTINUS DEN HERTOG
CONSTANTINUS DE ZEEUW
HANS HELMUT ADELAAR
By Robert Harding Jr.
Attorney Sept. 7, 1954 M. DEN HERTOG ET AL 2,688,662

MEANS FOR AUTOMATICALLY DETECTING A CHANGE OF CONDITION IN ANY ONE OF A NUMBER OF ELECTRICAL CIRCUITS FROM A COMMON CIRCUIT

Filed Jan. 13, 1951 30 Sheets-Sheet 21

Inventors
MARTINUS DEN HERTOG
CONSTANTINUS DE ZEEUW
HANS HELMUT ADELAAR
By Robert Harding Jr.
Attorney Inventors
MARTINUS DEN HERTOG
CONSTANTINUS DE ZEEUW
HANS HELMUT ADELAAR
By Robert Harding Jr.
Attorney Inventors
MARTINUS DEN HERTOG
CONSTANTINUS DE ZEEUW
HANS HELMUT ADELAAR
By Robert Harding Jr.
Attorney Sept. 7, 1954 M. DEN HERTOG ET AL 2,688,662

MEANS FOR AUTOMATICALLY DETECTING A CHANGE OF CONDITION IN ANY ONE OF A NUMBER OF ELECTRICAL CIRCUITS FROM A COMMON CIRCUIT

Filed Jan. 13, 1951 30 Sheets-Sheet 24

Inventors
MARTINUS DEN HERTOG
CONSTANTINUS DE ZEEUW
HANS HELMUT ADELAAR
By Robert Harding Jr.
Attorney MEANS FOR AUTOMATICALLY DETECTING A CHANGE OF CONDITION IN ANY ONE OF A NUMBER OF ELECTRICAL CIRCUITS FROM A COMMON CIRCUIT Inventors
MARTINUS DEN HERTOG
CONSTANTINUS DE ZEEUW
HANS HELMUT ADELAAR
By Robert Harding Jr.
Attorney Inventors
MARTINUS DEN HERTOG
CONSTANTINUS DE ZEEUW
HANS HELMUT ADELAAR
By Robert Harding Jr.
Attorney Inventors
MARTINUS DEN HERTOG
CONSTANTINUS DE ZEEUW
HANS HELMUT ADELAAR
By [signature]
Attorney MEANS FOR AUTOMATICALLY DETECTING A CHANGE OF CONDITION IN ANY ONE OF A NUMBER OF ELECTRICAL CIRCUITS FROM A COMMON CIRCUIT Inventors
MARTINUS DEN HERTOG
CONSTANTINUS DE ZEEUW
HANS HELMUT ADELAAR
By Robert Harding Jr.
Attorney Sept. 7, 1954 M. DEN HERTOG ET AL 2,688,662

MEANS FOR AUTOMATICALLY DETECTING A CHANGE OF CONDITION IN ANY ONE OF A NUMBER OF ELECTRICAL CIRCUITS FROM A COMMON CIRCUIT

Filed Jan. 13, 1951 30 Sheets-Sheet 29

Inventors
MARTINUS DEN HERTOG
CONSTANTINUS DE ZEEUW
HANS HELMUT ADELAAR
By [signature]
Attorney Inventors
MARTINUS DEN HERTOG
CONSTANTINUS DE ZEEUW
HANS HELMUT ADELAAR
By Robert Harding Jr.
Attorney Patented Sept. 7, 1954 2,688,662

UNITED STATES PATENT OFFICE 2,688,662

MEANS FOR AUTOMATICALLY DETECTING A CHANGE OF CONDITION IN ANY ONE OF A NUMBER OF ELECTRICAL CIRCUITS FROM A COMMON CIRCUIT

Martinus den Hertog, Constantinus de Zeeuw, and Hans Helmut Adelaar, Antwerp, Belgium, assignors to International Standard Electric Corporation, New York, N. Y.

Application January 13, 1951, Serial No. 205,917

Claims priority, application Great Britain January 16, 1950

19 Claims. (Cl. 179—18)

This invention relates to circuit arrangements comprising a first set of similar electrical circuits, a second set of similar electrical circuits and means for automatically connecting together a circuit from said first set and a circuit from said second set.

More particularly, but not exclusively, the invention relates to the seizure of register controllers in automatic telecommunication exchange systems.

One feature of the present invention comprises a circuit arrangement comprising a first set of similar electrical circuits, a second set of similar electrical circuits and means for offering electrical circuits of the two sets to each other in a repetitive cycle of time positions.

Another feature of the present invention comprises, in or for an automatic telecommunication exchange, equipment which comprises call detectors each adapted to generate a calling condition in response to initiation of a call by any one of a group of subscribers, register controllers, and means for offering said call detectors and said register controllers to each other in a repetitive cycle of time positions.

Another feature of the present invention comprises an automatic telecommunication exchange which comprises subscribers' lines and a register controller having means for automatically and directly testing for a calling condition due to any one of said subscribers' lines in a repetitive cycle of time positions.

Another feature of the present invention comprises equipment for use in an automatic telecommunication exchange which comprises means for automatically and directly testing for a calling condition due to any one of a plurality of subscribers' lines in a repetitive cycle of time positions.

The invention will be described with reference to the accompanying drawings in which:

Figs. 4A and 4B shows tables giving connections of impulse sources to gates in Fig. 3.

Fig. 5 shows the explorer arrangements between call detectors and registers.

Figs. 8A and 8B show a table giving connections of impulse sources to gates in Fig. 9.

Fig. 10 is a further table whose significance will be described.

Figure 12A:
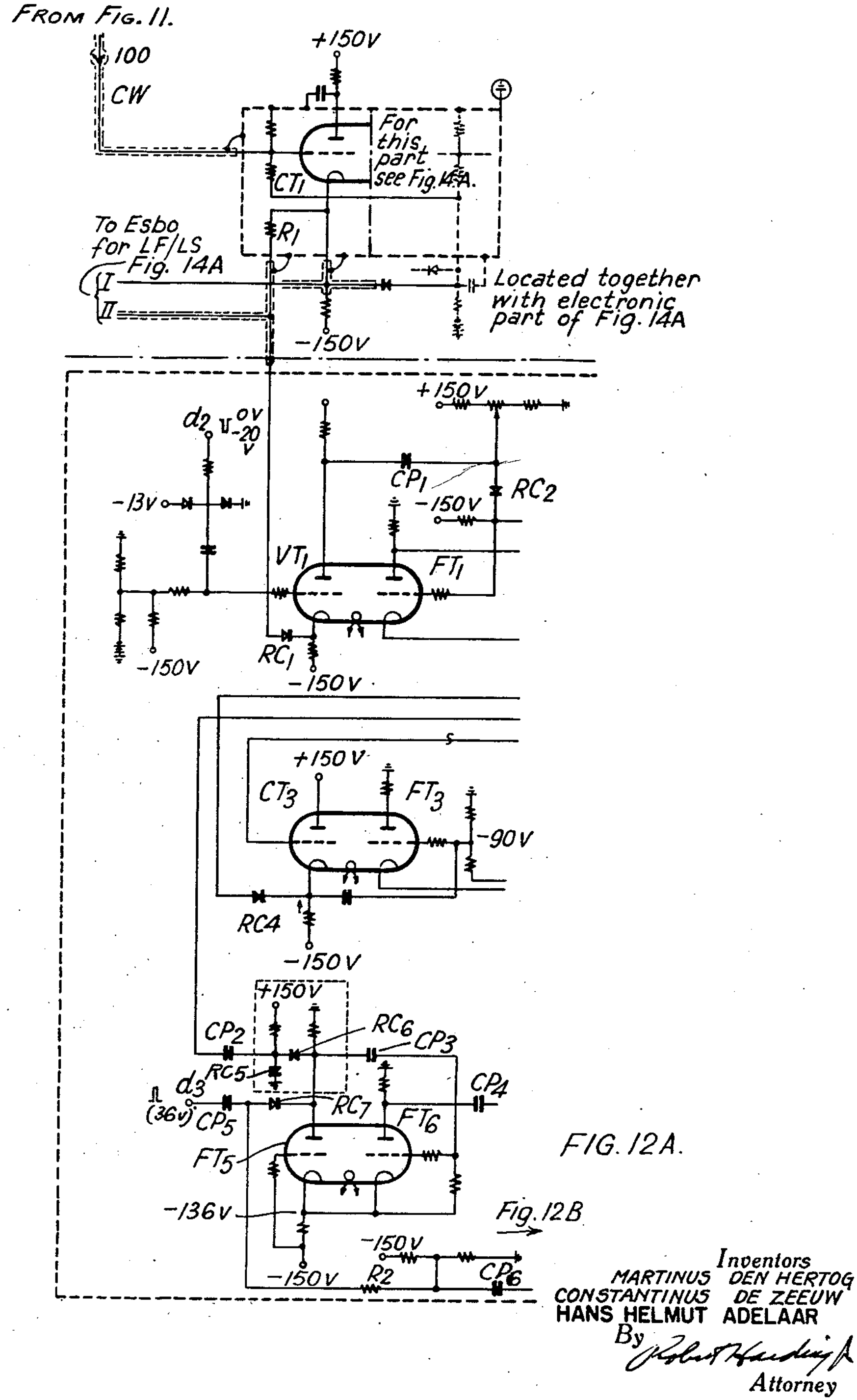
Figure 12B:
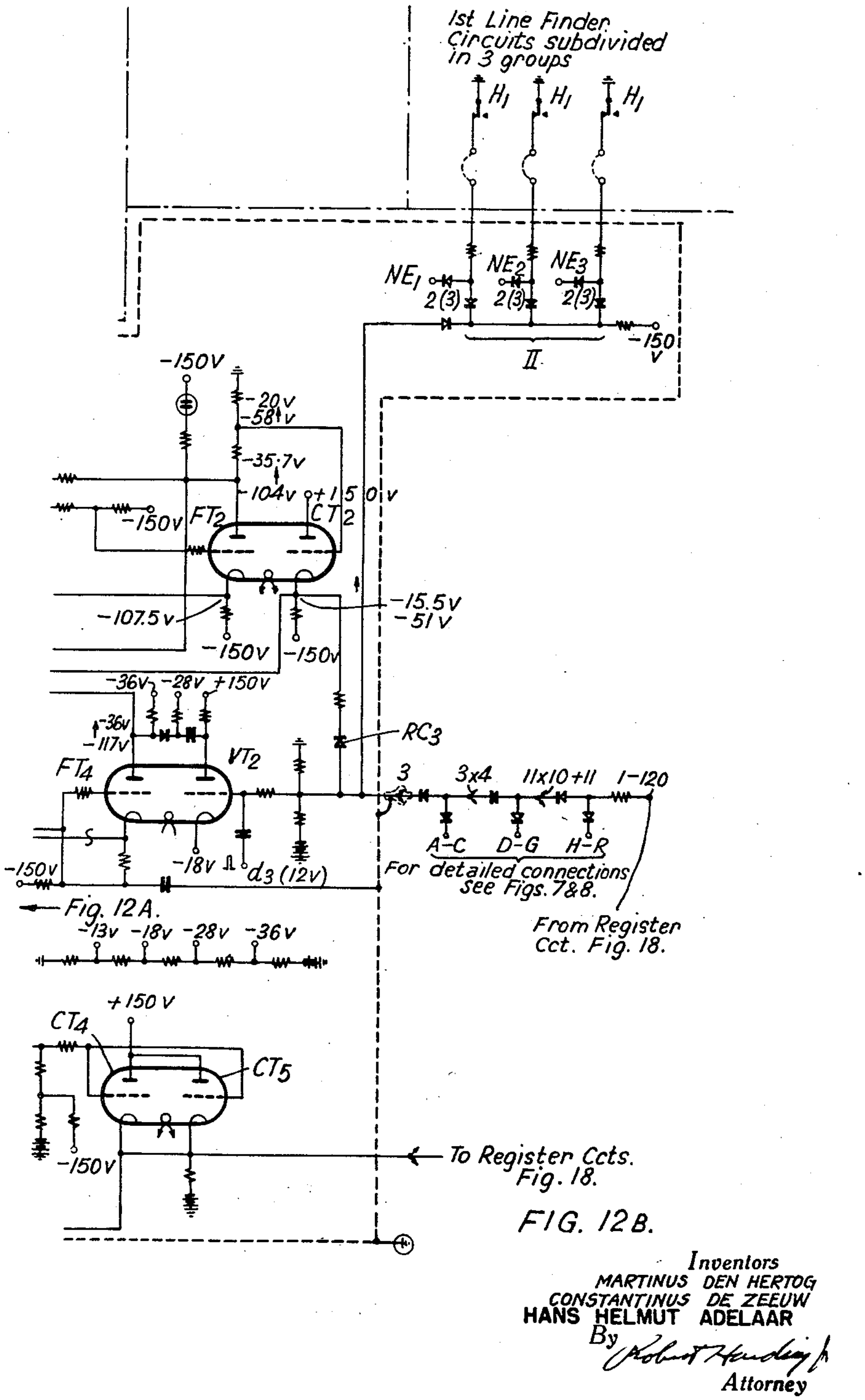

Figs. 12A and 12B, of which Fig. 12B should be placed to the right of Fig. 12A, is a call detector circuit.

Figure 13:
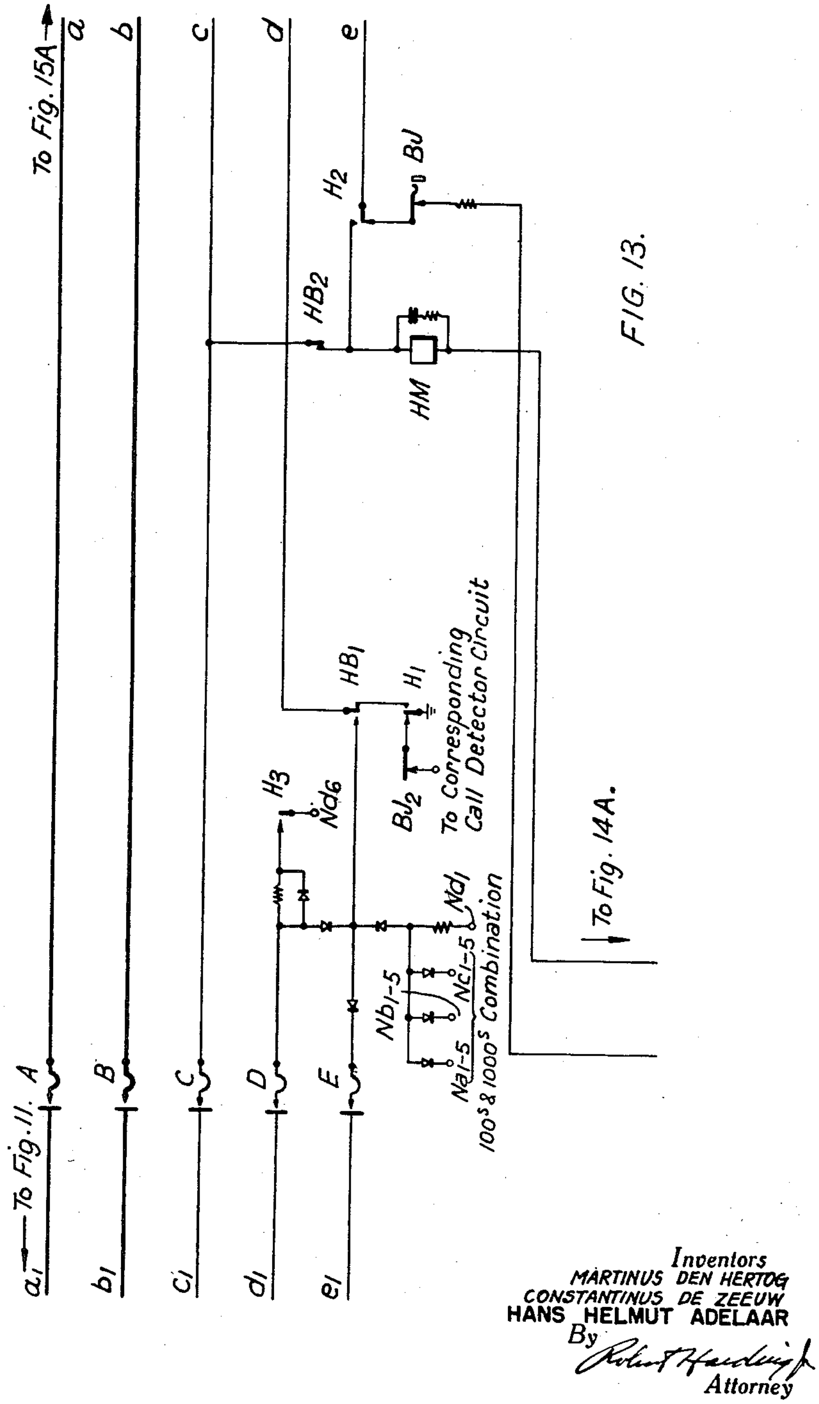

Fig. 13 is a first line finder circuit.

Figure 14A:
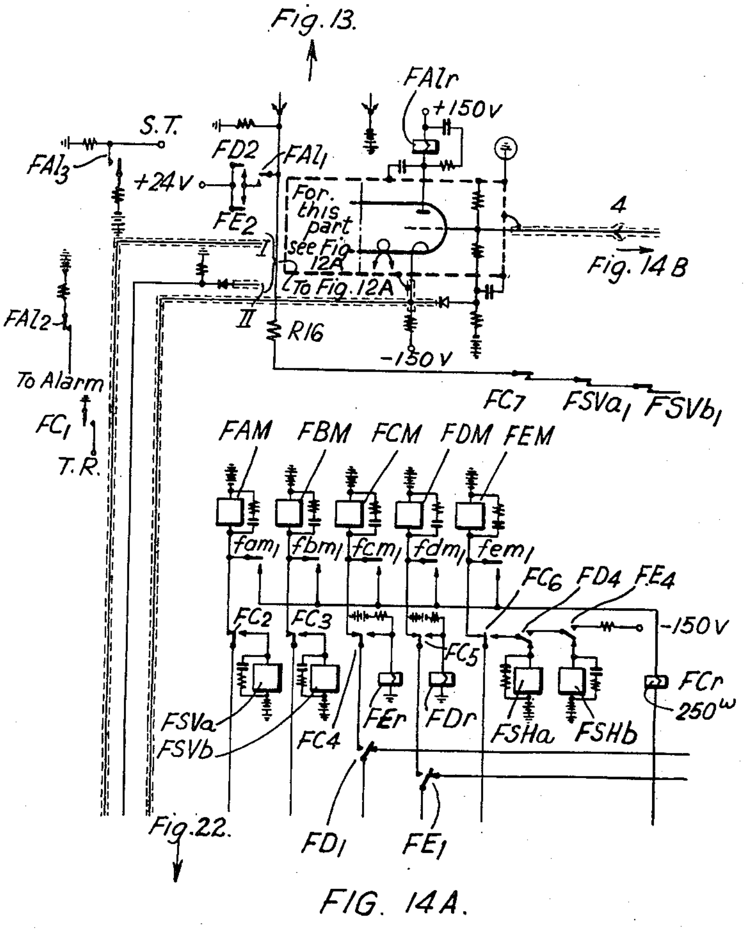
Figure 14B:
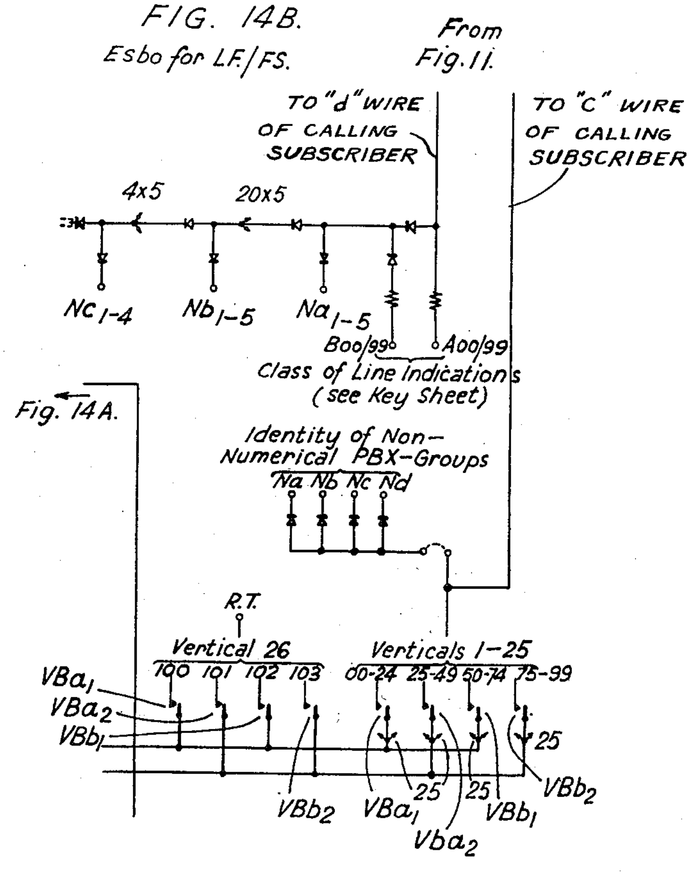

Figs. 14A and 14B, of which Fig. 14B should be placed to the right of Fig. 14A, is a control circuit for a first line finder final selector.

Figures 15A, 22:
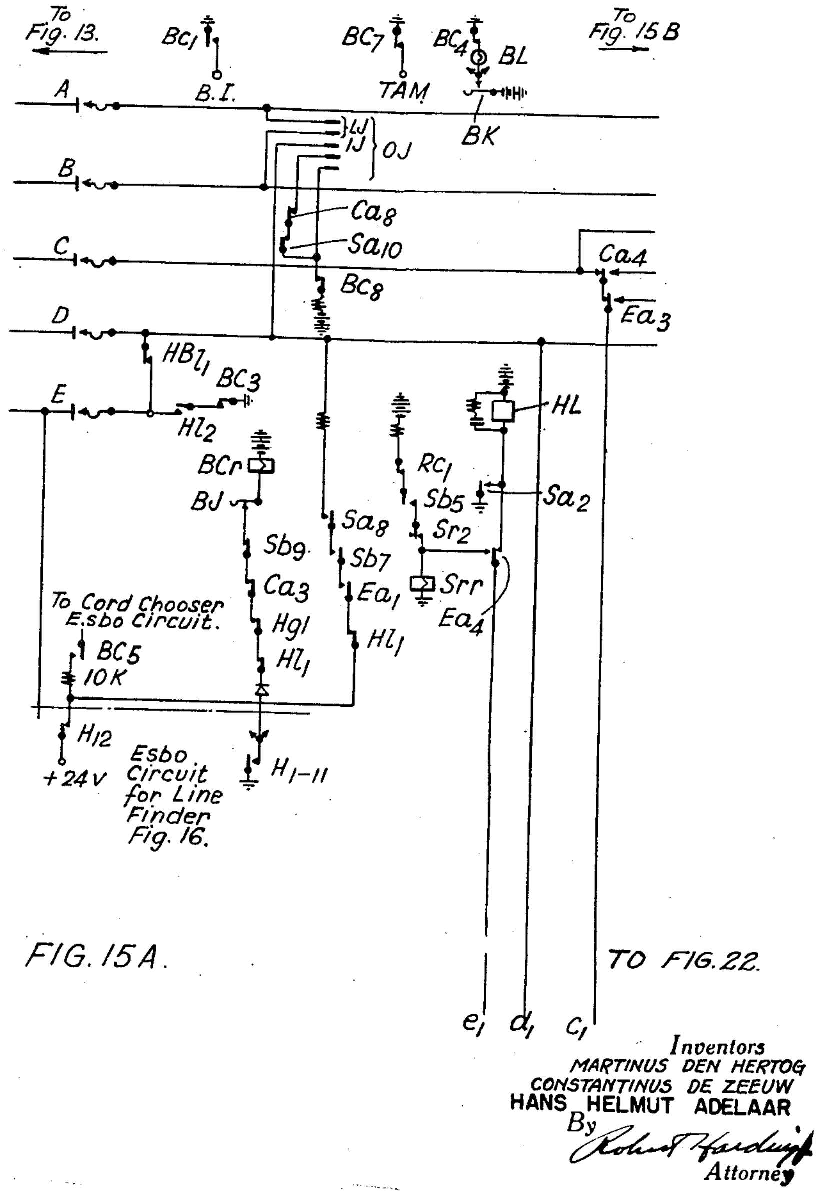
Figure 15B:
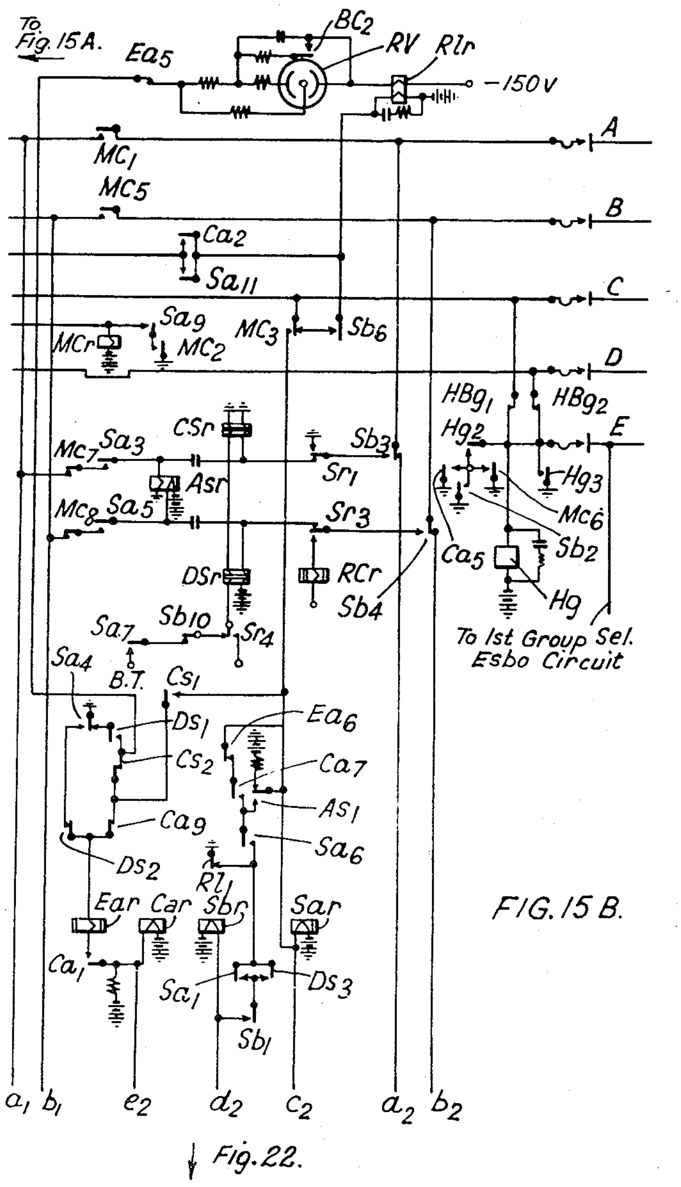

Figs. 15A and 15B, of which Fig. 15B should be placed to the right of Fig. 15A, shows a cord circuit.

Figure 16:
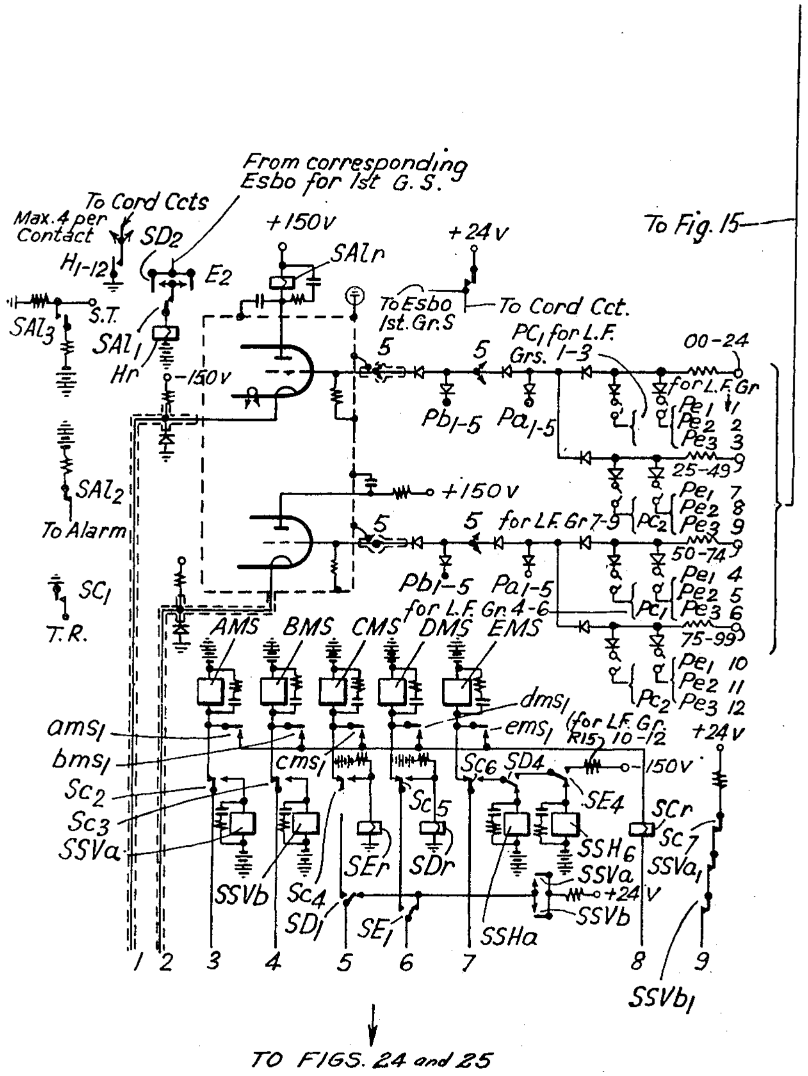

Fig. 16 shows a control circuit for a second line finder.

Figure 17:
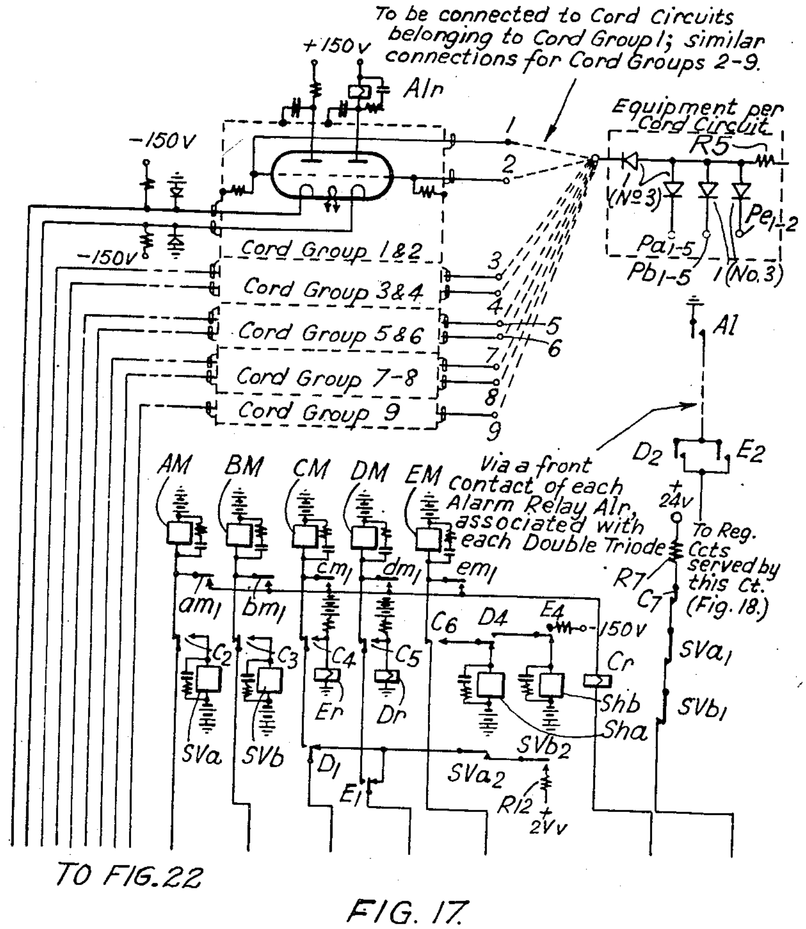

Fig. 17 is a control circuit for a cord chooser circuit.

Figs. 18–25 show the register circuit.

Figure 26:
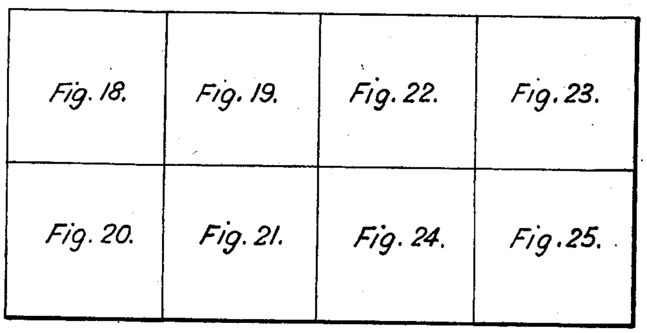

Fig. 26 shows how Figs. 18 to 25 should be arranged.

Figure 27:
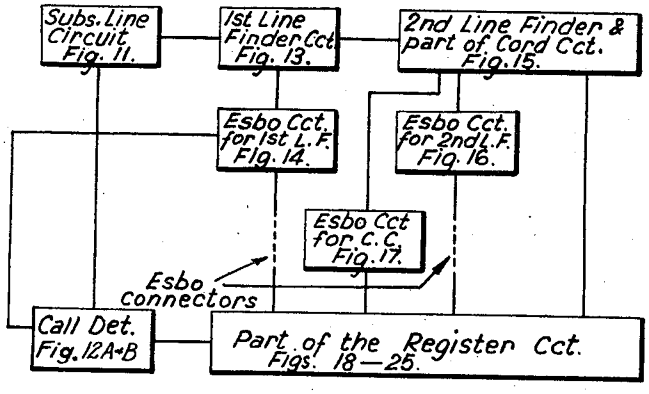

Fig. 27 is a key diagram for the system, whilst

Figure 28:
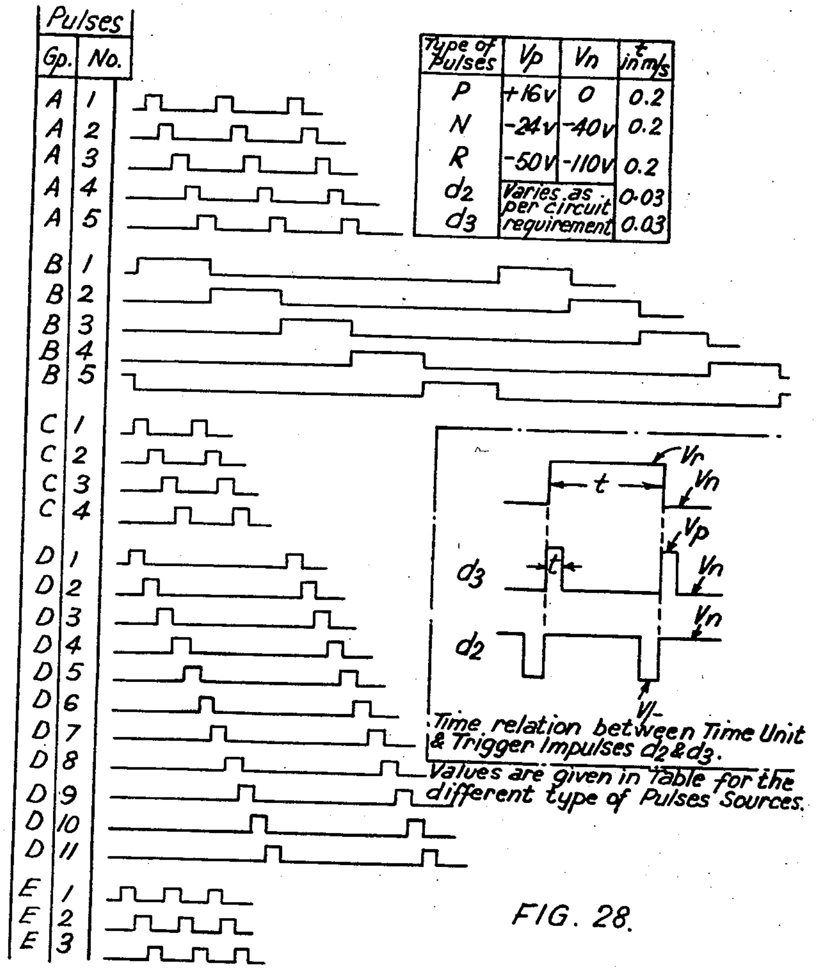

Fig. 28 represents the inter-relation of the impulses used.

Figure 1:
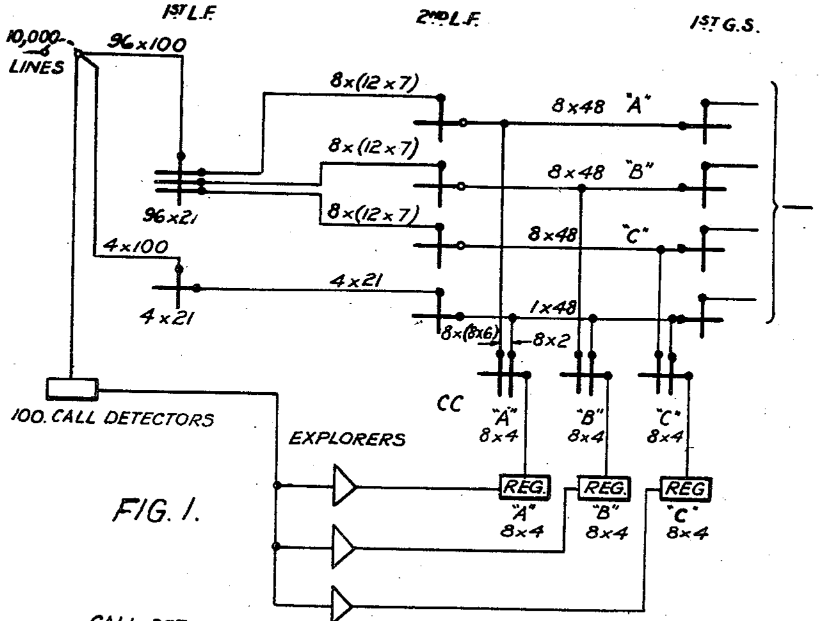
Fig. 1 shows schematically the equipment for detecting calls, for seizing a register controller and for connecting the register controller via line finders to the calling line.

The arrangement shown in Fig. 1 is a variation of the exchange lay-out described in U. S. applications, Serial No. 171,341, and Serial No. 175,704, filed respectively June 30, 1950, and July 25, 1950. Relay-less line circuits are used and these are associated with call detectors, one per hundred lines. In the previous specifications referred to above, these call detectors were provided with forward hunting equipment including mechanical connecting devices for selecting either cord circuits or register controllers for setting up connections.

In the present case, interconnection between the register controlling equipment and the call detectors is carried out in the opposite direction by means of a static scanning equipment or explorer per register which is continuously looking for an operated call detector out of a group of call detectors, which may be the complete group for an exchange. A register finding a calling condition then connects itself via a cord chooser to a cord circuit comprising a line finder and 1st group selector.

The static scanning equipment or explorer, referred to may be of the type disclosed in the U. S. Patent No. 2,563,589, issued on August 7, 1951, to Martinus den Hertog. The same type of circuit is used in a number of different places in the circuit of the invention and is referred to herewith as an "explorer."

In the case to be described for a 10,000-line exchange, the line finders of the cord circuits are second line finders and these in turn are connected by first line finders to the sub-station line circuits.

The broad sequence of operations for the equipment shown is, therefore, that a call on a sub-station line is detected via the relay-less line circuit by the common call detector; the call detector generates a calling condition which is detected by the static scanning equipment or explorer of a free register which in turn connects itself via its cord chooser to a free associated cord circuit having access to the calling line. The register then, by means to be disclosed in later figures and described in a later part of this specification, controls the setting of second and first line finders to make connection to the calling line.

The scanning equipment or explorer of the registers operates on a time-pulse basis, and the pulse cycles used can be chosen to accord with any desired grouping of the cord circuits and line finders. This allows the registers and cord circuits which are the most expensive equipments in an exchange, to be arranged in substantially ideal groups in a manner which will be described with reference to an example of a typical exchange showing a preferred type of grouping with respect to size and traffic density.

Fig. 1 shows this exchange which has been laid out for an equipment of 10,000 lines, having a traffic rate of approximately 10 Erlang per one hundred lines in the busy hour. With this traffic rate, the number of line finders required per group of a hundred sub-stations is assumed to be 21, and in order to obtain the most economical arrangement with regard to the number of cords required, one group of cords is made to serve 12 groups of 100 subscriber lines, so that the number of cords may be calculated on the basis that each group of cords handles the traffic of 1200 lines. In this case the number of these cords amounts to 144 per group of 1200 lines. There are eight of these groups provided in this exchange and in addition one small group of 48 cords, which takes care of the remaining four groups of a hundred subscriber lines with numbers 9600 to 9999, when these are finally equipped.

Each group of 144 cords is, in the case of the typical exchange assumed, divided into three sub-groups, so that, with second line finders having a capacity for the connection of hundred first line finders, the total number of first line finders that may be connected to the three sub-groups of second line finders is 3×100. The number of first line finders actually to be connected per group of 1200 lines equals 12×21=252.

The first line finders of each group of a hundred lines are distributed over the three sub-groups of second line finders, so that an equal number of line finders of each group of a hundred lines is connected to each sub-group. In this way the calls from each group of a hundred lines will be equally distributed over the three sub-groups of cord circuits constituting one main group.

In the particular conditions assumed for the exchange shown, the number of registers required has been calculated to be 96 and these registers are divided also into three sub-groups. These are connected to the cord circuits via cord choosers in such a manner that the registers of the first sub-group A give access to all cord circuits of the first sub-group A of all 8 main groups; the registers of the second sub-group B are given access to all cord circuits of the second sub-group B of all main groups; and in a similar manner the third sub-group C gives access to all cord circuits of sub-group C of all main groups.

The cord choosers CC are assumed to have a capacity for the connection of 50 cord circuits, so that the registers of each main group have to be divided into 8 sub-groups, each associated with a multiple group of cord choosers, in order that for each main group of register circuits a total of 8×50 cord circuits may be connected. The total number of cords to be connected to a main group of registers in the example shown equals 8×48 (for a sub-group of each of 8 main groups of cords), plus one third of the cord circuits serving the last 400 lines, i. e.

$$\frac{48}{3}$$

which totals 400.

The cord choosers of each sub-group of registers are multiplied over 50 cords in such a manner that access is obtained to 6 cords in each of the 8 sub-groups of cords, and to $$\frac{16}{8}=2 \text{ cords}$$

of the last group.

When considering this distribution from the point of view of the cord circuits, it may be considered that each main group of 144 cord circuits serving 1200 lines is subdivided into 24 small sub-divisions of each six cords, each of which sub-divisions has access to a different sub-group of four registers, the registers being also divided into 24 sub-groups. This means that from each main group of cord circuits access is given to all registers of the exchange.

The scanners or explorers by means of which the registers detect the calling condition of any call detector of the exchange, have been so arranged that all registers are equally available to all call detectors, so that for any call in the exchange use can be made of any register.

From the above it will be evident, however, that in case a register of sub-group A would be seized, this can obtain access to the calling line only through one of the cord circuits of sub-group A of the particular group of cord circuits serving the 1200 lines in which the calling line is connected and also can reach this calling line exclusively via ⅓ of the total number of line finders provided for handling the group of a hundred lines in which the calling line is connected.

When any one of the registers of sub-group B would be taken into engagement, this can reach the calling line via one of a sub-group B of cords and another ⅓ part of the line finders, whereas any register of sub-group C would make use only of a cord circuit of sub-group C and a last ⅓ part of the line finders. Arrangements will, therefore, be made in the system, so that a free register can be engaged for a call only upon condition that a free cord circuit and a free line finder are available in the relevant sub-groups.

With regard to pulse sources used for the explorers, the following may be observed:

In the system described, selection mostly happens on a decimal basis, except for one or two selections which may be translated, depending on a combination of first figures of the subscriber's number. For the purpose of making decimal selections, use is made of a number of impulse sources which in principle provide a hundred time units, in order to allot one time unit to each of the one hundred outlets of the switch, and further, use is made of a number of approximately ten sources in order to cater for reaching ten numerical groups on a decimal switch.

The actual arrangement employed is such that as far as possible sources are used with an impulse length equal to the time unit on which the system is based. A rigorous application of this rule would, however, lead to the requirement that the different groups of impulse sources are provided in numbers represented by prime figures, so as to obtain a number of combinations equal to the multiple of the number of sources of the different groups.

An arrangement in which a hundred different time units could be obtained by using prime figures alone is not possible, so that a choice has to be made between two possible solutions, viz. either to base the system on more than a hundred time units, so as to be able to use prime figures exclusively for the number of sources, or alternatively to use sources with different impulse lengths, which permits one group of sources to be equal in number to another group. A solution of the first type would be to go to 105 time units and use three groups of 3, 5 and 7 sources respectively. This solution is inconvenient, however, in connection with the construction of the switch employed, which is arranged so that the outlets are divided in four groups of 25. The use of groups of 3, 5 and 7 sources would not permit of an easy translation of the records received by means of these sources for operating this type of switch.

An alternative solution has been used, therefore, which comprises three groups of 5, 5 and 4 sources respectively, of which the second group has an impulse length equal to 5 time units. This solution at the same time offers the advantage that the number of time units provided is exactly the amount of one hundred required, so that no time is lost, and also that it provides an easy translation from the records received from these impulse sources into combination of magnets to be operated for the switch.

In order to indicate at least ten numerical groups of outlets on this switch, use is further made of a set of eleven sources which have also an impulse length equal to the time unit. Because of the fact that the number of eleven sources used for group marking is a prime figure, the use of unit impulses is rendered possible.

In connection with the translation to be carried out, a group of three sources having unit length is still provided, which three sources are used in combination with the group of eleven sources to provide 33 different routing indications as described in connection with U. S. application, Serial No. 205,914, filed January 13, 1951. This source could have unit length also because three is a prime figure.

Consideration should now be given to the question which of these sources should be used in connection with the explorers by means of which the registers scan call detectors for a calling condition, so that additional pulse sources are not required.

It will be seen that the number of call detectors to be explored is a hundred, so that in principle, an arrangement would suffice which would provide a hundred time units. However, advantage can be taken of the indication received by this exploration to provide information to the register as regards the selections it has to carry out in order to select one particular group of cords and one particular group of first line finders accessible via these cords.

From the above distribution it will now be seen that the number of line finder groups accessible via one group of cords is twelve and that the total number of groups of cords, including the eight main groups each comprising three subgroups and the one additional group for the last 400 lines, is nine. One should, therefore, endeavour to use a system of impulse sources which provides the values of twelve and nine.

The value of twelve may be given immediately by using a combination of the groups of four and three sources which are already available. A number of sources to give a ready indication of the nine groups of cords is not available otherwise than in the shape of using the group of eleven sources. It is true that this provides an overall pulse cycle longer than is strictly necessary, viz. $12\times11=132$ time units, but this can be used to advantage, from the following point of view.

Consider the case that the number of time units of the explorer would be exactly a hundred, as this is employed also in the call detectors. When a particular subscriber originates a call, this brings the call detector in the calling condition always in exactly the same time position, viz. the time position which is allotted to the particular calling line.

It will now be clear that if for this line the call detector gets in the calling condition always in the same time position and if the explorer of the registers would also provide exactly a hundred time positions, the calling condition for this particular line would be created in a time position which would be always exactly that at which one particular register explores this particular call detector, the result of which would be that a particular calling subscriber would invariably cause one and the same register to be picked up, if this is free, in preference over all other registers.

By making the total cycle of the explorers of registers different from a hundred, the time at which the call detectors are explored happens in a different cycle from the times at which a particular subscriber originates a call, and this has the effect that a call from this subscriber would coincide with the exploration of its call detector by one particular register only once in $$\frac{100\times132}{4}=3300 \text{ time units}$$

the pulse sources with cycle 4 being common to both pulse cycles.

Figure 3:
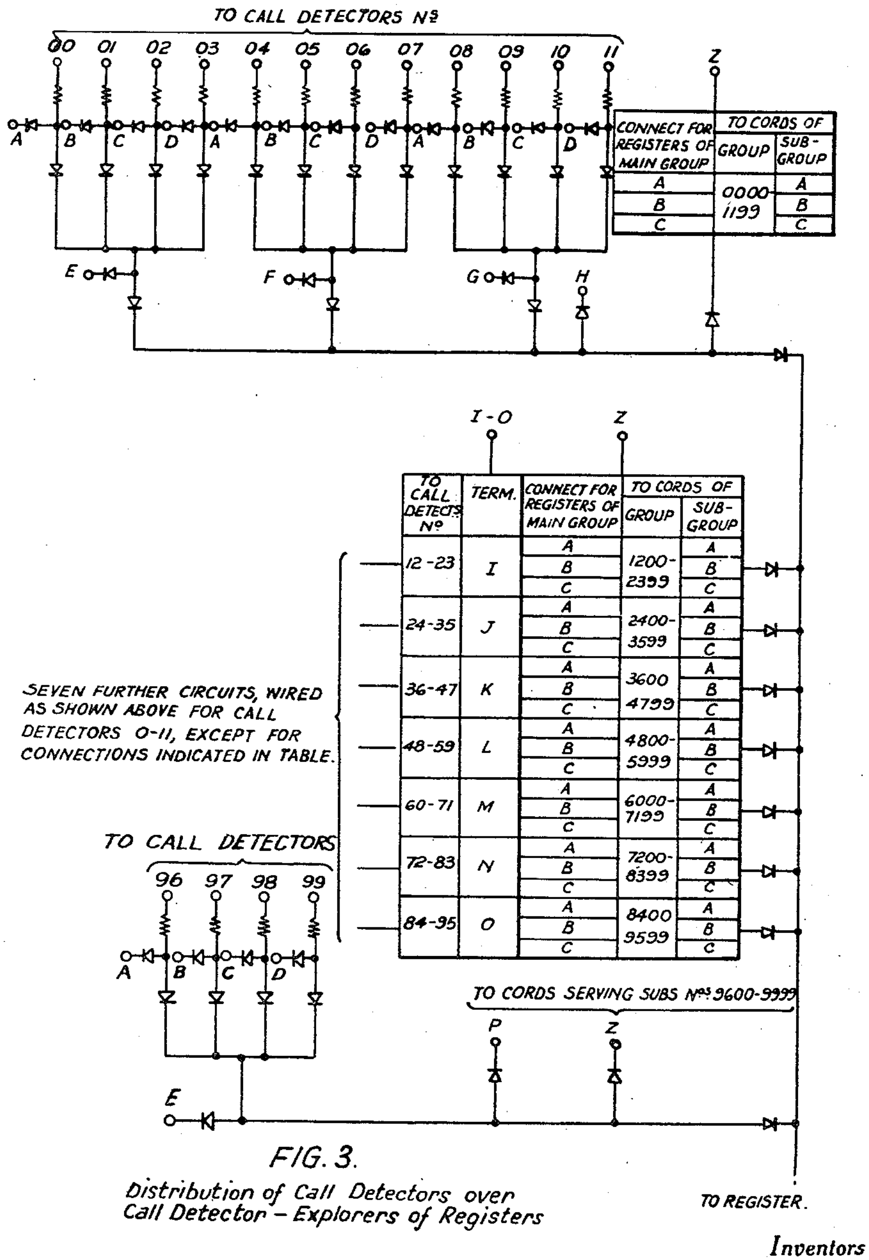
Fig. 3 shows the distribution of call detectors over call detector explorers of registers.

An explorer based on the above principles, has been represented in Fig. 3. This drawing shows in the bottom-right hand corner the common wire which leads from the explorer to the recording equipment at the register, and it will be seen that from this wire eight similar circuits are branched off, each via a separating rectifier, one of which circuits has been shown in full at the top of the drawing, whereas the seven others have been indicated by means of the table. These eight circuits are identical, except for the connection of the sources which are to be connected to the points indicated by A to O and of which the connection has been shown for each of 96 registers in the table shown on Fig. 4. It will be seen that to each branch twelve call detectors are connected. The call detectors connected to the first branch, which has been shown in full, are those numbered 00 to 11, each of which serves the group of a hundred lines having the corresponding combinations of 1000's and 100's figures. The second branch serves the call detectors 12 to 23, etc., each branch serving 12 call detectors. A ninth branch has been shown at the bottom of Fig. 3 which is different in shape from the others and which serves call detectors 96 to 99; the terminals A–E and P have to be connected for each of the registers also as shown on Fig. 4 for this branch.

It will be observed that each branch serving 12 call detectors corresponds to a group of cord circuits and so does the ninth branch serving four call detectors. The nine groups of cord circuits are differentiated by the connection to the points H to P of nine different P*d* sources, viz. sources $Pd_{1...9}$, as indicated in the tables on Fig. 4. The twelve call detectors in each branch which are associated with one group of cord circuits are differentiated by a combination of sources P*c* and P*e* in the following manner:

Each group of twelve is divided into three groups of four, the three groups being differentiated by the connection of one of the three sources $Pe_{1...3}$ to terminals E, F and G, as is also clearly indicated in the table, whereas the four different call detectors in each group of four are differentiated by the connection to terminals A to D of one of the four sources $Pc_{1...4}$, as is also indicated by the table.

It will be seen that for each of the 96 registers shown in the table, the combination of sources connected to terminals A to P has been done in a different manner, the result of which is that for any given call detector the time at which it is explored by one of the 96 registers, will be different. In this way a call detector when brought into the calling condition by a calling subscriber, will be explored at consecutive times by all registers, so that only one register can test a call detector at a time for the presence of a call.

Arrangements will be made in the system, so that when one register has successfully determined the presence of a call in a call detector, this register causes a signal to be sent to this call detector which cancels the calling condition for a register immediately, so that all other registers which may explore this call detector in the next and following time units will not be able to find this calling condition any more, the result of which is that only one register is seized for each call.

The manner in which this is accomplished has been indicated in Fig. 5 which in a simplified form shows two explorer circuits.

The explorer circuit shown at the top is that represented on Fig. 1 by means of which the registers explore the calling condition of the call detectors. It is assumed that when a call detector is brought into the calling condition, the potential provided from this call detector to a terminal which is shown in the left-hand top corner is rendered more positive, so that it is able to pass a positive impulse to a receiving tube at any register which is in the act of exploring.

It will be seen that the explorer, which is shown individual to each register, is connected to the three groups of sources $Pc_{1...4}$, $Pe_{1...3}$ and $Pd_{1...9}$, which have been shown in more detail in Figures 3 and 4.

The relatively positive potential from the call detector will be transmitted to all registers simultaneously via a resistance which is individual to each register, but this relatively positive potential will reach each register at different times as determined by the combination of the sources connected.

A second explorer has been shown in the lower part of the drawing, and one of these explorers is associated with each call detector. This explorer is connected at the call detector to a receiving tube, which, when it receives an impulse, will cancel the calling condition in a manner not shown on the drawing, i. e. it will remove the positive potential provided during the calling condition to the terminal in the left-hand top corner.

The explorer for each call detector is connected to 96 different inlets each of which corresponds to one of the 96 registers and each of these inlets of all call detectors is connected at the corresponding register to an amplifying tube. The operation of the system is as follows:

When a call detector is placed in the calling condition, it causes an impulse to be transmitted via the topmost explorer to one register which is in a condition to receive this, owing to which the receiving tube at this register functions and acts on the amplifying tube of this register shown at the right-hand bottom part of the drawing, in such a manner, that this tube provides a positive impulse to all call detectors. This impulse will be sent in the same time unit in which the register explored the call detector and by a judicious connection of the gates to the sources at the explorer of the call detector, it may be arranged that this impulse is returned only to the particular call detector which caused the register to respond to a call, whereas it will be absorbed by the explorers of all other call detectors, because in all of these other explorers one or more of the gates would absorb this impulse. Only in the calling call detector the gates are all closed, as they have the same timing combination as the gates employed in the topmost explorer, so that only this call detector will respond to this impulse and thereby concel the calling condition. It will be clear that other call detectors which may be in the calling condition at this moment, will therefore not be affected by this impulse and will continue the calling potential to be connected to the registers, until one of them responds in turn.

The guiding principle in these two explorers is that the same time position is used for each register in co-operation with a particular call detector for both directions of working. In other words, when considering one particular register, the time allotted for each call detector is the same for both directions of working, but this time differs for all call detectors. These same times are of course, used in conjunction with other registers, but then always in connection with different call detectors also. When a register responds by means of its explorer to the calling condition from a call detector, this happens in a time which for this particular register is characteristic for the call detector, and this time is recorded on the register on a number of cold cathode tubes which are controlled by similar groups of sources as have been used at the explorer. There will, therefore, be one group of tubes which records the arrival of an impulse in one of the P*d* cycles and others for each of the P*c* and P*e* cycles. The group of tubes recording the P*d* cycles indicates immediately the group of cord circuits to which the register should seek access. The combination of tubes operated for the P*c* and P*e* cycle indicates immediately the particular wanted first line finder group out of the 12 which are connected to this group of cord circuits and this combination is used to control the selection by the second line finder of a free first line finder of this group.

In order to reduce the exploring time both for finding a free cord circuit of the wanted group and for finding a free first line finder of the wanted group, the explorers associated with the cord choosers as well as those associated with the second line finders are divided into sub-groups, one of which only is connected to the register as determined by the combination of cold cathode tubes ionised at the register. For example, in the case of the explorer for the cord chooser, only those of the outlets of the cord chooser which correspond to the wanted group of cords will be connected, so that exploration will only take place with respect to the cords of this group. This leads to the possibility of employing a reduced number of time positions; e. g. in the case of the cord choosers, the total number of cords to which access may be given is 50, but in each particular group there are only six cords connected to a group of cord choosers as described above. Only these six cords will be connected for exploration, so that the total number of time positions that is effectively required amounts to six only. For reason of convenience, the number of time positions employed in connection with the cord chooser is 25, so that the the 50 cords are explored in two groups of 25 identical time positions, but the cords are so connected that the six cords associated with one group all have different time positions.

In a similar way the explorer of the second line finder is divided in two sub-groups, each with 50 time positions, and only one of these two groups will be connected effectively to the register. Moreover, the different groups of first line finders are so distributed over these two groups of 50 time positions, that six groups are completely connected to one group of 50 time positions and six other groups of first line finders are connected completely to the second group of 50 time positions. This means that when connecting half an explorer, not only has the register to explore only 50 time positions to reach all outlets of this half explorer, but it needs to give a group marking for six first line finder groups only, so that the total exploring time equals 50×6=300 time positions for hunting over all accessible free line finders of six groups.

It has been stated before that a free register is able to respond to a calling condition from a call detector, provided only that it has access to one free cord circuit in the associated sub-group giving access to the calling line and also that this cord circuit has access to at least one free line finder giving access to this calling line. This is accomplished in the following manner:

Referring to Fig. 3, it will be seen that the lead to each of the branches shown for the explorer of the registers, used for investigating the calling condition of the call detectors, is connected to a second gate which on the drawing is shown connected to certain cord circuits. The intention is that this gate will be connected to a certain potential by which it is made ineffective so long as any cord of the corresponding sub-group is free. These connections are shown in the chart Z in Fig. 3. For example, in that branch of the explorer which controls call detectors 00 to 11, this point Z will be connected to a point in cord circuits of the group serving lines 0000 to 1199, with the understanding that for the registers of main group A this point will be connected only to the cord circuits of sub-group A of this main group, for the registers of main group B this point will be connected only to the cord circuits of sub-group B of this main group of cords, etc., see Fig. 1. To be more exact, for the explorer of a particular register, point Z will be controlled only by cord circuits in those of the sub-groups to which this register has access, which means that e. g. registers of main group A will be controlled only by sub-group A of cord circuits in each group etc. Moreover, each register will be controlled only by the particular six cords of each sub-group to which it has access. So long as any of these cord circuits is free, point Z will be connected to a relatively positive potential, so that the corresponding gate is ineffective and the register may respond to a call of the call detectors concerned. When all cord circuits in a sub-group having access to a particular register become unavailable, the potential at point Z is changed to a relatively negative potential, so that the gate becomes absorbing and prevents the register from responding to any calling potential from one of the 12 call detectors concerned.

In a similar manner, gates are controlled by the different sub-groups of first line finders which take care that the calling potential, as supplied from the call detector, is suppressed at certain times when no line finders in this sub-group are available. The suppression of this calling potential is done in such a manner that the times during which no calling potential is present correspond to the registers of the main group which have access to the sub-group of first line finders in question, so that only the registers of the corresponding main group will be disabled for a call in this particular group of a hundred lines.

The invention utilizes a particular type of multi-selector switch in each selector stage and in the connecting equipment for connecting the various control circuits to the register controllers. The details of this multi-selector switch form no part of the present invention and only those parts of the switch have been illustrated which are necessary to an understanding of the invention.

The multi-selector comprises a number of individual selectors which share a common bare wire multiple and a common selecting mechanism. The bare wire multiple is arranged in a vertical manner and the individual selectors are arranged in a horizontal manner in the multi-selector. Each individual selector is provided with a set of inlet wires. If a multi-selector gives access to 100 outlets, for example, there will be 100 sets of vertical multiple wires, with any one of which sets any of the sets of inlet wires may be brought into contact. This contact is effected by means of flexible contact springs under the combined action of vertical and horizontal bars, each horizontal bar corresponding to one of the individual selectors, or inlets, and each vertical bar corresponding to two of the outlets, or sets of vertical wires. At each intersecting point of a horizontal inlet and two sets of vertical outlets the contacts may be established by the combined action of the corresponding horizontal and vertical bars. The actual contact is established by means of a contact pusher which moves all individual contacts of the set of contacts concerned, and of which contact pushers, one is provided for each of the intersecting points between horizontal and vertical bars. As at each intersecting point contact may be established between one inlet and either of two outlets, one of these two outlets is selected by moving the contact pusher either in a forward or in a backward direction.

Summarizing the above, there will be as many horizontal bars as there are individual selectors in a multi-switch. The number of vertical bars is equal to half the number of outlets constituting the multiple of the multi-switch. At each intersecting point of horizontal and vertical bars a contact pusher is provided, which, by forward or backward movement, may bring the inlet corresponding to the horizontal bar into contact with one of the two outlets corresponding to the vertical bar.

The vertical bars are arranged in pairs, so that for a multi-switch with 100 outlets, the 50 vertical bars will be arranged in 25 pairs. In addition to these, a 26th pair is usually provided for routine test purposes, but may be left out of consideration for the moment. For the control of all vertical bars a set of five code selecting bars is provided at the bottom of the switch. Each of these bars is operated by one of a set of five code bar magnets which may be energized in any one of 25 different combinations so as to select one of the 25 pairs of vertical bars. When one or a combination of these code bar magnets is energized, the corresponding code bar will move and thereby select the corresponding pair of vertical bars, but the actual movement of these vertical bars does not yet take place. Only one of the two vertical bars indicated by the operated combination of code bar magnets may subsequently be caused to move by the operation of one of two common so-called "vertical serve" magnets, which are provided in common for all 25 pairs of vertical bars and which, in association with the code bar magnets of which the operated combination indicates the pair, causes one of the vertical bars of this pair to be moved upwards.

The selection of one of the 50 vertical bars therefore happens in two steps, first by the operation of a combination of five code bar selector magnets which, by the movement of the corresponding code bars, select one pair of bars out of 25, and next by the operation of one out of two vertical servo-magnets, which selects and lifts one of the vertical bars of the selected pair.

The horizontal bar associated with each individual selector is associated with an individual control magnet which, when operated, indicates that the associated horizontal bar has to be moved. The operation of this individual horizontal magnet may take place simultaneously with that of the code bars and vertical bar, but only after a vertical bar has been lifted, can the actual movement of the horizontal bar take place by means of one of two common so-called "horizontal servo" magnets, which causes the horizontal bar indicated by the operated horizontal magnet to be moved either in a left-hand or in a right-hand direction. The movement of the horizontal bar therefore happens also in two steps, first by the operation of the individual horizontal magnet which indicates the horizontal bar to be moved, and next by the operation of one of the two horizontal servo magnets, which causes the indicated horizontal bar to be moved either to the right or to the left and which thereby causes the contact pusher located at the intersection of the operated horizontal and vertical bars to be moved either in a forward or a backward direction, thereby closing one set of contacts.

After these operations have happened, the code bar magnets de-energize and the vertical servo-magnet also releases, so that both the code bars and the vertical bar return to their original position. The common horizontal servo-magnet operated also releases, but the individual horizontal magnet is held energized and holds the horizontal bar mechanically locked in its operated position, which thereby keeps a contact pusher in operated position and the selected vertical set of contacts closed. When this horizontal magnet releases, the horizontal bar and the contact pusher are restored to their normal position and the contacts are opened.

The numbering of the outlets in relation to the operation of the different selector magnets is as follows:

The 100 outlets are arranged in four rows of 25 each, which are numbered 00–24, 25–49, 50–74 and 75–99, respectively.

Each pair of vertical bars, and therefore each of the 25 different combinations of code bar magnets, corresponds to one outlet in each of these four rows; thus the first pair of vertical bars correspond to the first outlet of each row (00, 25, 50 and 75), the second pair of vertical bars to the second outlet of each row (01, 26, 51 and 76), etc. All of those vertical bars which are lifted by the first vertical servo-magnet correspond to the first two rows of 25 outlets (00–49); those lifted by the second vertical servo-magnet correspond to the last two rows of 25 outlets (50–99). It will be clear from this that by the successive operation of a combination of code bar magnets and one vertical servo-magnet, two outlets will be indicated by the operation of one vertical bar, viz., either one outlet each in rows 1 and 2 or one outlet each in rows 3 and 4.

After an individual horizontal magnet by its operation has indicated the individual selector for which contact has to be established, the corresponding horizontal bar will be moved in one of two directions, depending on which of the horizontal servo magnets operates. The contact pusher located at the intersection of the operated vertical and horizontal bars will accordingly be moved in one of two directions and thereby establish contact with one of the two outlets indicated by the operated vertical bar. The arrangement of the horizontal servo-magnets is such that the first causes a contact to be closed either in rows 1 or 3, and the second causes a contact to be closed either in rows 2 or 4. Therefore, the first horizontal servo magnet controls outlets 00–24 and 50–74 and the second controls outlets 25–49 and 75–99.

The following parts of the switch have been shown in the drawings, since these parts are all that are required for a clear understanding of the invention: the code bar magnets, the horizontal bar magnets, the vertical servo-magnets, the horizontal servo-magnets, the main switch contacts closed by the cooperation of these parts, and certain contacts operated by the vertical and horizontal bars.

The control circuit for operating the multi-selector and containing the code bar magnets and the horizontal and vertical servo-magnets is an "electronic selecting and bar operating" circuit and will be conveniently referred to hereafter in the description as an "ESBO" circuit.

These "ESBO" circuits may be connected by means of a so-called "ESBO" connector directly to a register circuit, which is to control the setting of an individual switch of the corresponding multi-switch. For this purpose, each of the local and incoming registers is provided with an "ESBO" connector, and of which the outlets provide access from each of these registers to all of the "ESBO" circuits to which access must be obtained. The "ESBO" connectors are multi-switches of which the inlets are associated with the registers and the outlets are multipled for all registers to the "ESBO" circuits. The multi-switches used for these "ESBO" connectors may themselves have "ESBO" circuits, or, alternatively, each individual switch may have completely individual operating and control equipment.

Other means for connecting the registers to the various "ESBO" circuits also fall within the scope of this invention; for example, relays may be employed to the same effect.

The purpose of the "ESBO" connector is to connect a register directly with the "ESBO" circuit of a multi-switch which has an individual selector which must be controlled by the register. It will be seen that for this purpose, the "ESBO" connector of the local registers provide access to the "ESBO" circuits of the multi-switches for first line finders and final selectors, second line finders, as all of these switching stages are controlled directly from the local registers, in order to establish a connection.

As soon as a record has been taken at a register of a call detector, the register is able to operate immediately the "ESBO" connectors associated with it, which provide the register direct access to the group of second line finders and the group of first line finders via which the call has to be completed. The operation of these "ESBO" connectors, therefore, happens immediately and simultaneously after the register has recorded the identity of a call detector, and as soon as this has happened, the register is able to carry out certain functions at the second line finder "ESBO" circuit and at the first line finder and final selector "ESBO" circuit simultaneously.

For example, as soon as the register is connected to the first line finder and final selector "ESBO" circuit of the group of a hundred lines to which the calling line is connected, it will be connected via this "ESBO" connector and through the "ESBO" circuit concerned, to the corresponding call detector at a point where this delivers the impulses characteristic of the identity of the calling line, so that the register may then immediately record this identity and proceed with the operation of the corresponding vertical bar at the first line finder "ESBO" circuit. It also may proceed with the determination of the class of the calling line. The horizontal bar at the first line finder evidently cannot be operated until it has been decided which of the first line finders is going to be used for the call, which is done by an exploring operation at the second line finder "ESBO" circuit and which is signalled to the first line finder only by the fact that a second line finder is through-connected to it.

Simultaneously with the operations described at a first line finder "ESBO" circuit described, the register may already carry out an exploring operation at the second line finder "ESBO" circuit under the control of the identity of the first line finder group recorded at the register on the Pc and Pe recording equipment.

As there is only one call detector per hundred lines and only one register can be seized for a group of a hundred lines to carry out the operations of hunting for a calling line, it will be evident that only one register at a time can be connected to an "ESBO" circuit for first line finders and finals for the purpose of connecting to a calling line. However, the same "ESBO" circuit may be employed simultaneously by other registers for the purpose of extending connections to called lines in conjunction with final selectors.

The second line finder "ESBO" circuits may be employed by several registers simultaneously, because a call may be going on in the same group of 1200 lines for different groups of a hundred subscribers.

Figure 2:
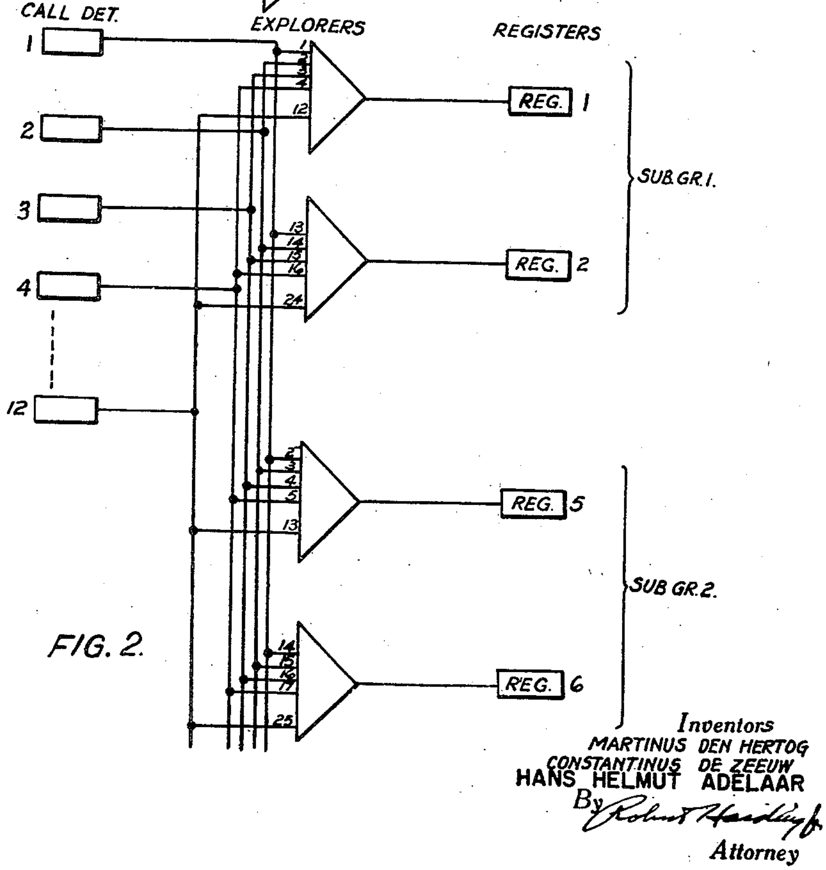
Fig. 2 shows pulse-scanning arrangements between register controllers and call detectors, whereby anyone of a number of register controllers can respond to the operation of a call detector by a calling line.

Referring now to Fig. 2, this shows, in a simplified manner, the principle of how the call detectors are distributed over the explorers associated with the registers. In order to clarify matters, only four out of a group of 12 call detectors have been indicated and these are shown connected to only two sub-groups of registers, each containing two registers only. It will be seen that call detector No. 1 is connected to the various explorers in such a way that it is explored by each register at a different time, these times having been indicated at the point where the call detector is shown connected to the explorer. A further principle that has been incorporated is that the times used in conjunction with a group of 12 call detectors and one sub-group of 4 registers are mutually all different, e. g. for the 12 call detectors shown, times 1 to 12 have been used in connection with register No. 1, and for the same 12 call detectors, times 13 to 24 have been used in conjunction with register No. 2 which belongs to the same sub-group. A third register of the same sub-group would have times 25 to 36 in connection with the same call detectors, etc. However, in a different sub-group of registers, some of these times may recur, so that time No. 2 e. g. is used by register No. 5 in connection with call detector No. 1, although it has also been used by register No. 1 in connection with call detector No. 2. However, also in this second sub-group of registers the times employed in connection with the same group of 12 call detectors are mutually exclusive and this repeats itself for all further sub-groups of registers to which any group of 12 call detectors is connected. The reason for this is that when two or more calls arrive simultaneously in any group of 12 call detectors, the registers in one sub-group which have access to the same sub-group of cords serving these 1200 lines will not be able to test simultaneously on these different calls. This provides the possibility of temporarily disabling all registers of a sub-group at the moment one of these registers has responded to a call, so that further calls in the same sub-group of 1200 lines have to be handled by different sub-groups of registers and cannot be directed to the same group of cords in consequence. The reason for this is that in case at any time only one cord should be available to a sub-group of registers, the possibility of two or more calls engaging registers in this sub-group should be avoided, of which then only one could obtain access to the only free remaining cord.

The manner of distributing the time positions, as shown in Fig. 2, follows automatically from the distribution of sources, as illustrated by Figures 3 and 4, and should be read also in conjunction with Fig. 5, in the explorers of which this method of staggering is applied, according to the tables of Fig. 4.

Figure 6:
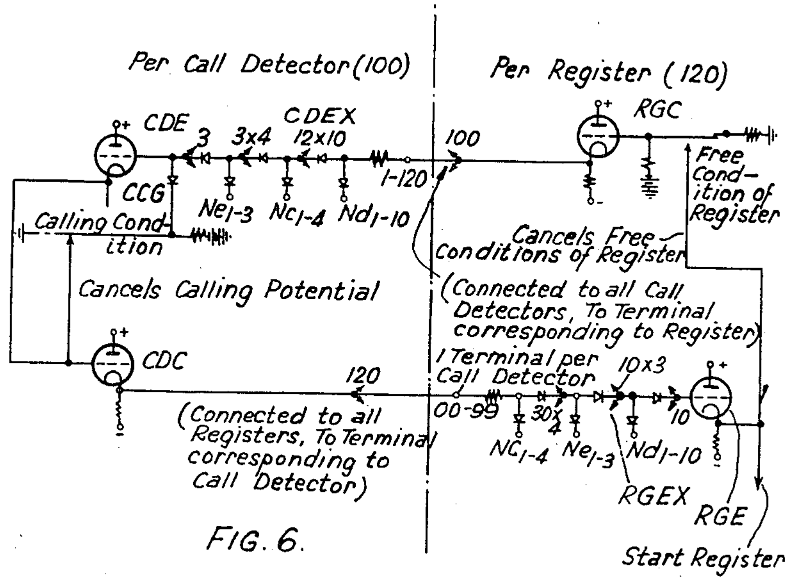
Fig. 6 is a modification of Fig. 5.

In Fig. 6 an arrangement has been shown alternative to that represented by Fig. 5. Like Fig. 5, Fig. 6 shows two explorers, the topmost one of which CDEX represents a number of explorers each of which is associated with a call detector and the bottommost one of which RGEX represents a number of explorers each of which is associated with a register. In Fig. 6 it has also been assumed that in a 10,000-line exchange, comprising 100 call detectors, each serving a group of a 100 lines, up to 120 registers may be connected. The explorer CDEX which is associated with each call detector has been shown in more detail by Fig. 7 and the manner in which the impulse sources have to be connected to the different gates of this explorer is represented by Figs. 8A and 8B.

Figure 9:
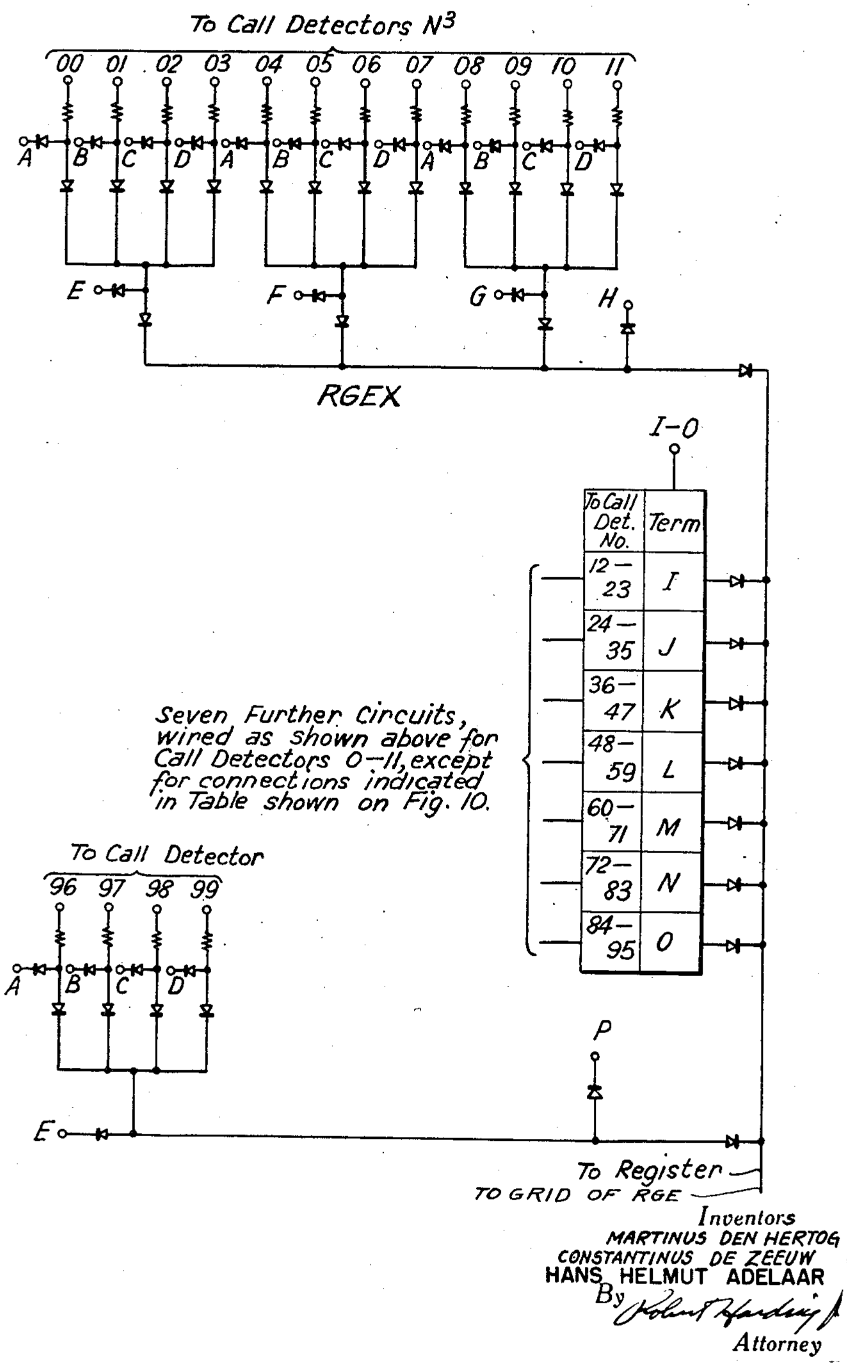
Fig. 9 is a modification of Fig. 3 suitable for use in conjunction with the circuit of Fig. 5.

The explorer RGEX has been indicated in more detail by Fig. 9 and the manner in which the impulse sources are connected to the gates of the different explorers or registers, is represented by Fig. 10.

The manner of distribution of the different impulse sources over both types of explorers satisfies the requirements, as set forth in connection with Figs. 1 to 5, so that also in the arrangements represented by Figs. 6 to 10, there is a particular relationship between the two types of explorers used in the two directions between call detectors and registers, so that the time at which a particular call detector and register are interconnected via one explorer relates to a corresponding time in the other explorer.

In Figs. 6 to 10 the time cycles for call detectors and registers respectively are not exactly the same for the two sets of explorers. There is a difference of one time unit, so that the time for the call detector explorers CDEX, Fig. 6, is advanced by one time position compared with that of the register explorers RGEX. The operation of the arrangement according to Fig. 6 differs slightly from that of Fig. 5 and will now be described.

When the call detector responds to the calling condition of a line which is served by it, it applies a relatively positive potential to a gate CCG which is connected to the grid of an amplifying tube CDE shown in the top left-hand corner of Fig. 6. By applying this positive potential, this gate CCG becomes non-conductive and non-absorbing, so that impulses which are entering via the associated explorer shown at the top of the drawing are no longer absorbed by this gate, but may affect the potential of the grid of tube CDE. The effect of this is that from the moment the calling condition is applied, tube CDE may respond to impulses received from the associated explorer which indicate free registers. A free register is indicated by the presence of a relatively positive potential on one of the 120 inlet terminals of the topmost explorer. All the inlet terminals are multipled to the explorers of all call detectors. This relatively positive potential is offered to all call detectors so long as a register is free by the presence of a ground potential on the grid of a tube RGC provided individual to each register. This tube RGC is connected as a cathode follower, so that the positive condition of the grid is transmitted as a positive condition to the cathode, and so to the terminals of the call detector explorers CDEX already referred to. As soon as an impulse indicating a free register arrives at a call detector, this impulse has two effects which are indicated schematically on the drawing.

The first is that by means of the gate CCG the calling potential at the call detector is instantly removed, so that this will refrain from responding to impulses from other free registers.

A second action taking place is that by means of tube CDC in the bottom left-hand part of the drawing an impulse is transmitted to all registers, which impulse is connected to a terminal corresponding to the call detector in question of the explorer associated with each register. This impulse is sent by the call detector in the time unit following that in which the impulse is received from the register indicating the free condition thereof and the gates connected to the explorer shown in the bottom right-hand part of the drawing are so connected that only for the register in question an impulse will be passed to the tube controlled by this explorer. This is effected by the connection of these gates to impulse sources such that an impulse will be passed only in the time position following that in which the call detector tested the free condition of the register.

The impulse arriving at the register has the effect of engaging this register immediately and removing the positive potential which indicated its free condition. This will prevent other call detectors from testing on this same register. The removal of the test potential happens early enough, that is, in the course of the time unit following that in which the call detector under consideration tested the register, to prevent the next call detector from testing the same register.

Figure 11:
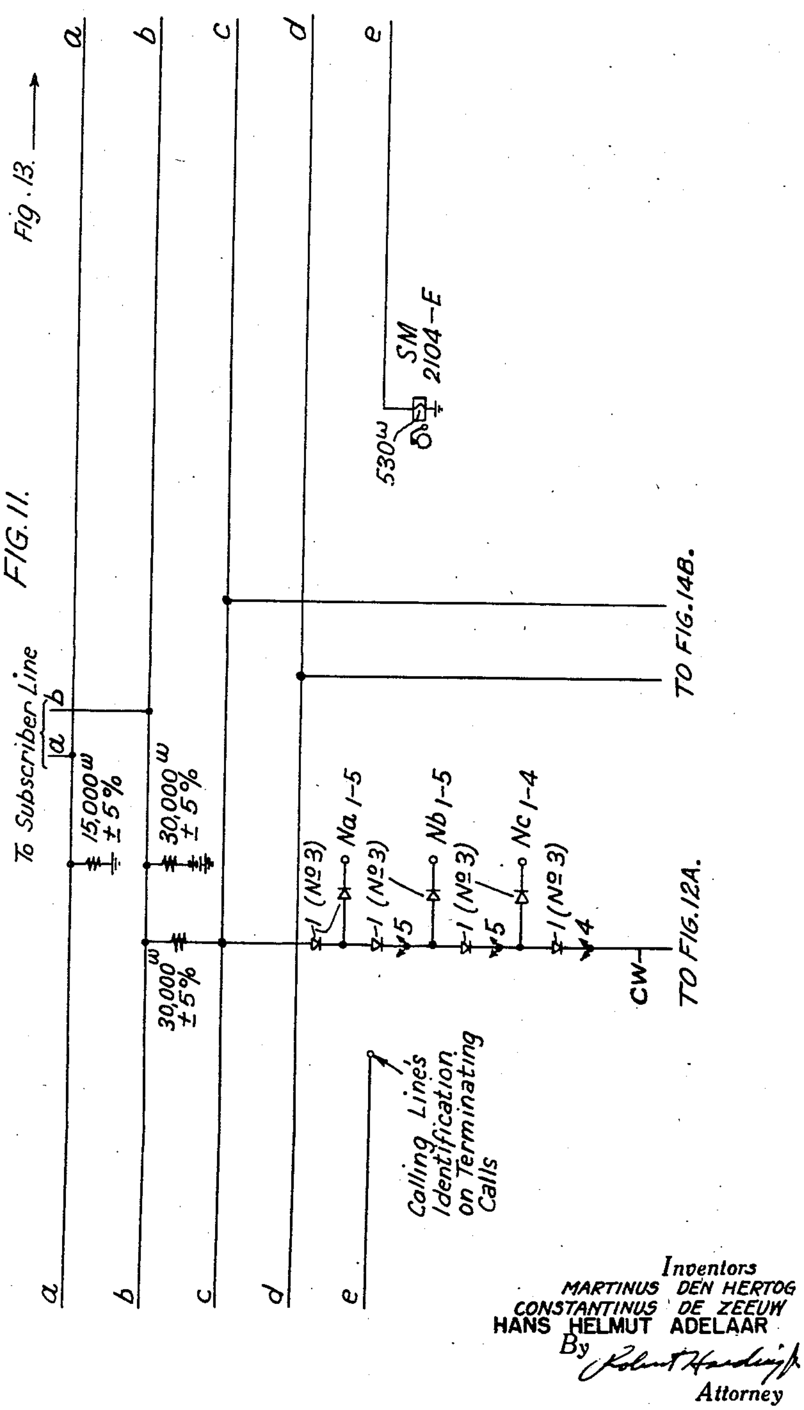
Fig. 11 is a subscriber's line circuit.

Referring now to Fig. 11, this shows a subscriber's line circuit which is similar to that described in application Serial No. 167,752, filed by W. Pouliart et al. on June 13, 1950. The impulse sources used in connection with Fig. 11 are those shown as the 3 groups of sources A, B and C of Fig. 28, and have the potentials as indicated by N in the table at the top of that figure showing the potentials for the different types of pulses.

It will be known from the disclosures mentioned, that when a subscriber calls, an impulse will be produced in a corresponding time position on a wire CW which is common to 100 subscribers and leads to a call detector. This impulse is produced under the control of a number of gates connected to an explorer serving these 100 lines and which are represented on Fig. 11. The common wire CW enters on Fig. 12 where it is shown connected to the grid of tube $CT_1$ which is connected as a cathode follower and which from its cathode supplies impulses in the first place to a lead marked I, leading to the "ESBO" circuit for first line finders and final selectors, the purpose of which will be described hereinbelow.

In the second place the impulses are transmitted via a resistance $R1$ of 2500 ohms and a rectifier $RC_1$, serving as a gate, to the cathode of a comparator tube $VT_1$. The grid of this latter tube is connected via a network comprising a number of resistances and capacitors, as well as a voltage limiter, to an impulse source $d_2$, which provides negative trigger pulses of very short duration, e. g. of the order of 30 microseconds towards the end of each of the impulses A, B and C referred to above, as is indicated by the insertion in Fig. 28 showing the relation of pulses $d_2$ and $d_3$ with the basic time units of the other pulses. When an impulse from the cathode of tube $CT_1$ coincides with an impulse supplied from source $d_2$ to the grid of $VT_1$, tube $VT_1$ which is normally conducting, will be cut off, so that a positive impulse appears on the anode of this tube of a length equal to that of $d_2$. Tubes $FT_2$ and $FT_1$ together constitute a "flip-flop" circuit of which $FT_2$ is normally conductive and $FT_1$ is normally cut off. The arrival of an impulse on the anode of $VT_1$, which is transmitted via a capacitor $CP_1$ of 0.02 mf. and a rectifier $RC_2$ to this flip-flop circuit causes tubes $FT_2$, $FT_1$ to switch over, so that $FT_1$ becomes conductive and $FT_2$ becomes cut off. This creates the calling condition which now starts the call detector to hunt for a free register which happens by means of a tube $CT_2$ connected as a cathode follower. The grid of $CT_2$ is connected to the anode circuit of $FT_2$, so that when this is in the normal condition and conducting, the grid and also the cathode of $CT_2$ will be at a relatively negative potential. The calling condition changes this to a relatively positive potential. The cathode of $CT_2$ acts through a rectifier $RC_3$, acting as a gate on the explorer by means of which the call detector hunts for a free register, so that by the fact that the cathode becomes relatively positive, this gate is closed and the explorer is permitted to pass impulses to tube $VT_2$. Tube $VT_2$ corresponds to tube CDE of Fig. 6.

Figure 7:
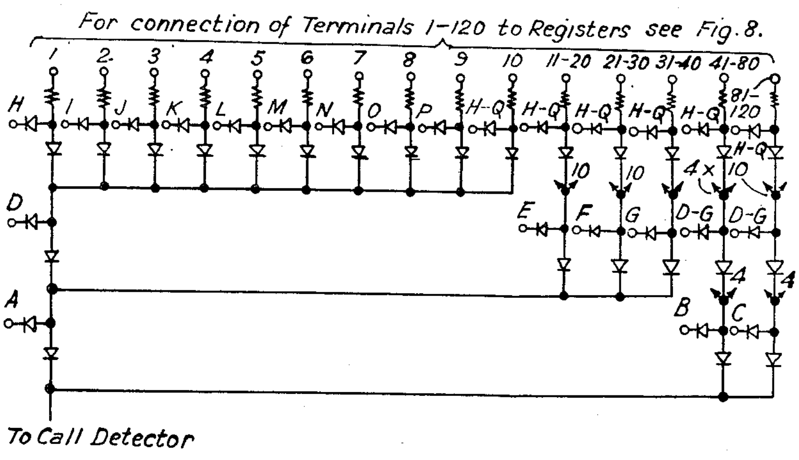
Fig. 7 shows the composition of the call detector circuits register explorer.
Figure 8B:
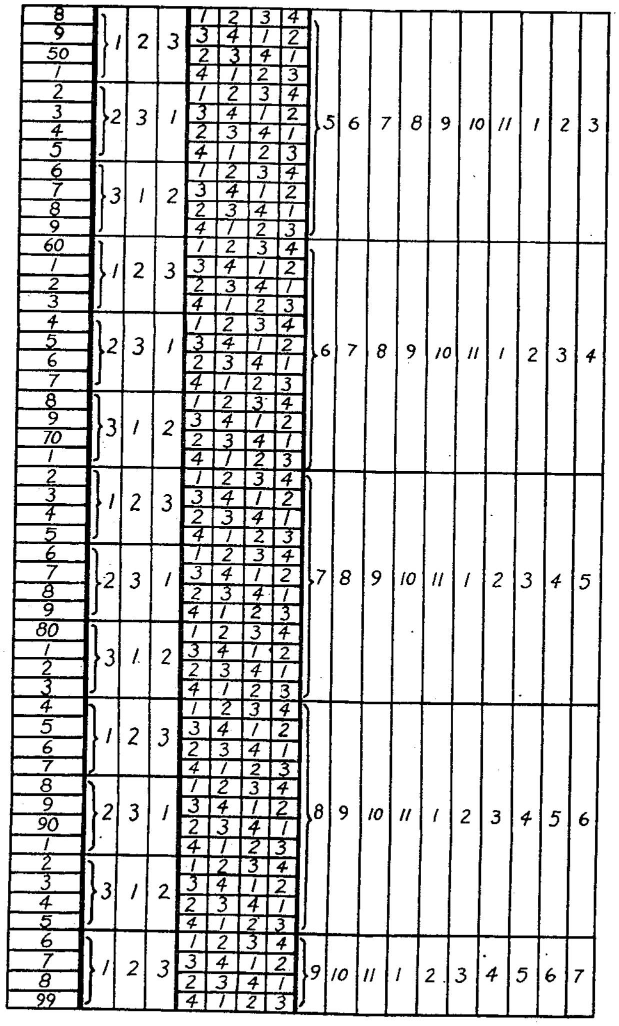
Figure 19:
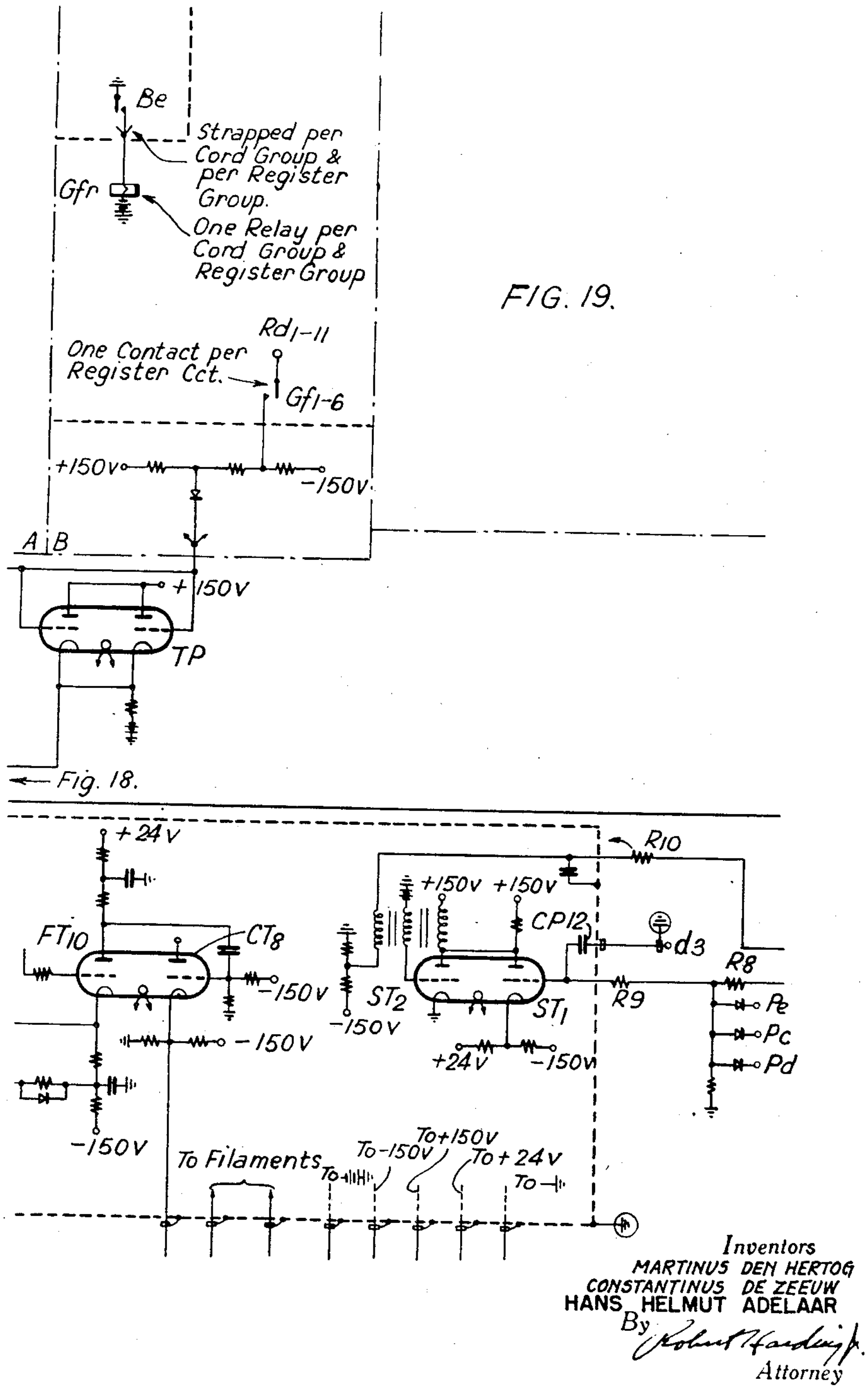
Figure 20:
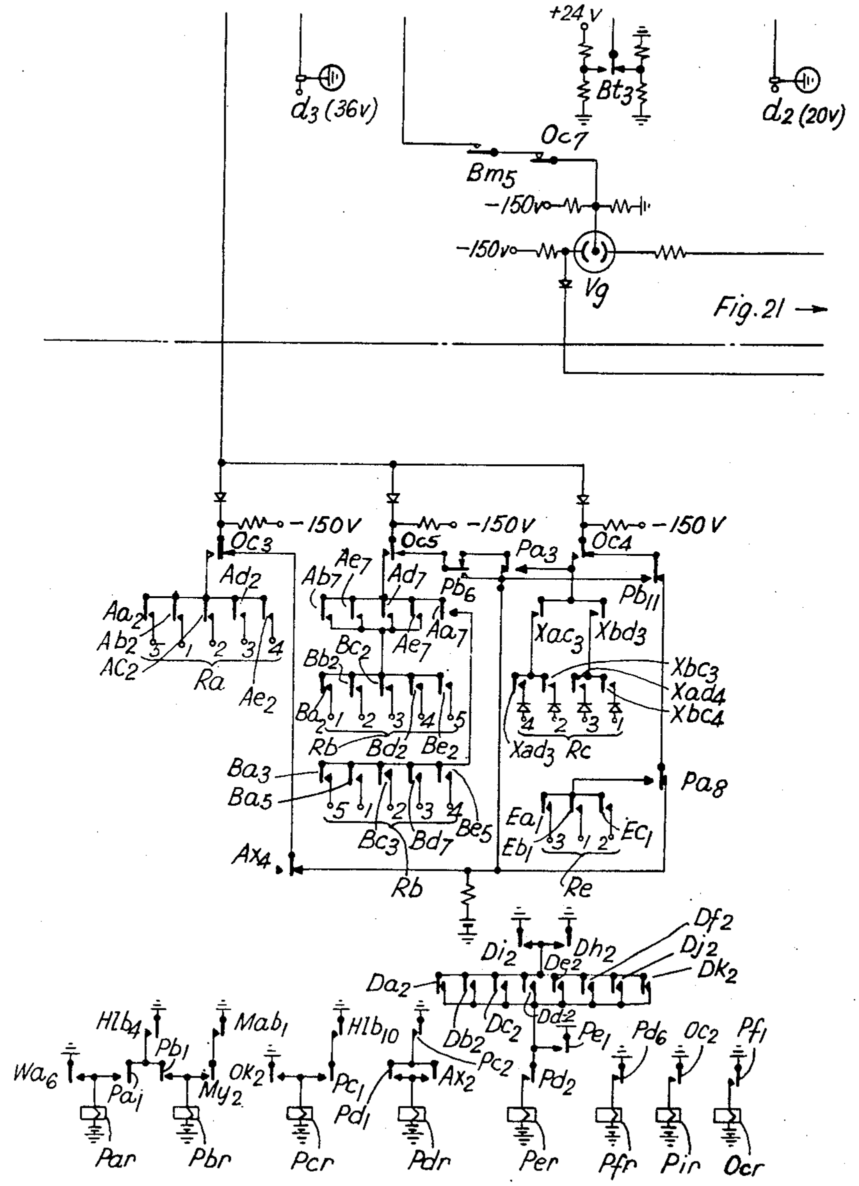

A free register will be characterised by the presence of a relatively positive potential on the corresponding terminal which has been denoted by 1 to 120 in Figs. 7 and 12. The gates of the explorer are connected as shown by Figs. 7 and 8. The manner in which a positive potential is created on the terminals 1 to 120 to characterise a free register is as follows:

Referring to Fig. 19, it will be seen that a relay *Gfr* is provided per group of cord circuits which is operated so long as any one cord circuit of the group associated with a particular sub-group of registers is free. This relay is provided with one contact for each of the registers of the sub-group handling these cords and these contacts have been indicated on the drawing by $Gf_{1-6}$ to correspond to a capacity of 6 registers in a sub-group. This contact will provide a connection from one of the sources $Rd_{1-11}$ to a potentiometer. The particular source to be used depends on the register and on the time which is assigned to this register in conjunction with the cord group, each cord group having a particular number of times in which it can be tested in the D cycle, as may follow from the manner in which the sources have been employed. It will be seen from the drawing that a potentiometer is provided for each of the cord groups with which the register is associated and the sources used in connection with the different cord groups are different according to the test times for the register in question.

The potentiometer serves as a voltage divider, so that the potentials from impulse sources $Rd_{1-11}$, which as shown in the table of Fig. 28 vary between −110 v. and −50 v. are brought to a level between −50 and −4 v. approximately at a branch of this potential divider which via a rectifier is connected to the grid of the tube TP. Whenever one or more cords in a group are free, the corresponding *Rd* sources will, therefore, produce relatively positive impulses on the grid of tube TP (Fig. 19) in times corresponding to those in which the register may be tested to serve calls originated in the groups of lines served by the cord group concerned. Tube TP acts as a cathode follower, so that the free condition of cords will be indicated by a relatively positive potential on the cathode of this tube, and when the register itself is free, this positive potential will be transmitted via a make contact $Rf_7$ to the call detector (Fig. 12), where it enters on the explorer already described in connection with Fig. 12.

Relay *Rfr* (Fig. 25) on which contact $Rf_7$ is located, is permanently operated when the register is free and is provided with all potentials necessary for its operation. The operating circuit of this relay is via break contacts $Hlb_9$, $Gc_3$, break contact $HB_1$ on the horizontal bar of the register chooser switch associated with the register, a contact of the insulating jack BJ, break contact $Cwb_4$ and make contact $Cwa_1$ to ground via break contact $OK_3$.

In its turn *Cwar* (Fig 24) is a relay that is constantly operated in series with tube CYT and which by being operated checks the presence of the −150 v. and +150 v. potentials at the register.

Referring now again to Figs. 12A and 12B, when the call detector receives an impulse from the free register, tube $VT_2$ (Fig. 12B) responds in a time which is controlled by trigger impulse $d_3$ which provides an impulse of very short duration, viz. approximately 30 microseconds at the extreme end of each time unit on which the operation of the system is based it coincides with the beginning of the next time unit. An impulse arriving from $d_3$ coinciding with an impulse from a free register, causes a negative impulse to be transmitted from the anode circuit of $VT_2$ to the grid of $CT_3$ (Fig. 12A). $CT_3$ is a cathode follower which by its cathode acts on the flip-flop circuit comprising tubes $FT_3$ and $FT_4$. $FT_3$ is normally conducting and $FT_4$ is cut off normally. The negative impulse from the cathode of $CT_3$ applied to the grid of $FT_3$ cuts off this tube and causes $FT_4$ to become conductive owing to which the potential at the anode of $FT_4$ changes from −36 to −117 v. This latter potential is maintained also on the grid of $CT_3$, so that consequently the potential on the cathode of this tube is thereby maintained at approximately −105 v. A rectifier gate $RC_4$ connected between this cathode and the anode circuit of $FT_2$ (Fig. 12B) thereby becomes conductive, so that the potential at the anode circuit of $FT_2$ is reversed from −43 v. to approximately −104 v., so that now the flip-flop circuit comprising tubes $FT_2$ and $FT_1$ returns to its original condition. As a result of this the calling condition is removed because the potential applied to the grid of $CT_2$ (Fig. 12B) now also again becomes relatively negative, so that this tube by the gate $RC_3$ connected to the explorer cuts off all further impulses arriving from other free registers. The circuits in Figs. 12A and 12B performing these actions correspond to tube CDC of Fig. 6.

By the fact that tube $CT_2$ was brought into the calling condition, a relatively positive potential was applied to a capacitor $CP_2$ of 5000 mmf., which on the other side is connected to the anode circuit of tube $FT_5$. Capacitor $CP_2$, therefore, became rapidly charged through a rectifier $RC_5$ which transmits the positive impulse produced directly to ground. When tube $CT_2$ reverses to its original condition, the cathode becomes again relatively negative and the negative impulse applied to the capacitor $CP_2$ may now pass through another rectifier $RC_6$ and a 400 mmf. condenser $CP_3$ to the grid of tube $FT_6$. Tubes $FT_6$ and $FT_5$ constitute a flip-flop circuit of which tube $FT_6$ is normally conducting and $FT_5$ is cut off. This flip-flop circuit would, left to itself, produce an impulse larger than one time unit, e. g. 300 to 400 microseconds, after which it will automatically return to the original condition. This impulse will be applied from the anode of tube $FT_6$ through a capacitor $CP_4$ of .1 mf. to the grids of tubes $CT_4$ and $CT_5$ working in parallel, which act as cathode followers to provide a low impedance circuit which feeds a positive impulse to all register circuits. In order to make the length of generated pulses independent of circuit constants the restoring stroke is initiated at a predetermined moment earlier than the normal end of the pulse by introducing a short positive pulse $d_3$ through a capacitor $CP_5$ of 2000 mmf. and a rectifier $RC_7$ to the anode of tube $FT_5$. That side of the rectifier not connected to the anode of $FT_5$ is normally kept at a potential much lower than this anode, so that this rectifier is normally nonconductive. The pulses applied from source $d_3$ through capacitor $CP_5$ are of insufficient amplitude of themselves to overcome this rectifier bias. Even if, due to triggering of the flip-flop comprising tubes $FT_5$ and $FT_6$, the potential at the anode of $FT_5$ becomes relatively negative, the pulses from $d_3$ are not allowed to pass. As soon, however, as the leading edge of the regenerated pulse appears at the cathode of tubes $CT_4$ and $CT_5$ this is transmitted through 0. mf. coupling capacitor $CP_6$ and a 50 k. charging resistance $R_2$ to capacitor $CP_5$ which relatively slowly charges up. Thus the bias on the rectifier diminishes and the next pulse $d_3$ to arrive through the 2000 mmf. capacitor $CP_5$ will be admitted into the anode circuit of tube $FT_5$ and will restore the flip-flop circuit to normal. In this way a 200 microsecond pulse is created and fed into the explorer circuit of all registers.

Figure 18:
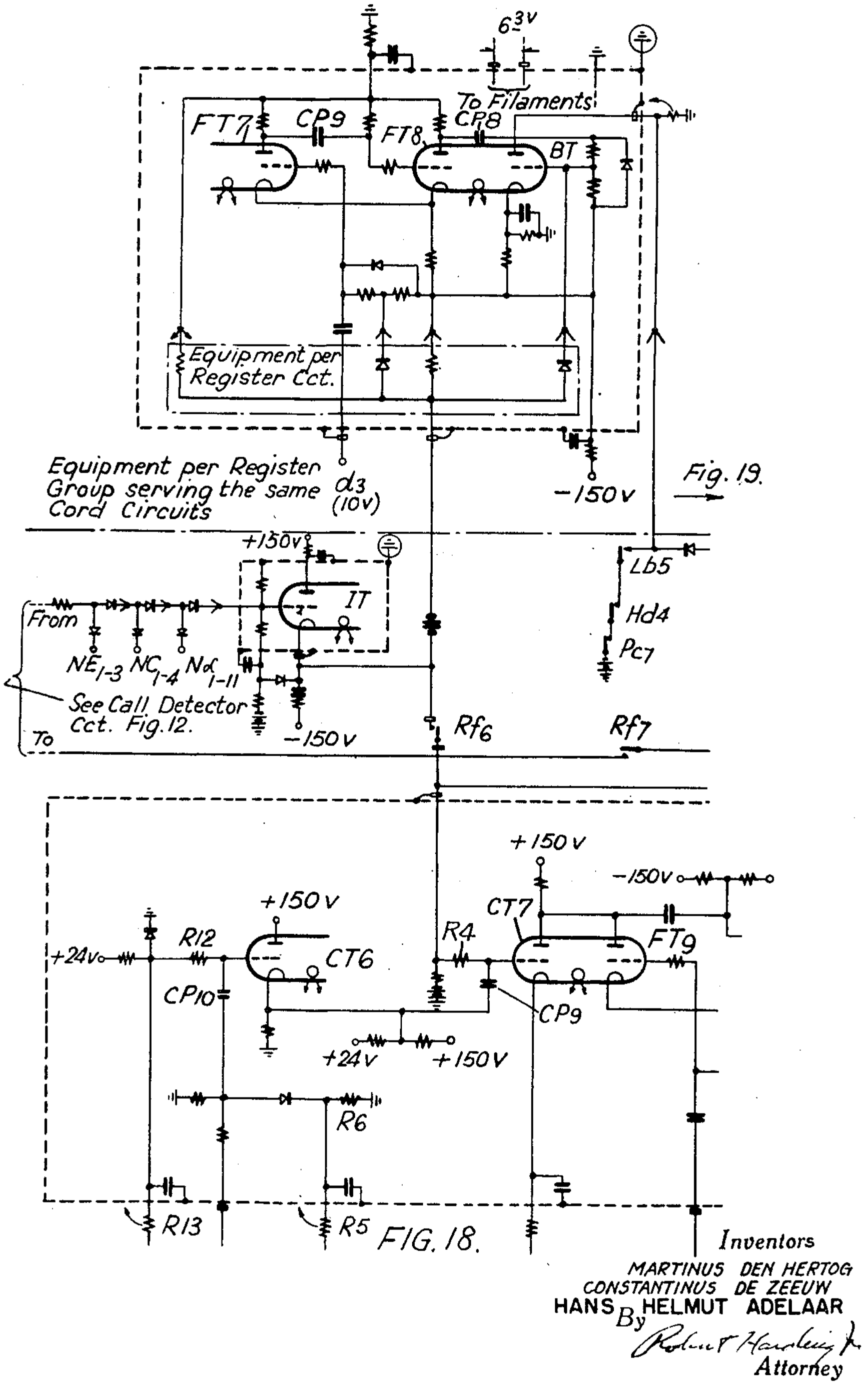

The pulse which has been sent by the call detector, although applied to the explorers of all registers simultaneously, is only permitted to pass through the explorer of that register from which the impulse was supplied to which the call detector responded. This impulse is received on the tube IT (Fig. 18) through the explorer which is shown connected to the grid of this tube. Tube IT is connected as a cathode follower and acts on a circuit comprising 3 tubes, BT, $FT_7$ and $FT_8$ (Fig. 18).

In the first place the impulse from IT acts on a blocking tube BT, because the positive impulse supplied from IT will be connected via a capacitor to the grid of BT of which the anode circuit is thereby caused to become more negative owing to which a gate connected in the anode circuit becomes conductive and will thereby act on the potential of the grid of tube TP (Fig. 19) in such a manner that this tube will not be able to supply free test potential to other call detector circuits. The blocking action by BT is first of all controlled by the impulse supplied to it from tube IT during the time this responds to the impulses from the call detector. After this time the action of the blocking tube BT is continued under the control of tubes $FT_7$ and $FT_8$ which constitute a flip-flop circuit and which are turned over under the action of the same impulse supplied from IT.

It will be seen, that tube $FT_8$ is normally conducting and tube $FT_7$ is normally blocked. By an impulse received from IT, this condition is reversed, so that thereby the anode potential of $FT_8$ becomes more positive. This positive potential is transmitted via capacitor $CP_8$ of .5 mf. to the grid circuit of BT and thus continues the blocked condition of this tube for a period of approximately 20 to 30 m.s. which time is determined by the time constant of the flip-flop circuit obtained by the use of a 0.1 mf. capacitor $CP_9$ between the anode of $FT_7$ and the grid of $FT_8$. After this time, the flip-flop circuit again returns to normal, so that the action of the blocking tube is discontinued, but the busy condition of the register which was caused by the action of this tube is taken over before its action stops by the fact that contact $Lb_5$ (Fig. 18) on relay $Lbr$ (Fig. 23) closes and provides a direct negative potential on the gate controlling the grid of TP. The manner in which $Lbr$ operates in the space of 20 to 30 m. s. will be described later.

It should be observed here that the action of the flip-flop circuit comprising $FT_7$ and $FT_8$ only commences at the end of the impulse produced by tube IT, because it is controlled by an impulse supplied from a source $d_3$. The impulse from IT has the purpose of charging a capacitor via which the impulse source $d_3$ is connected and when now this impulse source becomes positive at the beginning of the next time unit, the potential of the condenser is superposed on the impulse supplied from $d_3$ and only the sum of these two potentials is able to act on the grid of $FT_7$.

It should be observed also that the group of tubes comprising $FT_7$, $FT_8$ and BT is provided in common for a subgroup of registers and further it should be observed that the blocking tube BT acts on the blocking gates of all registers of the sub-group concerned in parallel. In this manner not only the register which caused the call detector to respond is blocked, but also all other registers of the same group, which is necessary, as has been described before, in order to avoid the engagement of two or more registers at a moment when only a single cord circuit is available in a group.

The impulse supplied from tube IT, besides controlling the blocking of the group of registers as described above, also acts on the register which caused the call detector to respond in the following manner:

The cathode circuit of IT is connected to the grid of a tube $CT_7$ at the register via a contact $Rf_6$ of relay $Rfr$ which is operated, as described before. Tube $CT_7$ operates in conjunction with a comparator tube $CT_6$ which normally is used in order to control the selection of a predetermined outlet or group of outlets, but which in this particular case only serves to control the operation of $CT_7$ in such a manner that an impulse received by the latter tube, will act only in the next time unit. For this purpose $CT_6$ is controlled by the trigger impulse supplied from a source $d_3$ which is transmitted by $CT_6$ under the present condition, because its grid circuit is connected to a potentiometer connected between +24 v. and −48 v., so that a potential of about "0" v. prevails normally at the grid. The short trigger impulse transmitted by $CT_6$ is superposed on a charge of 100 pf. capacity $CP_9$ connected to the grid of $CT_7$ and which was charged by the impulse from IT. The superposed potentials applied to the grid of $CT_7$ causes this tube to become conductive, and the anode of this tube now acts on a flip-flop circuit with one stable condition comprising $FT_9$ and $FT_{10}$ which provide an impulse slightly shorter than that of a normal basic time unit, and then again revert to normal. This is brought about by the fact that the flip-flop circuit changes over under the control of trigger impulses $d_3$, which is supplied right at the beginning of each basic time unit and returns to normal again under the control of a second trigger impulse supplied from source $d_2$, supplying an impulse towards the end of each basic time unit.

At the anode of $FT_{10}$ a rectangular pulse is supplied to the grid of an amplifying tube $CT_8$ acting as a cathode follower, and the impulse supplied from the cathode of this tube is applied to a recorder comprising a number of cold cathode tubes. The impulse is supplied to the control electrodes of each of these cold cathode tubes, each of which is further controlled by an impulse source in such a manner that depending on the time the impulse arrives, one tube in each group will be ionized and thereby provide information on the time unit in which the impulse was received. The principle of this arrangement is known from U. S. Patent No. 2,595,378, issued May 6, 1952. The cold cathode tubes that are used for recording the time of the impulse received from the call detector are controlled by impulse sources having the same time positions as the impulse sources used in connection with the explorers used by the call detectors, viz. cycles of 4, 11 and 3 impulses respectively. Accordingly there is one group of four cold cathode tubes $Vc1-4$ controlled by sources $Rc_{1-4}$, another group of 11 cold cathode tubes $Vd1-11$ controlled by $Rd_{1-11}$, and a third group of 3 tubes $Ve1-3$ controlled by sources $Re_{1-3}$. The manner in which these sources are connected to the different cold cathode tubes of each group differs for each register in such a way that when an impulse is received the cold cathode tubes will light for all registers in the same combination for impulses received from the same call detector. By way of example the drawing shows the connection of these sources for register No. 1 in which the sources are connected in the manner shown in order to ionise in the required combination. Each of the cold cathode tubes ionized causes its anode relay to operate and moreover a relay *Vor* energises in parallel with the cathode resistances that are provided for each group of tubes. The anode relays operated, therefore, indicate by their combination the identity of the call detector from which the impulse has been received and this enables the register to cause a free first line finder to be selected in the corresponding 100's group. The manner in which this happens will be described presently:

The operation of relay *Vor* (Fig.22) causes relay *Lbr* (Fig. 23) to energise via make contact $Vo_1$ and break contact $Laa_1$ and $Ti_3$. Relay *Lbr* at its make contact $Lb_8$ operates a helping relay *Hlbr*, and this relay at its break contact $Hlb_9$ (Fig. 25) now opens the circuit for *Rfr* which on contact $Rf_7$ disconnects the free test potential provided from the register to all call detectors. As already explained above, the operation of *Lbr* already disabled the tube TP by the connection of full 48 v. battery to the grid circuit thereof, so that from this moment tube TP does not need to be controlled any longer by the flip-flop circuit, comprising tubes $FT_7$ and $FT_8$ which may now restore to their normal condition.

In order to obtain access to the calling line, the register has to execute three main functions as follows:

(*a*) Hunting for a free cord circuit in the required group of cords and operation of the cord chooser multi-switch so as to connect the register to this free cord.

(*b*) Connection to the "ESBO" circuit of the group of second line finders which must handle the call and electronic control of hunting for a free first line finder by the "ESBO" circuit. Upon a free first line finder having been determined and after the cord chooser has connected the cord circuit, the connection via the second line finder to the selected first line finder may be completed.

(*c*) The connection to the "ESBO" circuit of the first line finders and finals of the 100's group in which the calling line is located, the determination of the calling line's identity, the determination of the class of calling line, and subsequently after the second line finder has through-connected to the selected first line finder, the through-connection of this first line finder to the calling line. It should be noticed here that certain of the operations at first and second line finder "ESBO" circuits can already take place simultaneously and mutually with those taking place at the cord chooser stage.

The three stages of operation referred to above will now be described separately, although it will be understood that part of these operations may overlap.

It should further be understood that for the purpose of simplifying the present description, the drawing does not show "ESBO" connectors for the purpose of connecting the register circuit to the various "ESBO" circuits, but it is understood that the registers will exercise their function of controlling the different "ESBO" circuits via "ESBO" connectors in the manner that has been described in application, Serial No. 343,871, filed March 23, 1953. The connections including these "ESBO" connectors between register and "ESBO" circuits have been indicated in broken lines on the key sheet Fig 27. On Figs. 22 and 23, 24 and 25 separations have been indicated which represent the different "ESBO" circuits to which the register is connected. The connections between the register and these separations have been shown by direct connections. It will be understood from the above that the actual connections to these separations should include the contacts of "ESBO" connectors. The operations of the "ESBO" connectors will not be described in the present description.

As may be seen from Fig. 9 and the corresponding table shown on Fig. 10, the explorer associated with the registers by means of which the call detectors are explored is divided into 8 branches each corresponding to 12 call detectors and a 9th branch corresponding to 4 call detectors. Considering the first branch which has been completely shown on the drawing, Fig. 9, it will be seen that this branch is distinguished from all the other branches by the connection to terminal H of one of the impulse sources $Nd_{1-11}$. The corresponding terminals I to P of the other branches will be connected to different sources as may be seen from Fig. 10. The 12 call detectors associated with each branch are those that correspond to the 12 groups of 100 lines selected by one group of cord corcuits. It follows from this that in the times which are used to indicate to the registers the identity of a call detector, the *Nd* cycle is used to distinguish the different groups of cord circuits, that is in a particular register every *Nd* source is identified with a call originated in a corresponding group of 1200 lines and handled by a corresponding group of cord circuits. Therefore, depending on which of the cold cathode tubes controlled by the Rd sources is ionized, the register will try to obtain a free cord circuit in one of the 9 different cord groups that are provided in a 10,000-line exchange.

Accordingly, each of the relays Dar to Dkr corresponds to one of the cord groups that may have to be selected and, as may be seen from the above, one of these relays has been operated when the register is seized by an impulse from the call detector.

It will presently be described how this relay is used to control the selection by means of the cord chooser and its "ESBO" circuit of a free cord of the particular group serving the calling line.

Considering, however, first of all the composition of the explorer represented by Figs. 9 and 10, it will be seen that in each of the branches of this explorer, with the exception of the 9th, 12 call detectors are connected and that in each of these branches these 12 call detectors are discriminated by 2 groups of sources, viz. those of groups E and C according to Fig. 10, which have been indicated by the symbols $Ne_{1-3}$ and $Nc_{1-4}$, (the N indicating in this symbol the fact that the sources are of type N indicated on Fig. 28). In each branch, each of the 12 different combinations of these 2 groups of pulses indicates one of the 12 call detectors serving the 1200 lines that are connected to a group of cord circuits.

Figure 21:
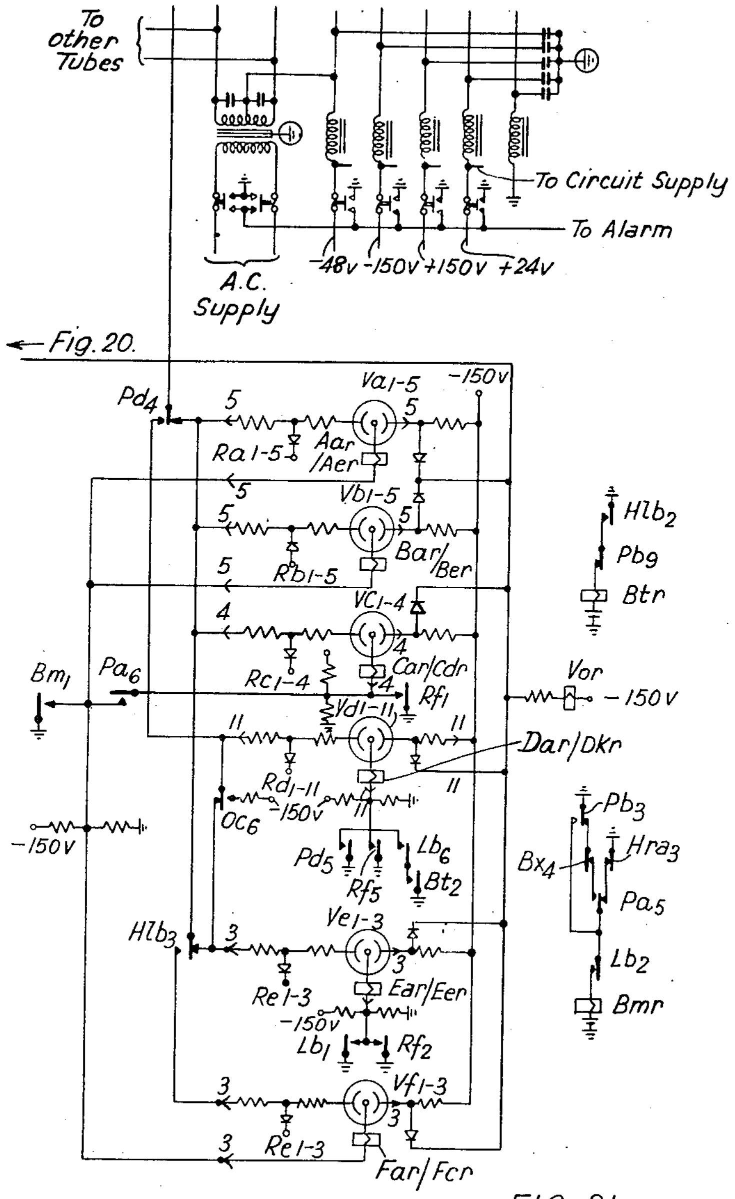
Figure 22:
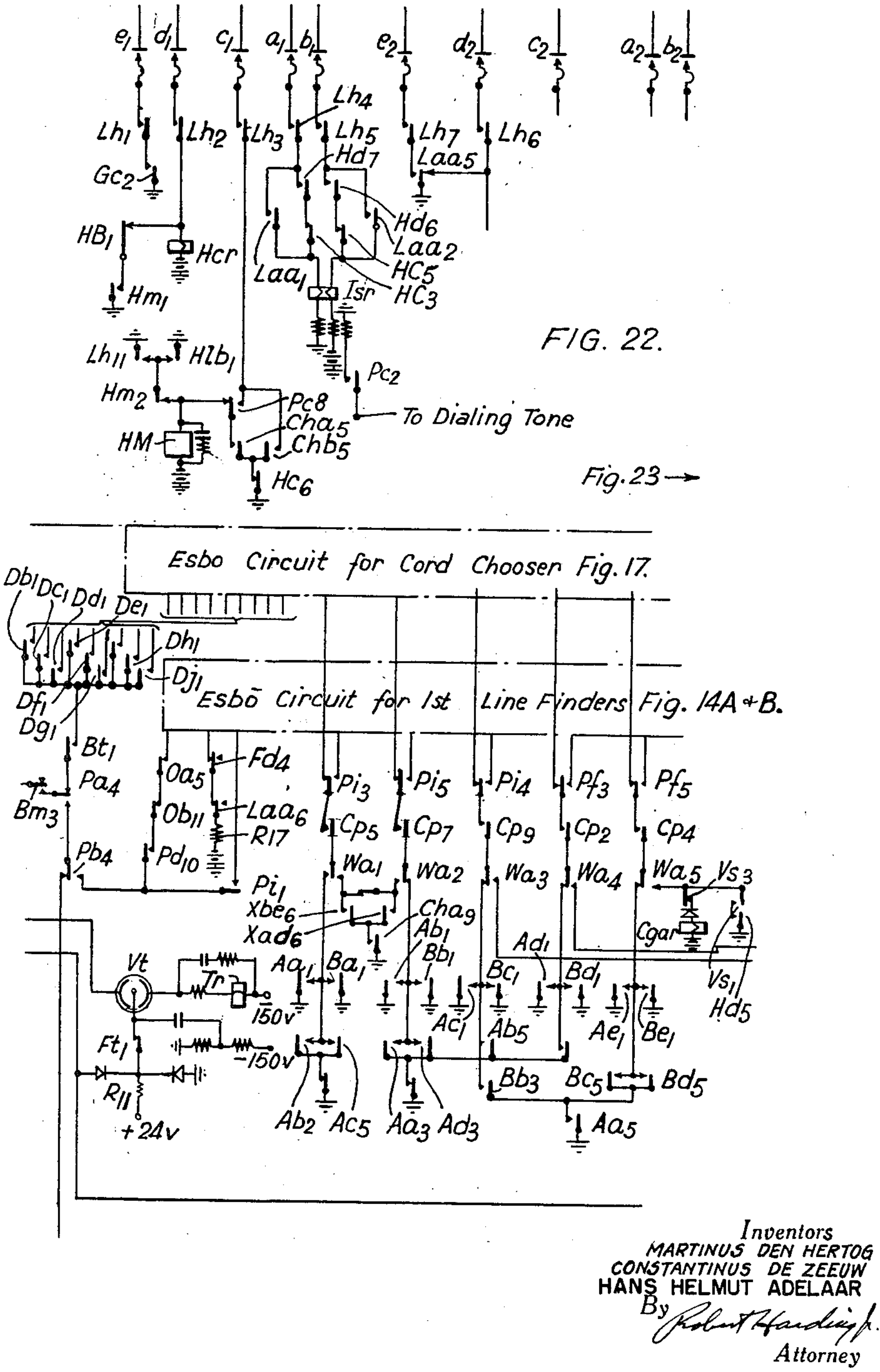
Figure 23:
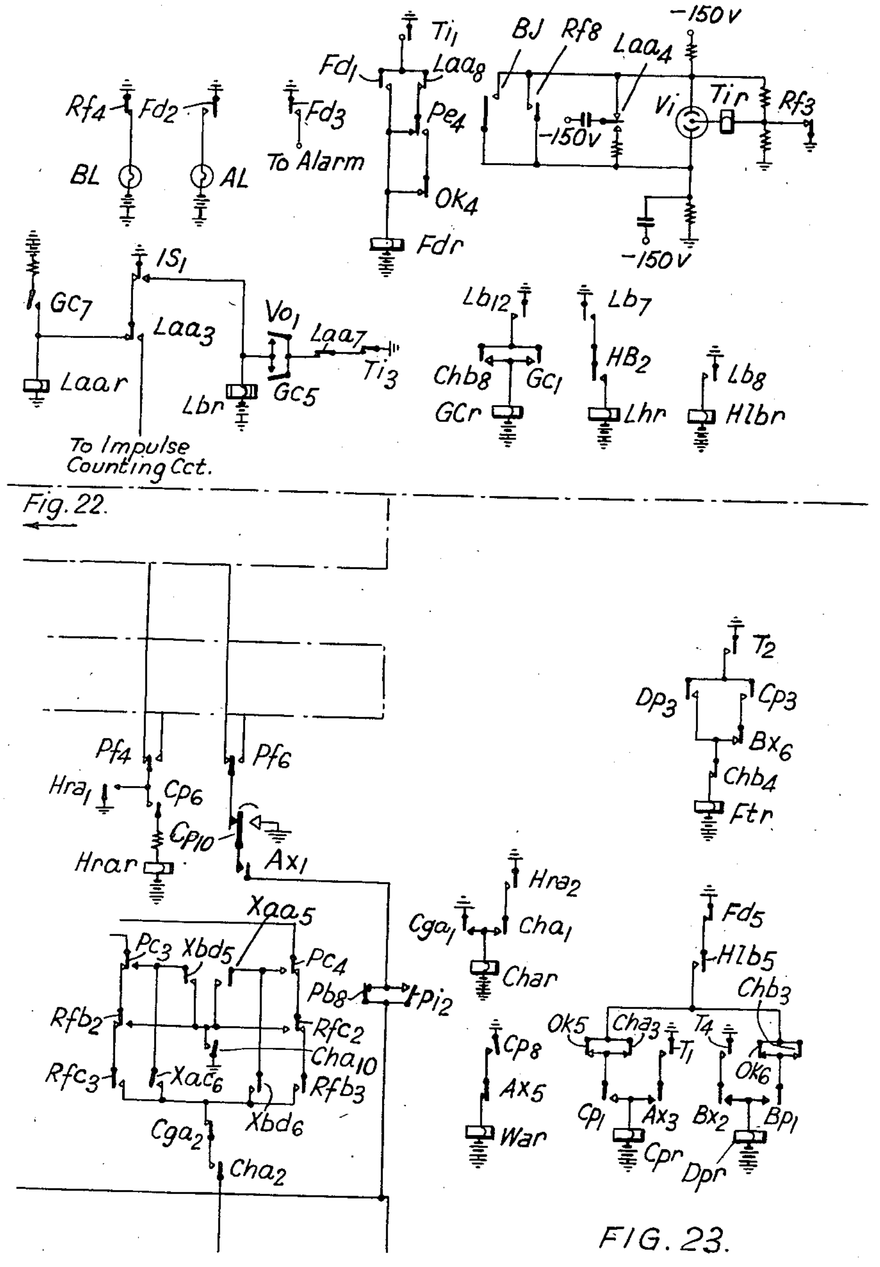

It will be clear from the above that each call detector in a group of 1200 lines is identified with a particular combination of sources Ne and Nc, and according to the call detector which seizes a register, one of the cold cathode tubes for each of the Ne and Nc cycles will ionize and cause the operation of its corresponding anode relay, viz. one of relays Ear to Ecr and one of relays Car to Cdr (Fig. 21).

It will be explained presently, how under the control of the combination of these relays operated, the second line finder will be caused to select a free line finder in one of the 12 groups of first line finders which are connected in its multiple.

Finally, it may be observed that the combination of Nd, Ne and Nc pulses by which the call detectors are identified is different for each of the 100 call detectors that may exist in a 10,000-line office. When a register is seized by a call detector in the way described above, the combination of cold cathode tubes ionized in accordance with the identity of the call detector will, therefore, be used further to cause the selection of a first line finder "ESBO" circuit associated with the same group of 100 subscriber lines as the call detector that seized the register.

With regard to the 9th branch of the explorer shown on Figs. 9 and 10, this comprises only 4 call detectors, and the corresponding 4 groups of 100 lines are served by a 9th group of cord circuits. In this group of cord circuits, therefore, discrimination need be made by the second line finders between 4 groups of first line finders only and the operation is similar to that for the other groups of cord circuits.

*Selection of free cord circuit in wanted group*

As has been explained above, the hunting for a free cord circuit in the wanted group is controlled by the operated condition of one of the group of cathode relays Dar to Dkr. These relays, as all other anode relays of the different groups of cold cathode tubes involved in the seizure of a register, initially received their operating ground from make contacts of relay Rfr, which as explained above, is a relay that is permanently operated when the register is free and capable of receiving a call. As soon as the register has been seized and relay Lbr has operated, as explained above, this will energise relay Bmr at make contact $Lb_2$, via break contacts $Pa_5$ and $Hra_3$. The purpose of relay Bmr is to provide a ground to the anode relays of those cold cathode tubes that were not needed in connection with the seizure of the register. Ground is continued independent of relay Rfr to the group of anode relays associated with the valves Vd by the closure of ground via make contacts $Lb_6$ and $Bt_2$, relay Btr having operated from ground at make contact $Hlb_2$ via break $Pb_9$. The circuit is now ready to control the hunting for a free cord circuit in one particular group, for which purpose the grid of the comparator tube $CT_7$ is connected via a resistance $R_4$ of 400,000 ohms, make contact $Bm_3$, break contact $Pa_4$ and make contact $Bt_1$ to make a contact on each of those 9 anode relays that are associated with the nine tubes Vd that may operate as a result of the receipt of an impulse from a call detector. It may be seen from the composition of the impulse timing, Figs. 9 and 10, that the 9 relays of which one may be operated, are Dbr to Djr, and according to which of these 9 relays is operated by the impulse from the call detector, the comparator is connected to one of 9 corresponding wires that lead into the "ESBO" circuit for cord choosers, Fig. 17. At this "ESBO" circuit these 9 wires are connected to the cathodes of 9 corresponding tubes. These tubes act as cathode followers and are controlled by the various cord circuits that are associated with the register group of which the register under consideration forms part. This register group has access to a number of cords in each of the 9 groups into which the cord circuits are divided, and all cords in each of these 9 groups, that are associated with the register group under consideration, are connected to the corresponding one of the 9 tubes just described. It may be assumed, e. g. that the number of cords served by one register group is 50, and in this case every one of these cords is characterized by one of 50 different time positions. This time position is allotted to each cord circuit by means of a network of resistances and gates, one of which has been indicated for a cord circuit in an inset on Fig. 17. The gates are so connected to sources $Pa_{1-5}$, $Pb_{1-5}$ and $Pe_{1-2}$ that each of the 50 cords served by a group of registers will produce an impulse in a different time position, when free, by the application from the cord circuit, see Figs. 15 A and B of a positive 24-v. potential to resistance $R_5$ of 100,000 ohms shown in the inset. The left-hand side of the network provided for each cord is connected to the grid of the corresponding tube in the cord chooser "ESBO" circuit, Fig. 17, according to the group in which the cord circuit is connected. In this manner, when the 50-cord circuits served by a group of registers are proportionally divided over all 9 groups of cord circuits, the different tubes in Fig. 17 are connected to a corresponding number of networks associated with the various cord circuits.

It will now be clear, that by the fact that only one of contacts $Db_1$ to $Dj_1$ is closed, only the free cord circuits of one group will be able to transmit an impulse through the corresponding tube in the cord chooser "ESBO" circuit to the register, and when this impulse is received, it will, by the time of its arrival, indicate the identity of this cord and its location in the cord chooser multiple.

When an impulse is received from a free cord, this is transmitted via the cathode follower tube in the "ESBO" circuit to the comparator tube $CT_7$, and this will respond to the first impulse it receives, because tube $CT_6$ is so connected under the conditions now considered, that it will transmit a trigger impulse at the beginning of each time unit to capacitor $CP_9$ connected to the grid of $CT_7$. This action of $CT_6$ may be explained by the fact that the grid of this tube is connected permanently to a −48-v. potential via 3 gates and via break contacts $Oc_3$, $Oc_4$ and $Oc_5$. Accordingly, the impulse supplied via 200 micro-microfarad capacitor $CP_{10}$ to the grid of $CT_6$ from impulse source $d_3$, will be transmitted for every time unit by the cathode of $CT_6$ to the condenser $CP_9$ connected to the grid of $CT_7$. As a result of this, this condenser will be charged at the beginning of every time unit, so that if an impulse had arrived from the cord circuit "ESBO" during the preceding time unit, this charge may bring the grid of $CT_7$ to a potential high enough to render its anode sufficiently negative to start the trigger operation of flip-flop tubes $FT_9$ and $FT_{10}$. The operation of flip-flop tubes $FT_9$ and $FT_{10}$ in conjunction with $CT_7$ and $CT_8$ is the same as has been described when these tubes are used in conjunction with the seizure impulse, so that $CT_8$ will again supply an impulse to the control electrode of certain groups of cold cathode tubes.

It will be noticed, however, that at change-over contact $Hfb_3$ the impulse wire from cathode of $CT_8$ is disconnected from the control electrodes of the groups of tubes $Vd$ and $Ve$ and is connected to the group of tubes $Vf$ instead. The impulse will, therefore, be supplied only to the groups of tubes $Va$, $Vb$, $Vc$ and $Vf$, but of these groups only the groups $Va$, $Vb$ and $Vf$ will actively respond, because the anode relays of group $Vc$ are not grounded, relay $Rfr$ having been released. The active tubes are controlled by impulse sources $Ra$, $Rb$ and $Re$ which correspond in timing to the impulse sources used in connection with the gate (Fig. 17) by means of which the time positions of the cords are determined. Therefore, according to the time position of the cord circuit which first transmits an impulse to the register, this impulse will cause one tube out of each of the 3 groups of tubes mentioned to ionize, with the understanding that in group $Vf$ this may be only one of tubes $Vf_2$ or $Vf_3$, because the gates employed at the cord circuits are connected only to sources $Pe_1$ or $Pe_2$, whereas the impulses are delayed by one time unit at the comparator and flip-flop circuit. Besides these tubes, also the blocking tube $Vg$ will ionize because the control electrode of this tube is equally connected to the impulse wire from the cathode of $CT_8$, whereas its anode now is connected via break contact $Oc_7$ and make contact $Bm_5$ to a ground supplied via resistances $R_5$ and $R_6$ of 3,000 and 2,000 ohms in series.

Owing to the ionization of this tube, the potential at the point of juncture of these 2 resistances now becomes more negative and as a consequence of this, a rectifier connected to this point becomes conductive, so that further impulses supplied from source $d_3$ to the grid circuit of tube $CT_6$, will be absorbed by this rectifier and are no more able to effect tube $CT_6$. As a consequence no more trigger impulses will be supplied from $CT_6$ to the comparator tube $CT_7$, owing to which the register will reject any further impulses that may be supplied subsequently from other free cord circuits.

Upon the impulses having been registered as described above, on 3 sets of cold cathode tubes, one of the corresponding anode relays in each of these groups will operate and now a circuit will be completed for the operation of relay $Axr$ (Fig. 24) as follows: ground, break contact $Oa_8$, break contacts $Hra_4$ and $Pd_7$ in parallel, a make contact on one of relays $Aar$ to $Aer$ and further via a make contact on one of relays $Bar$ to $Ber$ and winding of $Axr$ to battery. As a result of the operation of $Axr$ the register now proceeds with the seizure of the cord chooser "ESBO" circuit, so that exclusively the register under consideration will be able to act on the mechanical cord chooser switch associated with this "ESBO" circuit. For this purpose, a sequence test is made in an electronic manner to a test potential which is provided from the cord chooser "ESBO" circuit and which is now connected from +24- v. through a resistance $R_7$ of 5,000 ohms (Fig. 17), break contacts $C_7$, $Sva_1$ and $Svb_1$ to the register, where it is continued (Fig. 23) via break contact $Pf_6$, break contract $Cp_{10}$, make contact $Ax_1$, break contact $Pb_8$ to the grid circuit of tube $ST_1$ (Fig. 19). This grid is further controlled by 3 gates that are connected at the point of juncture of 2 resistances $R_8$ and $R_9$ of 100,000 ohms and 400,000 ohms respectively, inserted in the grid circuit just described, whereas further the source $d_3$ is connected to this grid via a capacitor $CP_{12}$ of 200 micro-microfarads.

The 3 gates just mentioned are connected to a combination of sources $Pe$, $Pc$ and $Pd$ which is different for every register in the exchange and which thereby determine for each register the individual time in which it may respond to the presence of a positive potential from the cord chooser "ESBO" circuit. The reason for this is that when several registers would attempt to control the operation of the mechanical cord chooser switch simultaneously, each after having recorded the identity of one of the cord circuits to be connected via this switch, these registers will be able to do so only one at a time, and that one register will get preference which is able to respond to the positive potential first. By means of the 3 gates mentioned 132 different combinations may be obtained corresponding to as many different time positions for 132 registers, so that as many as 132 registers may be engaged in making a sequence test to the same cord chooser circuit, if necessary, without causing the seizure of this circuit by 2 registers simultaneously.

The tube $ST_1$ is so controlled by the trigger impulse from source $d_3$ and the gates which are connected to its grid that it will respond only at the beginning of a time unit following that in which the gates passed an impulse. The impulse passed by the gates cause $CP_{12}$ to charge and this charge, when added to the charge supplied by an impulse from source $d_3$, is able to trigger the tube $ST_1$. Tubes $ST_1$ and $ST_2$ together with the transformer connected to $ST_2$ constitute a blocking oscillator, which causes an impulse of predetermined duration to be supplied via a resistance $R_{10}$ of 500,000 ohms to the control electrode of cold cathode tube $Vt$. This tube, by firing, causes a circuit to close through a resistance $R_{11}$ of 10,000 ohms connected in its anode circuit and via the winding of a relay $Tr$ connected to its cathode. The drop of potential caused in $R_{11}$ acts through a gate on the test wire leading to the test potential supplied from the cord chooser "ESBO" circuit, owing to which this test potential is so much reduced that no further registers are able to test on it in subsequent time positions. The operation of relay $Tr$ energizes relay $Cpr$ (Fig. 23) from ground at make contact $T_1$ via make contact $Ax_3$. $Cpr$, at its make-before-break contact $Cp_{10}$ now connects full ground to the test wire, rendering this busy independent of tube $Vt$.

A second function of $Cpr$ is that it sets free the sequence test arrangement for subsequent use, by means of a relay $Ftr$ which now operates from ground at make contact $T_2$ via make contact $Cp_3$ and break contacts $Bx_6$ and $Chb_4$. $Ftr$ opens at break contact $Ft_1$ the anode circuit for tube VT which thereby extinguishes and releases $Tr$ causing $Ftr$ again to de-energise by opening contact $T_2$. Tube VT remains extinguished and, therefore, the action of the gate connected to its anode circuit is discontinued, but as may be seen from the above description, the function of busying the test wire from the cord chooser "ESBO" circuit has meanwhile been taken over by relay $Cpr$, which at the same time has disconnected this test wire from the sequence test arrangement.

$Cpr$ further, on 5 make contacts, $Cp_5$, $Cp_7$, $Cp_9$, $Cp_2$ and $Cp_4$, extends circuits from contacts on the various anode relays of those cold cathode tubes which are operated as a record of the identity of the cord circuit to be connected, via 5 wires to the cord chooser "ESBO" circuit. As a result of this, a combination of 5 code bar magnets in this "ESBO" circuit will operate corresponding to the vertical row of contacts in the cord chooser multiple to which this cord is connected. The code bar magnets by operating, signal their operated condition by extending their operating ground via a sixth wire and via the winding of a relay $Cr$ at the cord chooser "ESBO" circuit (Fig. 17) to the register, where this causes the operation, via break contact $Pf_4$ and make contact $Cp_6$, of a high-resistance relay $Hrar$. Relay $Cr$ is not able to energise in series with this high resistance. As soon as $Hrar$ operates, it connects full ground at make contact $Hra_1$ to the sixth wire from the cord chooser "ESBO" circuit just mentioned, owing to which it closes a holding circuit for itself under the control of make contact $Cp_6$, and further this has the effect of connecting full ground to the winding of $Cr$ at the cord chooser "ESBO" circuit.

Relay $Hrar$ further at break contact $Hra_3$ opens the circuit for relay $Bmr$, which now releases and thereby disconnects at $Bm_1$ the ground to the anode of the groups of tubes $Va$, $Vb$ and $Vf$, which thereby extinguish and release their anode relays. At the same time also, tube $Vg$ extinguishes by the disconnection of its anode circuit at $Bm_5$.

As a consequence of the release of the anode relays, the operating circuit for the code bar magnets which were energized via make contacts of these relays, is now opened, but the code bar magnets which were energised will now hold via their locking contact and the winding of relay $Cr$ to the ground provided at the register to this winding at make contact $Hra_1$. Owing to the fact that the operating ground for the code bar magnets is now opened, the relay $Cr$ which up till now was grounded at both sides of its winding, is able to operate and signals its operated condition to the register by means of its changeover contact $C_6$, which now connects a —150 v. potential via make contacts $E_4$ and $D_4$ (Fig. 17) to one of the five wires initially used for operating the code bar combination.

In the meantime, by the release of the anode relays, also the operating circuit for relay $Axr$ (Fig. 24) is opened, so that this now releases and this, in its turn, causes the energisation of relay $War$ (Fig. 23) from ground at make contact $Cp_8$ via break contact $Ax_5$. Relay $War$ changes over the five wires from the cord chooser "ESBO" circuit initially used for the operation of the code bar combination for different use, so that these wires are disconnected from the make contacts on the various anode relays.

One of the consequences of this is that the —150 v. potential which signals the operated condition of relay $Cr$ at the cord chooser "ESBO" circuit, is now extended via the changeover contact $Wa_5$ and break contact $Vs_3$ to a relay $Cgar$, which is so connected in series with a rectifier that it will only operate on a potential which is more negative than the —48 v. potential which may prevail on this wire so long as $Cr$ has not operated. $Cgar$ operates a helping relay $Char$, at make contact $Cga_1$ and $Char$ locks itself via its make contact $Cha_1$ to ground make contact $Hra_2$.

The operation of relay $Char$ initiates three different operations simultaneously. The first of these is that a circuit is closed for the operation of that horizontal magnet on the mechanical cord chooser switch (Fig. 22) which corresponds to the register under consideration, in preparation of the through-connection of this register to the cord circuit which is about to be connected. The circuit for this horizontal magnet is from ground at break contact $Hc_6$ (Fig. 22) via make contact $Cha_5$ and break contact $Pc_8$ to the magnet of HM. The fact that this magnet is operated is signalled to the register by the closure of a make contact $Hm_1$ on this horizontal magnet which causes the operation of relay $Hcr$ from ground at contact $Hm_1$ via the break contact on the horizontal bar of the cord chooser $HB_1$. The second action consequent upon the operation of relay $Char$ is the operation of both vertical servo magnets of the mechanical cord chooser switch which cause the two vertical bars to lift, corresponding to the vertical row of contacts indicated by the combination of code bar magnets operated. This is in preparation for the closure of the two sets of five contacts, each of which is provided at the intersection of a horizontal and a vertical bar. It will be seen that for connecting the register to the cord circuit via the cord chooser switch, a total of ten connections is provided via ten contacts of the switch, so that two sets of five contacts are made to operate by lifting both vertical bars of a vertical row.

The third function to take place under the control of $Char$ is the release of one of the two relays $Dr$ or $Er$ at the cord chooser "ESBO" circuit (Fig. 17), both of which relays are normally energised in an obvious circuit and one of which is made to release by being short-circuited at the register by connecting a full ground to either of two wires forming part of the five wires originally used for the operation of the code bar magnets. Whether relay $Dr$ or $Er$ is to be short-circuited depends on whether the cord to be connected is located in the first 25 outlets of the cord chooser switch or in the second group of 25 outlets. In the first case the cord had signalled its identity by means of a time position controlled by source $Pe_1$, owing to which at the register, tube $Vf_2$ had ionized and anode relay *Fbr* had operated. In the other case, the cord had signalled the fact that it belongs to the second group of 25 cords connected in the cord chooser multiple by using a time position making use of source $Pe_2$, owing to which tube $Vf_3$ had ionized and anode relay *Fcr* had operated.

Both tubes and anode relays have already been disabled as has been previously described, but the fact whether *Fbr* or *Fcr* had operated was registered by means of either relay *Rfbr* or *Rfcr*, for which a circuit was closed from ground at break contact $Pa_7$ and next either via make contact $Fb_1$ or $Fc_1$ to the winding of either *Rfbr* or *Rfcr*, either of which relays when operated locks via its make contact $Rfb_1$ or $Rfc_1$ to ground at make contact $Hlb_6$. Depending on which of these two relays now is operated, ground will be closed from make contact $Cha_{10}$, either via make contact $Rfb_2$, break contact $Pc_3$, make contact $Wa_3$, make contact $Cp_9$, break contact $Pi_4$, make contact $D_1$ (Fig. 17) and make contact $C_4$ to the winding of *Er* which thereby is short-circuited and caused to release, alternatively via make contact $Rfc_2$, break contact $Pc_4$, make contact $Wa_4$, make contact $Cp_2$, break contact $Pf_3$, make contact $E_1$ (Fig. 17) and make contact $C_5$ to the winding of *Dr*, which in this case is short-circuited and caused to release.

Either *Dr* or *Er* releasing causes this to be signalled to the register by the disconnection of —150 v. potential from the wire leading to relay *Cgar* which, accordingly, releases.

Over a break contact of *Cgar* a check is now made that both vertical servo magnets have completely operated and depending on whether relay *Dr* or *Er* was short-circuited, this check is made in two alternative ways as follows:

Assuming that *Dr* was short-circuited, a circuit is closed from +24 v. (Fig. 17) via 10,000-ohm resistance $R_{12}$, make contact of vertical servo magnets $SVb_2$ and $SVa_2$, break contact $D_1$ to the register, break contact $Pi_4$, make contacts $Cp_9$ and $Wa_3$, break contacts $Pc_3$ and $Rfb_2$ (relay *Rfbr* not being operated in this case), make contact $Rfc_3$ (this being operated in the case assumed), break contact $Cga_2$, make contact $Cha_2$, break contact $Pd_3$ via a rectifier to the grounded winding of *Vsr*. The presence of the rectifier prevents *Vsr* from operating on a potential which is negative with respect to ground and which might be present on the wire from the "ESBO" circuit, so long as *Dr* has not released.

Assuming, however, that *Er* was short-circuited, the circuit for *Vsr* will be completed via make contacts $SVb_2$ and $SVa_2$ as before, and next via break contact $E_1$, break contact $Pf_3$, make contacts $Cp_2$ and $Wa_4$, break contacts $Pc_4$ and $Rfc_2$ (*Rfcr* being released in this case), make contact $Rfb_3$ (*Rfbr* being operated in the case assumed) and next in the same circuit as described previously.

It has been described before that the operation of the horizontal magnet of the switch was checked by the operation of *Hcr* and this operates its helping relay *Hdr* at make contact $Hc_1$ and when now, in the way described above, it has been checked that everything is prepared for the through-connection of the register to the cord circuit, this is completed by the operation of either of the two horizontal servo magnets *Sha* and *Shb* (Fig. 17) provided on the mechanical cord chooser switch. Which of these two servo magnets operates depends on whether relay *Dr* or *Er* was short-circuited at the "ESBO" circuit, i. e. whether the cord connected belongs to the first or the second group of 25 in the multiple. The circuit for the horizontal servo magnet is as follows: from ground at make contact $Hd_5$, via (lower right of Fig. 22) make contact $Vs_1$, make contacts $Wa_5$ and $Cp_4$, break contact $Pf_5$, make contact $C_6$ (Fig. 17) and then either via break contact $D_4$ to horizontal servo magnet SH*a* (Fig. 17) or via make contact $D_4$ and break contact $E_4$ to horizontal servo magnet SH*b* (Fig. 17). The operation of these magnets closes ten contacts $e_1$, $d_1$, $c_1$, $a_1$, $b_1$, $e_2$, $d_2$, $c_2$, $a_2$, $b_2$, (Fig. 22) by which the register is connected to the cord circuit (Figs. 15A and 15B), and also opens the horizontal bar contact $HB_1$ (Fig. 22) owing to which relay *Hcr* now releases and thereby signals to the register that the horizontal bar has completed its horizontal movement. This completes the circuit for relay *Okr* (Fig. 25) via ground at break contact $Hc_4$ and make contact $Hd_2$, and relay *Okr* by operating signals the completion of this part of the operation, so that the register may disconnect itself from the cord chooser "ESBO" circuit. This happens by causing relay *Cpr* (Fig. 23) to release by opening break contact $Ok_5$, and *Cpr* now disconnects all wires leading to the cord chooser "ESBO" circuit and also removes the grounds from the test lead from this circuit, so that this circuit is thereby liberated and available for use with other registers.

The opening of the various contacts on *Cpr* causes the release of the code bar magnets, as well as any of the servo magnets that were operated at the cord chooser "ESBO" circuit. Further the short-circuit of either *Dr* or *Er* (Fig. 17) is removed, so that both relays will again be in the operated condition, whereas the holding circuit for *Cr* (Fig. 17) is equally opened, so that *Cr* releases and by closing its break contact $C_7$ via the break contacts of the vertical servo magnets, re-establishes test potential to other registers. Further by opening $Cp_8$, relay *War* (Fig. 23) releases, by opening $Cp_6$ relay *Hrar* releases, and by the opening of either contact $Cp_2$ or $Cp_9$, relay *Vsr* (Fig. 25) at the register will release.

The release of *Hrar* opens the holding circuit for *Char*, (Fig. 23) so that this also falls off and this in turn opens the holding circuit for *Hdr* (Fig. 25) at make contact $Cha_6$, so that *Hdr* de-energises and in its turn opens the operating circuit for *Okr*. This is the last relay which now releases and completes this part of the operation. The fact that this operation has been completed is recorded at the register by the operation of a relay *Pcr* (Fig. 20) which is energised from make contact $Ok_2$ and locked via its make contact $Pc_1$ to ground at make contact $Hlb_{10}$. The register, therefore, is now in a condition with relay *Pcr* operated in which it is connected to the cord circuit and in which it may complete the functions of the second line finder circuit.

*Control of second line finder operation*

The operation in connection with this second line finder circuit had, however, already been started much earlier, viz., as soon as the cold cathode tubes and their anode relays had been disabled by the release of relay *Bmr*. The fact that the anode relays had released was checked, as described previously, by the operation of relay $War$ and this relay now initiates the operation in connection with the second L. F. This commences with the energisation of relay $Par$ via make contact $Wa_6$, $Par$ holding itself (Fig. 20) via its make contact $Pa_1$ to ground at make contact $H1b_4$.

The first result of the operation of $Par$ is the re-energisation of $Bmr$ (Fig. 21) which this time happens from ground at break contact $Pb_3$, via break contact $Bx_4$, and make contacts $Pa_5$ and $Ib_2$. $Bmr$, as before, connects ground through the anode relays of different groups of cold cathode tubes to their anodes, preparing these tubes for operation when an impulse is received. The groups of cold cathode tubes now involved are $Va$, $Vb$, $Vc$ and $Vf$, the group $Vc$ having been connected by the closure of make contact $Pa_6$.

Figure 24:
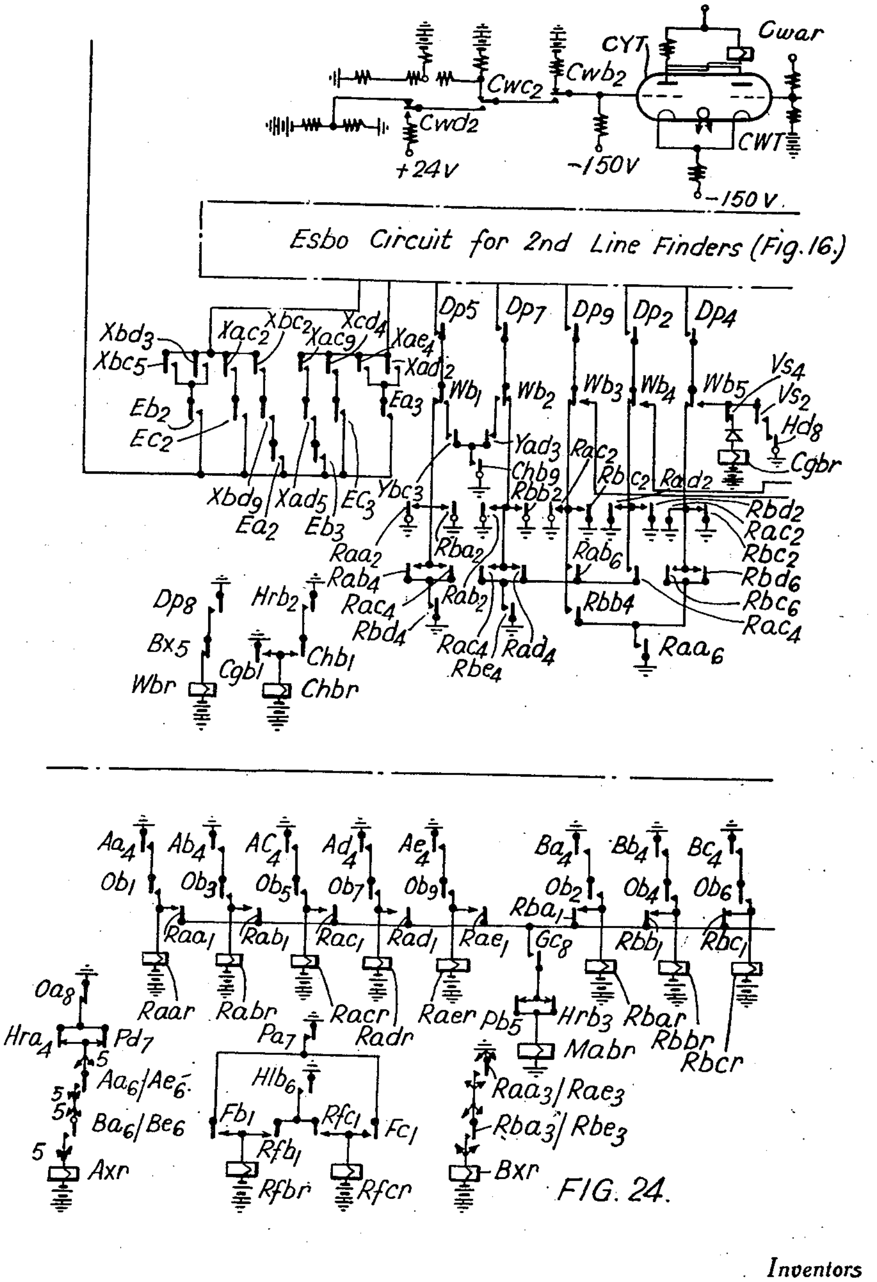
Figures 24, 25:
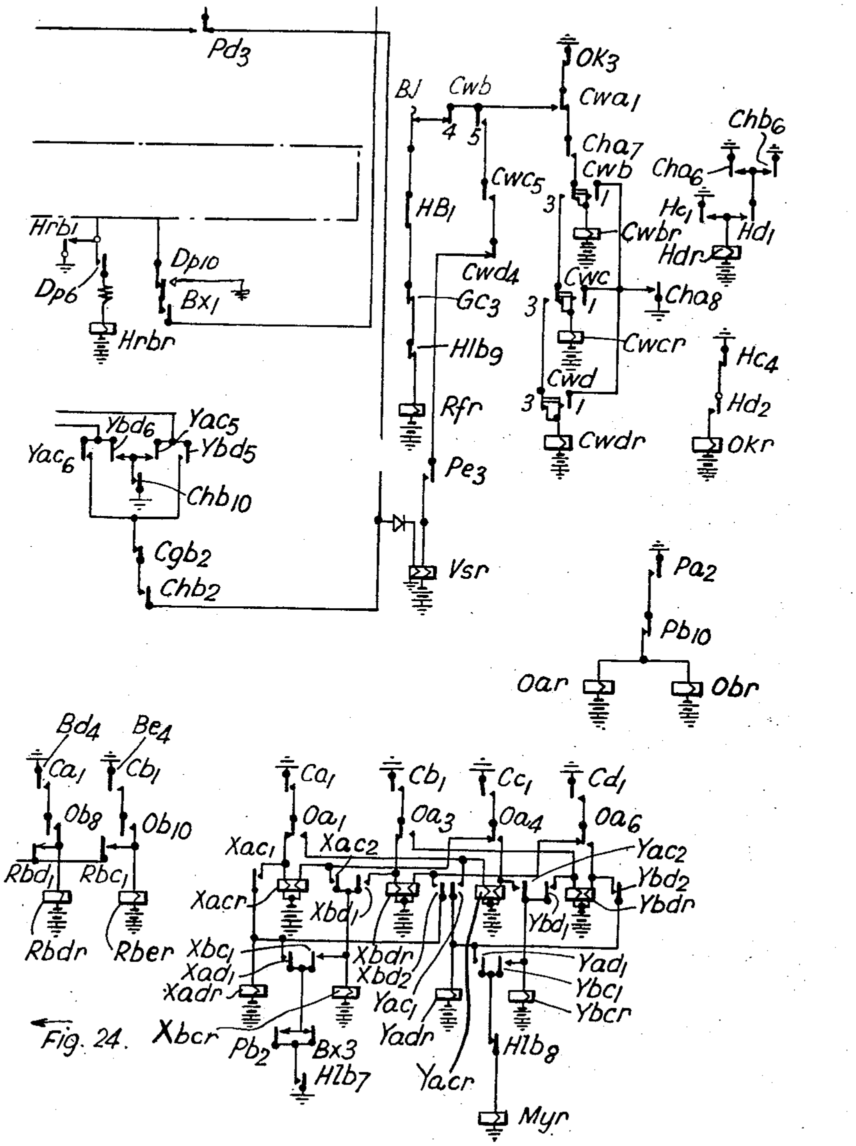

A second result of the operation of $Par$ is the energisation of relays $Oar$ and $Obr$ (Fig. 25) from ground at make contact $Pa_2$ via break contact $Pb_{10}$. These two relays prepare the operating circuits for the groups of recording relays $Raar$ to $Raer$, $Rbar$ to $Rber$ (Fig. 24) and further a group of four relays $Yacr$, $Ybdr$, $Yadr$, and $Ybcr$ (Fig. 25). A combination of these recording relays will energise under the control of the anode relays which will presently energise in a combination to record the identity of the second line finder outlet to which the connection has to be extended and which will now be determined electronically.

For the purpose of describing the manner in which the hunting by the second line finder "ESBO" circuit of a free first line finder in the calling lines' group is performed under the control of the register, first of all a study should be made of the manner in which the explorer at the second line finder "ESBO" circuit is arranged (Fig. 16). It will be seen that this explorer is divided into 4 branches which are associated with outlets 00 to 24, 25 to 49, 50 to 74 and 75 to 99 respectively. The 12 groups of first line finders are connected to each second line finder group and as each second line finder group is divided into 2 sub-groups each group of second line finders is connected to half the number of first line finders in each of the 12 groups. When assuming that the number of first line finders in all first line finder groups is equal, the groups are so divided that the first line finder groups from 1 to 3 are connected to outlets 00 to 24 of the second line finders, first line finder groups 4 to 6 to outlets 50 to 74, first line finder groups 7 to 9 to outlets 25 to 49, and finally first line finder groups 10 to 12 to outlets 75 to 99 of the second line finder multiple. In this way it will be seen that each part of the explorer at the second line finder "ESBO" needs to take care of three different groups of first line finders only, and accordingly three different combinations of sources are to be connected to the 25 individual circuits corresponding to the outlets in each of the four branches.

It should further be observed that at the second line finder "ESBO" actually two entire separate explorers are provided, the first of which corresponds to outlets 00 to 49 and the second to outlets 50 to 99 and each of these two explorers is connected by a separate lead via the "ESBO" connector to the register circuit. Depending on whether the first line finder group to be selected is one of the first or one of the second group of 6, the register will connect the lead from one or the other of the two explorers to the comparator for the purpose of hunting for a free outlet in the wanted first line finder group. This hunting, therefore, happens only over maximum 6 groups and accordingly in each of the two explorers discrimination need be made between 6 groups by the connection of 6 different combinations of sources to the groups of the individual wires corresponding to the individual outlets.

As will be seen on the drawing in each explorer the 6 groups of line finders are discriminated by combinations of sources $Pc_{1-2}$ and $Pe_{1-3}$ and it may be seen that in each explorer the two branches are distinguished by the connection of the two sources $Pc_{1-2}$, whereas the three groups in each branch are further distinguished by the connection of the three $Pe$ sources.

It should now be further studied in which manner the register has taken record of the first line finder group in which the calling line is connected.

From what has been said before, it will be remembered that the impulse received from the call detector which identifies this 100's group is recorded on the group of cold cathode tubes $Vc$, $Vd$ and $Ve$, of which the combination of $Vc$ and $Ve$ should indicate the first line finder group to be selected by the first line finder.

The group of anode relays $Car$ to $Cdr$ associated with tubes $Vc$ has meanwhile been disabled, but a record was taken of the particular one of these relays which was operated by means of a group of four recording relays $Xacr$, $Xadr$, $Xbcr$ and $Xbdr$.

These relays operate in the following combination:

1. When $Car$ has energised, it operates $Xacr$ and $Xadr$, the circuit for $Xacr$ is from make contact $Ca_1$ via break contact $Oa_1$, and after $Xacr$ has operated, this circuit is continued via make contact $Xac_1$ to the winding of $Xadr$. Both relays operated provide a holding circuit for themselves.
2. When $Cbr$ had energised, the combination of relays $Xbdr$ and $Xbcr$ operates in a similar circuit as described under 1, and the relays lock also when energised.
3. When $Ccr$ had energised, relays $Xacr$ and $Xbcr$ are operated in a similar circuit and lock.
4. When $Cdr$ had operated, relays $Xbdr$ and $Xadr$ operate and lock.

A second group of cold cathode tubes on which a record was taken, denoting the first line finder group, is group $Ve$ and the anode relay corresponding to the tube ionized is caused to remain energised in series with this tube, independent of relay $Rfr$, whose contact $Rf_5$ prepared the circuits for the $Ve$ tubes and their relays, by the provision of a ground from make $Lb_1$. In this particular case, the anode relays themselves, therefore, act as recording relays.

Under the combined control of the group of four recording relays operated under the control of $Car$ to $Cdr$, and of the anode relays $Ear$ to $Ecr$, the comparator is now connected to one out of two different groups of sources, the combination of which indicates the first line finder group to be hunted for. The circuit for the connection of these sources to the comparator is from the grid of tube $CT_6$ (Fig. 18) via a 200,000 ohm resistance $R_{12}$ and a 360,000 ohms resistance $R_{13}$ to three gates connected respectively to changeover contacts $Oc_3$, $Oc_5$ and $Oc_4$. Via break contacts $Oc_3$ and $Ax_4$ a $-48$ v. potential is connected to the first gate which causes this gate to become ineffective. The second gate is connected via break contact $Oc_5$ and make contact $Pa_3$ to combinations of the recording relays just mentioned via which either source $Rc_1$ or $Rc_2$ may be connected depending on whether the wanted first line finder group is connected to the first or second branch of each of the two explorers at the second line finder "ESBO" circuit. Via the third gate and break contact $Oc_4$ and make contact $Pa_8$, access is given via one of the contacts and anode relays $Ear$ to $Ecr$ to one of the three impulse sources $Re_1$ to $Re_3$, depending on whether the line finder group to be connected is the first, second or third in one of the branches of the explorers at the second line finder "ESBO" circuit.

It should be noticed that although the sources $Rc_3$ and $Rc_4$ may be connected in parallel to one of the sources $Rc_1$ or $Rc_2$ by the relay combinations just described, the connection of these sources has no effect under the conditions now under consideration. The connection of the impulse sources affects the operation of tube $CT_6$, in such a manner that the trigger pulse $D_3$ connected to the grid of this tube will be effective only if in the preceding time unit an impulse had been received from one of the sources $Rc$ or $Re$ which had charged $CP_{16}$ connected in series with this trigger pulse. Only by the superposition of the two charges mentioned, will $CT_6$ in the known way transmit the trigger pulse from its cathode to the grid of $CT_7$ and permit this to respond if this pulse is received in the time unit following that on which an impulse was received from the second line finder "ESBO" circuit, indicating the identity of a free first line finder circuit. The impulse to comparator tube $CT_7$ is received from the second line finder "ESBO" circuit in either of two circuits depending on whether the wanted first line finder group belongs to the one or the other group of 6, as follows: from the grid of tube $CT_7$, via $R_4$, make contacts $Bm_3$ (Fig. 22) and $Pa_4$, break contact $Pb_4$ to combinations of contacts on the relays $Ear$ to $Ecr$, $Xacr$, $Xbcr$, $Xadr$, $Xbdr$ (Fig. 24) which had recorded the identity of the first line finder group to be selected as a result of the seizure impulse from the call detector, and then via one of the two leads to the corresponding two explorers at the second line finder "ESBO" circuit (Fig. 16).

Assuming that an impulse is received indicating a free first line finder in the wanted group, this will become effective at the grid of tube $CT_7$ only if it coincides with an impulse from one of the sources $Rc$ or $Re$ applied to the grid of tube $CT_6$, because only in this case the trigger pulse supplied by $CT_6$ will cause $CT_7$ to become effective in the next time unit. The operation of $CT_7$ now acts in the way already described before, i. e. the flip-flop tubes $FT_9$ and $FT_{10}$ operate, causing tube $CT_8$ to supply an impulse of determined length to the control electrodes of the various groups of cold cathode tubes connected (Fig. 21). One out of each of these groups $Va$, $Vb$ and $Vc$ will function and thereby record the position of the second line finder outlet to which connection is to be made.

As a result of the operation of the corresponding anode relays, one of each of the corresponding groups of recording relays (Figs. 24 and 25) will now energise, viz. $Raar$ to $Raer$ in connection with tubes $Va$, $Rbar$ to $Rber$ in connection with tubes $Vb$, and a combination of relays $Yacr$, $Ybdr$, $Yadr$ and $Ybcr$ in connection with the tubes $Vc$. The circuits for the operation of these recording relays have already been described; they are controlled by make contacts of the relays $Oar$ and $Obr$ and the particular relay in each group operating will close a holding circuit for itself via one of its make contacts. The winding of either relays $Mabr$ (Fig. 24) or $Myr$ (Fig. 25) is inserted in this holding circuit, but these relays are kept short-circuited for the moment so long as the anode relays are energised.

As a result of the operation of one out of the first two groups of recording relays, relay $Bxr$ (Fig. 24) now energises via a make contact on each of the two relays concerned in series. The operation of the recording relays permits the liberation of the cold cathode tubes which then may again be used for other purposes. This happens by causing the release of relay $Bmr$ by opening break contact $Bx_4$ in the operating circuit of this relay. $Bmr$ in the same way as described before extinguishes all the cold cathode tubes ionized and causes the corresponding anode relays to release, as a result of which now the relays connect in series with the holding circuit of the groups of recording relays, viz. $Mabr$ and and $Myr$ will now energise. At this moment the control of the first line finder operation may already commence as will be described presently.

Continuing with the operation of the second line finder, the first thing to happen now is that the sequence test arrangement comprising tube $ST_1$ and $ST_2$ (Fig. 19) is again brought into operation, the test lead to which tube $ST_1$ is connected now being extended via make contact $Bx_1$ and break contact $Dp_{10}$ to the "ESBO" circuit of the second line finders (Fig. 16). When the second line finder "ESBO" circuit is free, i. e. when no other register is engaged in effecting through-connection on the mechanical switch, +24 v. potential will be present on this test lead and the sequence test arrangement will enter into operation in the same way as described before and cause this lead to be busied first of all electronically and subsequently by the consecutive operation of relays $Tr$ and $Dpr$. The relay $Dpr$ energises from make contact $T_4$ via make contact $Bx_2$ and at its make before break combination $Dp_{10}$ it grounds the test lead from the second line finder "ESBO" circuit and disconnects this circuit from the sequence test arrangement. $Dpr$ further in a similar way as described before again discontinues the sequence test arrangement by energising relay $Ftr$ at make contact $Dp_3$, and $Ftr$ by opening the anode circuit of tube VT causes this to extinguish and relay $Tr$ to release, de-energizing in its turn $Ftr$.

The second line finder "ESBO" circuit has now been seized by the register for the operation of the mechanical switch and this happens in a similar way as described before in connection with the cord chooser circuit by operating consecutively a vertical and horizontal bar. The vertical bar is operated first of all by energising a combination of code bars indicating the vertical row of contacts corresponding to the outlet selected and this combination of code bar magnets is determined by the combination of recording relays $Raar$ to $Raer$ and $Rbar$ to $Rber$ which is operated. Contacts of these recording relays are inserted in circuits leading to five wires from the register to the second line finder "ESBO" circuit via five break contacts of relay $Wbr$ and five make contacts of relays $Dpr$. The operating ground for the code bar magnets is returned via a 6th wire connecting the register with the second line finder "ESBO" circuit causing the operation at the register of relay Hrbr (Fig. 25) which, in a manner similar to that described before in connection with relay Hrar, puts a full ground at one of its make contacts on this 6th wire, ensuring thereby the connection of this full ground to the winding of relays SCr at the second line finder "ESBO" circuit and a holding circuit for itself.

The operation of Hrbr further opens the holding circuit for the sets of recording relays Raar to Raer and Rbar to Rber, by the opening of break contact $Hrb_3$, the parallel contact $Pb_5$ having already opened previously by the operation of relay Pbr via make contact $Mab_1$ and $My_2$. As a result of this the two sets of recording relays as well as Mabr de-energise, but Pbr remains locked via its make contact $Pb_1$ to ground at $Hlb_4$.

Resulting from the release of the two sets of recording relays, the operating grounds for the code bar magnets at the second line finder "ESBO" are opened, owing to which relays SCr at this "ESBO" circuit may now energise, which signals its operated condition by the connection of −150 v. via a resistance $R_{15}$ of 3,000 ohms and make contacts $SE_4$, $SD_4$, $SC_6$ to the register circuit.

Meanwhile at the register circuit relay Bxr released, owing to the opening of the contacts on the recording relays via which it was energised and this relay by releasing operates Wbr, via break contact $Bx_5$ from ground at make contact $Dp_8$.

Wbr has five change-over contacts which are inserted in the five leads between the register and the "ESBO" circuit which were used initially for the operation of the code bar magnets and which are now going to be used for a different purpose. In the first place the operation of relay SCr at the "ESBO" circuit is signalled now by energising relay Cgbr via make contact Wb, and this in its turn operates a helping relay Chbr at make contact $Cgb_1$, this helping relay locking itself to ground at $Hrb_2$.

The function of relay Chbr is similar to that of Char described before, viz. it causes the operation of one out of two vertical servo magnets at the second line finder "ESBO" circuit, the release of either SDr or SEr at this circuit, and the operation of the individual horizontal magnet on the second line finder multi-switch which is associated with the cord circuit engaged by the register.

The operation of either one or the other of a vertical servo magnet is caused by the closure of ground from make contact $Chb_9$, either via make contacts $Ybc_3$, $Wb_1$ and $Dp_5$ to vertical servo magnet SSVa, or via make contacts $Yad_3$, $Wb_2$ and $Dp_7$ to servo magnet SSVb.

Either of relays SDr or SEr is caused to release by a short circuit owing to the connection of ground from make contact $Chb_{10}$, either via make contacts $Ybd_6$, $Wb_3$ and $Dp_9$ for short-circuiting SEr, or via $Yac_5$, $Wb_4$ and $Dp_2$ for short-circuiting SDr.

The release of either SDr or SEr is checked by the opening of −150 v. potential at the "ESBO" circuit which causes Cgbr at the register to release.

The third function of Chbr is to operate the individual horizontal magnet of the second line finder switch. This happens by means of a relay Gcr (Fig. 23) energising from ground at make contact $Lb_{12}$ via make contact $Chb_8$ and which locks itself independently of Chbr via a make contact $Gc_1$. Gcr closes a circuit for the horizontal magnet from ground at make contact (Fig. 22), via make contact $Lh_1$, contact $e_1$ of the register chooser to the cord circuit (Fig. 15A) where this ground is continued via break contact $Ea_4$ to the horizontal magnet HL of the second line finder. Owing to the operation of this magnet, the busy relay Bcr at the cord circuit is released by opening break contact $Hl_1$ and Bcr signals its release and the operation of the horizontal magnet by connecting ground from break contact $Bc_3$ via make contact $Hl_2$, break contact $HBl_1$, wire and contact $d_1$ of the register chooser to the register where it causes the operation via make contact $Lh_2$ (Fig. 22) of relay Hcr. Hcr in its turn operates Hdr at make contact $Hc_1$. The operation of Hdr, therefore, signals to the register that the horizontal magnet at the second line finder has energised and the operation of the vertical bar at this second line finder is now checked by the operation of relay Vsr in the following circuit: From +24 v. at the "ESBO" circuit (Fig. 16) via either contact SSVa or SSVb, depending on whether the one or the other of the vertical servo magnets was energised, and next via two alternative paths depending on whether relays SDr or SEr was released, viz. if SDr was released via break contact $SD_1$ to the register where it continues via make contacts $Dp_9$, $Wb_3$ and $Yac_6$, break contact $Cgb_2$ and make contact $Chb_2$ to the ground, winding of Vsr via a rectifier. The alternative path is via break contact $SE_1$ at the ESBO to the register via make contacts $Dp_2$, $Wb_4$ and $Ybd_5$, and further as described for the first path.

The operated condition of Hdr and Vsr now permits the register to connect through the second line finder by the operation of the horizontal servo magnet, the circuit for which is closed from ground at $Hd_8$ via make contacts $Vs_2$, $Wb_5$ and $Dp_4$ to either servo magnet SSHa or SSHb, depending on whether SDr or SEr was previously released. The consecutive operation of the horizontal bar connects-through the second line finder to the first line finder and opens contact $HBl_1$ (Fig. 15A), via which relay Hcr was operated at the register, which now releases and thereby causes the operation of Okr via break contact $Hc_4$ and make contact $Hd_2$. As a result of this the second line finder "ESBO" circuit is liberated and all relays at the register circuit engaged with the control of this "ESBO" circuit are released in a similar manner as has been described in connection with the cord chooser "ESBO" circuit.

*Control of first line finder operation*

The first line finder operation starts at the moment the cold cathode tubes, used for the exploration of first line finders by the second line finder, have been liberated and at the moment relay Pbr energises to record the fact that this part of the operation has been completed. The first result of Pbr operating is the release of relays Oar and Obr which disconnect the make contact of the anode relays of the cold cathode tubes from the different sets of recording relays on which the result of the exploration by the second line finder was recorded, so that these relays will not be further affected by subsequent operations of the cold cathode tubes and their anode relays. At break contact $Pb_9$, the circuit of relay Btr (Fig. 21) is opened, and Btr releases and at contact $Bt_2$ disconnects the ground for the anode relays of the set of cold cathode tubes Vd. One of these cold cathode tubes and its anode relays was maintained operated up to this time from the moment the register was seized by the seizure impulse from the call detector, and it was used in order to indicate which of the cord groups had to be selected. This set of tubes now becomes free for further use.

The operation of the second line finder is prepared for by re-energising B*mr* via make contacts $Pb_3$ and $Lb_2$, and this relay again connects ground to the anodes of the various sets of cold cathode tubes.

The first operation to be performed is to determine the identity of the calling line in the particular 100's group and for this purpose the three sets of tubes V*a*, V*b* and V*c* will again be used.

In a manner not to be described here, the register meanwhile has operated the "ESBO" connector, by means of which it is connected to that first line finder "ESBO" circuit corresponding to the calling line's 100's group. The connection of this "ESBO" circuit has been controlled by the combination of recording relays operated as a result of the seizure impulse from the call detector and for the purpose of the description it will now be assumed that the register is connected by a number of leads to this first line finder "ESBO" circuit which has been indicated by a separation on Figs. 22 and 23 of the register circuit, and which is shown complete on Figs. 14A and B.

For the purpose of identifying the calling line, use is made of the explorer by means of which the line circuits are connected to the call detector and which provides an impulse in time positions characteristic of the calling line. These impulses are transmitted from the call detector circuit via wire I to the "ESBO" circuit for first line finders from where they are further transmitted to the register (Fig. 22) and are connected via break contacts $Oa_5$, $Ob_{11}$, $Pd_{10}$ and make contact $Pb_4$, $Pa_4$ and $Bm_3$ to the grid circuit of the comparator tube $CT_7$ (Fig. 18). This comparator is now so connected that it receives a trigger impulse at the beginning of each time unit, so that it may respond to an impulse arriving from the call detector in any time position, and in order to accomplish this, the tube $CT_6$ is caused to transmit this trigger impulse to the grid circuit of $CT_7$ by the fact that the three gates connected to the grid circuit of $CT_6$ are now all connected to a −48 v. potential. These gates, therefore, are all non-effective owing to which the trigger impulses from source $d_3$ applied to the grid of $CT_6$ may be transmitted in each time unit.

The connection to −48 v. potential of the three gates controlling $CT_6$ is via break contact $Oc_3$ and $Ax_4$ for the first gate, via break contact $Oc_5$ and make contact $Pb_6$ for the second gate, and via break contact $Oc_4$ and make contact $Pb_{11}$ for the third gate.

The impulses indicating the calling lines' identity when received at the comparator tube $CT_7$ now immediately act on the trigger tubes $FT_9$ and $FT_{10}$ in the way described before, and cause tube $CT_8$ to supply an impulse to the cold cathode tubes which function in a corresponding combination.

This time as a consequence of the operation of one of the first two sets of tubes and anode relays, a circuit is closed again for relay A*xr* from ground of break contact $Oa_8$ and via break contact $Pd_7$ and one make contact of each of the groups of anode relays operated.

After the operations now described, there is still one electronic function to be performed by the register which is the determination of the calling lines' class. This will be recorded on the set of tubes V*d*, the other sets of tubes not being required for this purpose, so that they may be used for recording the calling lines' identity and need not be liberated.

Following the operation of A*xr*, P*dr* energises via make contact $Pc_2$ and $Ax_2$, and provides a locking circuit for itself independent of A*xr*. P*dr* in its turn energises consecutively its helping relays P*fr*, O*cr* and P*ir* at make contact $Pd_6$, $Pf_1$ and $Oc_2$ respectively. The purpose of relays P*ir* and P*fr* is to change over the circuits controlling the operation of the "ESBO" circuit from the cord chooser "ESBO" circuit to the first line finder "ESBO" circuit. This happens by means of a number of changeover contacts $Pi_3$, $Pi_5$, etc. The relay O*cr* (Fig. 20) has three changeover contacts which disconnect the gates controlling tube $CT_6$ from −48 v. potential and connects them to contacts on various groups of anode relays which are operated in accordance with the identity of the calling lines' number in the 100's group.

Further purpose of relay O*cr* is to disconnect the blocking tube VG (Fig. 20) which operated at the time the cold cathode tubes operated for recording the calling lines' identity and which prevents these tubes from reacting to an impulse from any other subscriber who might be calling simultaneously in the same 100's group. The impulse wire from the call detector via which this has signalled the identity of the calling line to the register is opened at break contact $Pd_{10}$, so that the register will not be able to respond to any impulses from calling subscribers in the 100's group to which it is connected, also after the blocking tube VG has been extinguished.

The comparator tube is connected instead via make contact $Pi_1$ to another wire leading to the first line finder "ESBO" circuit which extends to the cathode of the tube which at this "ESBO" circuit is controlled by the explorer forming part of it. This explorer will be employed to signal to the register the class of the calling line, as will be described presently. In the meantime the register proceeds with the seizure of the first line finder "ESBO" circuit for the purpose of acting on the mechanical switch associated therewith and to this end it connects the sequence test arrangement via the test lead to the test potential provided at the "ESBO" circuit in case this is free. The operation of this sequence test arrangement may be seen from +24 v. at the "ESBO" circuit (Fig. 14A) via make contact $FD_2$ and $FE_2$ in parallel, make contact $FAl_1$, 5,000 ohms resistance $R_{16}$, break contacts $FC_7$, $FSVa_1$ and $FSVb_1$ to the register where it is continued via make contact $Pf_6$, break contact $Cp_{10}$ and make contacts $Ax_1$ and $Pi_2$ to the grid circuit of tube $ST_1$. When the "ESBO" circuit is free, the sequence test arrangement operates in the manner already described before and busies the test lead to the "ESBO" circuit, initially in an electronic manner and subsequently by the consecutive operation of relays T*r* and C*pr*. Further, as soon as this has happened, the sequence test arrangement at the register is again restored to its normal condition in the way already described by the momentary operation of relay F*tr*.

The operation at the first line finder "ESBO" circuit now proceeds in the manner already described before, i. e. circuits will be closed under the control of the two sets of anode relays associated with tubes Va and Vb for the operation of a combination of code bar magnets at the first line finder "ESBO" circuit which happens via five make contacts of Cpr, Pir and Pfr. Again in the manner described the operation of these magnets is signalled to the register by extending their operating ground at their "ESBO" circuit to a 6th wire causing the energisation of Hrar.

Because the cold cathode tubes should not be extinguished now on account of the fact that they are used to keep a record of the calling lines' identity, the operation of relay Hrar now does not cause the release of Bmr which would extinguish the tubes, but it causes the release of relay Axr by opening break contact $Hra_4$. This in its turn causes the immediate operation of relay War via make contact $Cp_8$ and break contact $Ax_5$, so that thereby the operating grounds for the code bar magnets are disconnected from the five wires leading to the "ESBO" circuit and relay FCr at this "ESBO" circuit is able to energise. FCr signals its operated condition by connecting —150 v. in the usual manner, and this now is immediately received via make contact $Wa_5$ on relay Cgar which operates and in its turn energises Char.

This relay, in the usual way, again initiates three functions which will not be described in detail, viz. the operation of the one or the other of the two vertical servo magnets FSVa or FSVb at the "ESBO" circuit, the short-circuiting of either FDr or FEr at this "ESBO" circuit and the operation of the individual horizontal magnet of the particular line finder which has been seized by the second line finder. The circuit for the operation of this horizontal magnet is from ground at break contact $Hc_6$ via make contacts $Cha_5$, $Pc_8$ and $Lh_3$ to contact and wire $c_1$ of the register chooser from where it is extended through the cord circuit (Fig. 15A) via break contacts $Ea_3$ and $Ca_4$ to contact "c" of the second line finder via which it is extended to the first line finder circuit by contact $HB_2$ (Fig. 13) to the horizontal magnet HM which is connected to battery at the first line finder "ESBO" circuit (Fig. 14A). The operation of HM is signalled to the register by the closure of ground at the first line finder circuit at make contact $H_1$, which now via the "d" wire is extended through the cord circuit (Fig. 15A) to wire and contact $d_1$ of the register chooser circuit (Fig. 22) to the register, where it causes the operation of Hcr in the usual way. Hcr energises its helping relay Hdr which is one of the conditions required at the register preparatory to the operation of the horizontal bar at the first line finder switch. It signifies the operated condition of the individual horizontal magnet.

A second indication wanted is the fact that at the first line finder, the vertical bar has operated. In this particular case, this indication is received in a slightly different way than in connection with the cord chooser and the second line finders, and the indication is combined with another check that need be made on the condition of the subscriber's line circuit, viz. a check on the subscriber's "c" wire in order to varify that the line has been rendered busy, owing to the fact that it is in the calling condition. The reason for this is that the calling condition was not checked from the moment the call detector sent the calling lines' identification impulse to the register and quite some time may have elapsed since, because after this time the register may have had to wait for the "ESBO" circuit to become free, if it were engaged in conjunction with another register. Therefore, before proceeding with connecting through the line, another check is considered necessary to verify that the line of which the identity has been recorded at the register is still in the calling condition, and this is obtained by the fact that the subscriber's "c" wire will be at a potential indicating the busy condition of the line. This busy condition is checked by means of tube CWT at the register via make contact of the vertical bar SERVO magnets and will be connected to the subscriber's "c" wire, thereby affording simultaneously a check on the operated condition of the vertical bar and on the busy condition of the calling line.

The circuit for the operation of tube CWT is from the grid of this tube via make contacts $Pd_3$ and $Cha_2$, break contact $Cga_2$ and next via two alternative circuits depending on whether at the first line finder "ESBO" circuit the FDr or FEr relay was released. The first alternative circuit is via make contact $Xac_6$, make contacts $Pc_3$, $Wa_3$, $Cp_9$ and $Pi_4$ to the first line finder "ESBO" circuit where the circuit is continued via break contact $FD_1$ and the contact of the vertical bar which has been operated to close a lead which is individual to each outlet and which in this particular case leads to the outlet of the calling subscriber, viz. to its "c" wire. The other alternative path is via make contacts $Xbd_6$, $Pc_4$, $Wa_4$, $Cp_2$, $Pf_3$, and next to the first line finder "ESBO" circuit where it is completed via break contact $FE_1$ and one of the vertical bar contacts to the "c" wire of the calling subscriber line.

Tube CYT is normally conducting because the potential at its grid in the connections now prevailing is held by a potentiometer at approximately —90 v., so that current will flow through its discharge space and maintain relay Cwar operated, as already explained previously. Owing to this fact, the potential at the cathode of CYT is slightly negative with respect to —90 v. and this same potential will also be impressed on the cathode of tube CWT, owing to which this is kept in the cut-off condition, because in the condition now considered when its grid is not connected to a subscriber's "c" wire, the grid is held by a potentiometer at a value of —99 v. and, therefore, approximately 7 v. negative with respect to the cathode. When now the grid of CWT is connected to a subscriber's line, when this is in the calling condition the potential prevailing on the subscriber's "c" wire will, under the influence of the potentials and resistances connect to the "c" wire at the subscriber's line circuit itself and the potentials and resistances connected to the grid circuit of CWT, assume a value of approximately —53 v. Owing to this, tube CWT will become conducting, its cathode will become equally more positive and thereby cut-off tube CYT, so that relay Cwar releases. This relay now initiates a chain of operations involving the consecutive operation of three relays Cwbr, Cwcr and Cwdr, each of which relays, when energised, causes a change of potential on the grid of CYT by suitable connection of the various resistances in this grid circuit. Cwbr operating first causes the potential on the grid of CYT to change to approximately —55 v., the exact value of this potential may be adjusted by means of a variable resistance, but it should in every case be such that the resulting potential is more negative than that prevailing at the cathode which, as described above, depends on the fact that the cathode of CWT is held at a potential slightly more negative than the potential on its grid. Since, as stated above, the potential on the grid of CWT is approximately —53 v. in the conditions assumed, the cathode of both CWT and CYT are still positive with respect to the grid potential now applied to CYT, so that this tube does not become conducting and *Cwar* remains de-energised.

As a result of this, the sequence operation continues and the next relay in the chain, *Cwcr* energises. This changes the potential at the grid of CYT to approximately —24 v., so that this is now more positive than the cathode potential and this causes CYT to become conducting and *Cwar* to re-energise, thereby stopping the further operation of the chain relays. The operated condition of *Cwbr* and *Cwcl*, therefore, indicate the line to be in the calling condition.

Assuming, however, that the subscriber had released prematurely before this check on the "*c*" wire is made, then the absence of the subscriber's loop would cause the potential on the "*c*" wire to become approximately —75 v. at the moment the grid circuit of CWT is connected to it. Under these conditions CYT is also cut-off in the first place, causing *Cwar* to release, but as soon as this has energised the first of the chain relays *Cwbr*, this changes the potential on the grid of CYT to approximately —55 v. which potential is now positive with respect to that prevailing on the cathodes of CYT and CWT, as determined by the potential of —75 v. on the grid of CWT. Accordingly, CYT again becomes conductive and energises *Cwar*, before this could cause the energisation of *Cwcr*. The operated condition of *Cwar* alone with *Cwbr*, therefore, indicates the condition, of a free subscriber's line.

Assuming the line to be in the calling condition, a circuit will be prepared for the operation of V*sr* controlled by the operated condition of *Cwar*, *Cwbr* and *Cwcr* as follows: ground at break contact $Ok_3$, make contacts $Cwa_1$, $Cwb_5$, $Cwc_5$ and break contact $Cwd_4$ via make contact $Pe_3$ through winding of V*sr* to battery. This circuit is dependent on the operated condition of relay P*er* which will operate only after the class of line indication of the calling line has been received at the register in the manner now to be described.

As already mentioned, the explorer at the first line finder "ESBO" circuit (Fig. 14A) will be used for this purpose, and the cathode of the tube at this "ESBO" circuit is connected via make contacts $Pi_1$, $Pb_4$, $Pa_4$ and $Bm_3$ (Fig. 22) to the grid circuit of comparator tube CT (Fig. 18). The comparator tube is now controlled by the trigger tube $CT_6$, in such a manner that it will receive a trigger impulse only in a time position following that corresponding to the calling line. This is brought about by the fact that the grid circuit of the trigger tube $CT_6$ now is connected via three gates (Fig. 20) to have different sources, by means of contacts $Oc_3$, $Oc_5$, and $Oc_4$, the combination of pulses from which sources determine the time unit of the calling line. These sources are connected under the control of the relays on which the identity of the calling line was recorded as a result of the impulse received for this purpose from the call detector at the register. Accordingly, it will be seen that according to one of the A*ar* to A*er* anode relays of the first group of five being operated, one of sources $Ra_{1-5}$ will be connected to the first gate via make contact $Oc_3$, according to a combination of the anode relays A*ar* to A*er* and B*ar* to B*er* of the second group being operated, one of the sources $Rb_{1-5}$ will be connected to the second gate via make contacts $Oc_5$, and according to the combination of recording relays *Xacr*, *Xado*, *Xbcr*, and *Xbdr* being operated, which relays depend on the anode relays *Car* to *Cdr*, one of sources $Rc_{1-4}$ will be connected to the third gate, via make contact $Oc_4$. The result of this is that a trigger impulse will be supplied only once in a cycle of 100 time units following the time position of the calling line and when this trigger impulse is received by the comparator tube $CT_7$ this tube will respond only when in this time position it had received an impulse from the explorer at the first line finder "ESBO" circuit.

Impulses will be supplied from this explorer, not in every 100 cycles, but only in two out of eleven 100 cycles as determined by the connection to this explorer for every line individually of two out of the eleven N*d* sources to terminals A and B respectively provided for each individual line. The combination in which these N*d* sources are connected for every individual line to terminals A and B determine the class of this line and accordingly the comparator tube will respond in N*d* cycles which are characteristic for the class of the calling line. As two impulses are supplied in a complete cycle of eleven 100 time positions, the comparator tube will respond in two different 100 cycles and will cause the sending of two consecutive impulses from the cathode of tube $CT_8$ in the well-known manner to the set of cold cathode tubes $Vd_{1-11}$, which are now connected to this cathode via make contact $Pd_4$. Accordingly, two out of the eleven V*d* tubes will ionize and thereby record the class of the calling line.

It should be noted that in the conditions now described, the blocking tube VG is disabled by break contact $Oc_7$, so that two successive impulses may be received.

As soon as two out of the eleven anode relays of the set of tubes V*d* have energized, a circuit will be closed via make contact $Pd_2$ for relay P*er*. In this connection, it should be observed that the manner in which the N*d* sources are employed to indicate the class of lines is such that for a free line, which is in the calling condition, always either source $Nd_7$ or $Nd_8$ is provided on one of two terminals A or B of the line to indicate whether the line is of the unrestricted or the restricted type respectively. It will be seen, therefore, that either tube $Vd_8$ or $Vd_9$ will operate, the impulse being delayed by one time position at the comparator, so that for any line either anode relays D*ir* or D*hr* will be energized, the operating circuit for P*er*, therefore, comprises in the first place two parallel contacts on these two relays.

Besides an impulse indicating the unrestricted or restricted condition, a second impulse is sent from any line for which any of the other N*d* sources may be used with the exception of $Nd_6$, because this characterises a busy line which has already been engaged by a line finder or final selector. Since the line in the calling condition is not yet busy in this sense, tube $Vd_7$, corresponding to an impulse from source $Nd_6$, can never ionise in connection with a calling line. As a consequence, the operating circuit for relay P*er* further comprises parallel make contacts or remaining anode relays of tubes V*d* except those already mentioned.

Once P*er* has energised it holds itself independent of the anode relays of tube V*d* and, as already explained above, it now completes the circuit for the operation of relay V*sr* which permits the register to energise the horizontal servo magnet of the first line finder for the purpose of through-connecting the line finder to the calling line. The operating circuit for the horizontal servo magnets in the first line finder is, depending on whether relay FD*r* or FE*r* was released, from ground (Fig. 22) via make contacts $Hd_5$, $Vs_1$, $Wa_5$, $Cp_4$, $Pf_5$ and then either to FSH*a* or FSH*b* in Fig. 14A. The first line finder connects through and signals the operation of its horizontal bar by the opening of break contact $HB_1$ which removes the ground from the "*d*" wire via the second line finder and the cord chooser to which relay H*cr* (Fig. 22) was operated, so that this now releases. As a result of this, relay O*kr* (Fig. 25) energises in the manner already described and in the known way disconnects the first line finder. "ESBO" circuit, releases all servo magnets and code bar magnets and further all relays engaged at the register in the operation of this "ESBO" circuit. The release of H*cr* now completes further the circuit in which the instepping relay I*sr* (Fig. 22) energises in series with the subscriber's loop and in which circuit further dialling tone is provided to the calling subscriber by the connection of a dialling tone transformer in series with the instepping relay. The complete circuit for this instepping circuit is as follows: from ground (Fig. 22) through dialling tone coil and first winding of relay I*sr*, break contact $Hc_3$, make contacts $Hd_7$ and $Lh_4$, contact and lead $a_1$ of cord chooser contact and A conductor of the second line finder contact and A conductor of first line finder and subscriber's line circuit, via subscriber's loop to B conductor and B contact of subscriber's line circuit and first line finder, B conductor and B contact of second line finder to contact and conductor $b_1$ of cord chooser, make contact $Lh_5$ and $Hd_6$ at the register (Fig. 22), break contact $Hc_5$, the second winding of I*sr* and dialling tone coil to battery. The relay I*sr* operates and at break contact opens a short-circuit which up till now prevented the operation of relay L*aar* (Fig. 23) from battery via 600*w* and make contact $Gc_7$, so that L*aar* now operates, and on two make contacts $Laa_1$ and $Laa_2$ overbridges the H*cr* and H*dr* contacts in the instepping circuit (Fig. 22). This happens before relay H*dr* has the possibility of releasing, as a result of the operation of O*kr*. The register is now further held under the control of relay L*br* which holds from the make contact of I*sr*.

The subscriber's line circuit is rendered busy, in two ways. In the first place by connecting a —48 v. potential via a low resistance to the subscriber's "*c*" wire this C conductor is brought to practically the full —48 v. potential and thereby discontinues the operation of the call detector for the line under consideration. The circuit for this potential is from —48 v. at the cord circuit through the 500*w* winding of relay R*lr*, (Fig. 15B) make contact $Ca_2$ on relay C*ar*, (at the cord circuit which energised via contact and wire $e_2$ of the cord chooser from ground via make contacts $Lh_7$ and $Laa_5$ at the register) contact and conductor C of second line finder, contact and contactor C of first line finder to the subscriber's "*c*" wire.

The second way in which the subscriber's line is rendered busy, is by the connection of impulse source $Nd_6$ to the subscriber's "*d*" conductor which is extended to the explorer at the line finder and final selector "ESBO" circuit. This source is connected through a resistance and rectifier in parallel at the first line finder circuit (Fig. 13) and connected in such a way that its effect is to suppress the impulses connected to terminal A at the "ESBO" circuit of the line concerned and replace them by an impulse from source $Nd_6$. In this manner the two impulses characteristic for the calling lines' condition now change character, so that they signify the busy condition of the line whenever a call is directed to this line, so long as it is engaged. The principle of this has already been described in our co-pending application Serial No. 205,916, filed January 13, 1951.

Considering now the operation of the call detector (Figs. 12A and 12B) from the moment this has sent a seizure impulse to the register, it will be seen that some time elapses after this seizure impulse has been sent until the calling line is seized by a line finder and thereby discontinues the operation of the call detector for the call under consideration. During this time, other registers should be prevented from being seized for the same call. As already described, this is taken care of by an arrangement comprising two tubes $FT_3$ and $FT_4$, which work in a flip-flop circuit and which are changed over under the control of the trigger tube $VT_2$, when an impulse is received from a free register, and as already described, the changeover of this flip-flop circuit reverses the flip-flop circuit comprising tubes $FT_1$ and $FT_2$ to its original condition, so that the calling potential is removed and the call detector cannot respond to impulses from any other free registers.

The flip-flop circuit comprising tubes $FT_3$ and $FT_4$ is so connected that it will automatically restore to its original condition after a delay of approximately 300 milliseconds. This time is sufficient to permit the register which has been seized to connect to the first line finder "ESBO" circuit, and as soon as this has happened, the call detector is disabled from the register, so that it is unable to produce any further calls, even if now the flip-flop circuit comprising tubes $FT_3$ and $FT_4$ reverses.

Disabling of the call detector from the register is brought about by the connection of —48 v. potential (Fig. 22) via 1000 ohm resistance $R_{17}$ and break contacts $Laa_6$ and $Fd_4$ to the "ESBO" circuit of the first line finders (Fig. 14A) where this potential is applied via a gate to conductor No. 11 leading into the call detector circuit (Fig. 12A) where it acts on the cathode of trigger tube $VT_1$, preventing this tube from responding to any further calling impulses. It should be noted that the cathode of tube $CT_1$ which responds to the calling lines' explorer and which through resistance $R_1$ is connected to the cathode of $VT_1$, is not affected by the presence of this —48 v. potential, owing to the resistance $R_1$. As a consequence, the impulses which are produced by the calling lines' explorer may be transmitted starting from the cathode of tube $CT_1$ via conductor No. 1 to the "ESBO" circuit (Fig. 14A), where they are eventually used for signalling the identity of the calling line to the register circuit.

Owing to the connection of battery just mentioned, which happens before the flip-flop circuits $FT_3$ and $FT_4$ reverse automatically, the call detector (Figs. 12A and B), which otherwise, by the reversal of $FT_3$ and $FT_4$, could again be restored to the condition in which it could respond to a calling line, will be prevented from doing so as long as the register needs to connect the second and first line finders to this calling line. As soon as this has happened, the instepping relay Isr (Fig. 22) operates, as has already been described, and causes the operation of Laar which on its break contact $Laa_6$ removes the battery to the call detector, so that this is now restored to the condition in which it may respond to a next call.

If, for any reason, the register circuit fails to find the calling line, e. g. owing to a defect or a shortage of circuits, a timing arrangement provided at the register (Fig. 23) and comprising tube Vi and its anode relay Tir in co-operation with a few resistances and condensers, will come into operation after a delay of say 2 to 3 seconds and will cause the register to break down the partially completed connection. The call detector should then start all over again to find a different register.

Assuming that the connection is normally established to the calling line, the subscriber may commence dialling upon receiving the dialling tone, the dialling impulses being followed by the instepping relay Isr (Fig. 22), which transmits these impulses via its break contact and make contact $Laa_3$ to the impulse counting circuit, which has not been shown on the present circuits and of which the description does not relate to the present invention.

While the principles of the invention have been described above in connection with specific embodiments, and particular modifications thereof, it is to be clearly understood that this description is made only by way of example and not as a limitation on the scope of the invention.

What we claim is:

1. A circuit arrangement comprising a first set of circuits similar to each other, a second set of circuits similar to each other, a plurality of first networks, there being one for each circuit of said first set of circuits, connecting each circuit of said first set of circuits to each circuit of said second set of circuits, a plurality of second networks, there being one for each circuit of said second set, connecting each circuit of said second set of circuits to each circuit of said first set of circuits, selectively operable means at each of the circuits of said first set for transmitting a signal to all of the second networks, means connected differently to each of said second networks and operated by said signal for transmitting said signal at a particular time position in a repetitive cycle of time positions to the second circuit connected to said second network, said time positions being different for each second circuit, selectively operated means at each second circuit operated by a received signal for transmitting a return signal at the same time position as said received signal to all of said first networks, means connected to each of said first networks and controlled by the time position of a received return signal for transmitting said return signal to a particular circuit of said first set, said last-mentioned transmitting means being connected to said first networks in the same manner that said signal operative transmitting means is connected to said second networks, whereby the same circuit of the first set to transmit a signal will receive the return signal, and means in each circuit of the first set, operated by a return signal for stopping the operation of the transmitting means in that circuit.

2. A circuit arrangement, according to claim 1, in which the first and second networks comprise similar static gating circuits, and the means connected to said networks control said gating circuits in a predetermined order of time positions, in a repetitive cycle of time positions.

3. A circuit arrangement, according to claim 1, in which there are a larger number of circuits in the first set than there are in the second set, and in which the means connected differently to each of the second networks is so connected that the same circuit of the first set will cause a signal to be transmitted to each circuit of the second set at a different time position from that of any other circuit of the second set.

4. A circuit arrangement, according to claim 1, further comprising means in each circuit of the second set, operated by a received signal, for indicating an engaged condition.

5. A circuit arrangement, according to claim 1, in which the circuits of the first set are call detectors and the circuits of the second set are register controllers, said arrangement further comprising a plurality of subscribers' lines connected to said call detectors, the selectively operative means at each call detector being operated by a call signal transmitted from a subscriber's line.

6. A circuit arrangement, according to claim 5, in which there are more call detectors than register controllers and in which each repetitive cycle of time positions has a number of time positions at least equal to the number of said call detectors, and in which the means connected to each of said first networks is so arranged that a signal transmitted from every register controller in any one time position will be received by a different call detector.

7. A circuit arrangement, according to claim 6, further comprising means operated by the coincidence of operation of the selectively operative means at each call detector and a signal received at said call detector from a register controller for interconnecting said call detector and said register controller.

8. A circuit arrangement, according to claim 7, further comprising means at each register controller operated by the interconnection with a call detector for generating a "register-engaged" signal.

9. A circuit arrangement, according to claim 8, further comprising means at each call detector, operated by a return signal received by said call detector from a register controller for rendering inoperative the selectively operable means for transmitting a signal, whereby one register controller can be connected to one and only one call detector.

10. A circuit arrangement, according to claim 9, in which the networks are similar static gating circuits and the means connected thereto control said gating circuits in a predetermined order of time positions in a repetitive cycle of time positions.

11. A circuit arrangement, according to claim 1, in which the circuits of the first set are call detectors and the circuits of the second set are register controllers, said arrangement further comprising a plurality of subscribers' lines connected to said call detectors, the selectively operative means at each call detector being operated by a signal transmitted from a subscriber's line, and in which the networks are similar static gating circuits and the means connected thereto control said gating circuits in a predetermined order of time positions in a repetitive cycle of time positions.

12. In or for an automatic telecommunication exchange, equipment which comprises a plurality of subscribers' lines, means at each line for applying a predetermined signal to said line when a call is initiated, a plurality of call detectors, means for connecting said call detectors to said lines and including means for transmitting the signal applied to a calling line to said call detectors at repetitive intervals of time peculiar to said calling line, a plurality of register controllers, means at each register controller for creating a signal when said register controller is free, first connecting means between said register controllers and said call detectors and including means for transmitting the signal from each free register controller to said call detectors at repetitive intervals of time peculiar to said register controller, first receiving means at each call detector adapted to operate upon the receipt of the signal from a calling line, second receiving means at each call detector for receiving signals from said register controllers, blocking means at each register controller operated by the coincidence of a signal from a calling line and a signal from a free register controller for blocking the operation of said first and second receiving means, so as to prevent the effect of signals from other calling lines and from other register controllers, whereby a call detector and a register controller are seized, second connecting means between said call detectors and said register controllers, means at each call detector operated by said first receiving means and controlled by said blocking means for transmitting a signal to said registers from said call detectors at the time of said coincidence of signals, said second connecting means including means for delivering said signal to the register controller whose signal operated said blocking means at the call detector.

13. In or for an automatic telecommunication exchange, equipment, as claimed in claim 12, in which the connecting means for connecting the calling lines to the call detectors comprise static electric scanning means for effectively connecting the calling lines in sequence to all of the call registers.

14. Equipment, as claimed in claim 13, further comprising means for controlling the static electric scanning means in a repetitive cycle of time positions.

15. Equipment, as claimed in claim 12, in which the first and second connecting means for connecting the registers to the call detectors respectively comprise static electric scanning means for effectively connecting the register controllers sequentially to all the call detectors and static electric scanning means for effectively connecting said call detectors sequentially to all said register controllers.

16. Equipment, as claimed in claim 12, further comprising a plurality of line finders having access to a calling line, and means operated by a seized register controller for selecting and connecting itself to a free one of said line finders.

17. Equipment, as claimed in claim 16, further comprising means operated by a seized register controller for causing a seized free line finder to select and connect itself to the calling line which seized said register controller.

18. Equipment, as claimed in claim 17, in which the means for connecting the register controllers with the line finders and the line finders themselves are cross bar multi-switches.

19. Equipment, as claimed in claim 12, further comprising a plurality of line finders having access to a calling line, a plurality of cord circuits connected with said line finders, means operated by a seized register controller for selecting a free cord circuit and connecting itself thereto, and means in said register controller operated when said cord circuit has been connected for causing the line finder connected thereto to select and connect itself to said calling line.

References Cited in the file of this patent

UNITED STATES PATENTS

| Number | Name | Date |
|---|---|---|
| 2,204,055 | Skellett | June 11, 1940 |
| 2,285,972 | Holden et al. | June 9, 1942 |
| 2,531,624 | Hanscom | Nov. 28, 1950 |
| 2,535,512 | Ostline | Dec. 26, 1950 |
| 2,586,825 | Jacobsen | Feb. 26, 1952 |